(12) United States Patent
Son et al.

(10) Patent No.: US 11,775,295 B2
(45) Date of Patent: *Oct. 3, 2023

(54) PROCESSING-IN-MEMORY (PIM) DEVICES

(71) Applicant: SK hynix Inc., Icheon-si (KR)

(72) Inventors: Mun Gyu Son, Icheon-si (KR); Choung Ki Song, Yongin-si (KR)

(73) Assignee: SK hynix Inc., Icheon-si Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/865,148

(22) Filed: Jul. 14, 2022

(65) Prior Publication Data

US 2022/0350599 A1    Nov. 3, 2022

Related U.S. Application Data

(63) Continuation of application No. 17/145,923, filed on Jan. 11, 2021, now Pat. No. 11,422,804, which is a continuation-in-part of application No. 17/090,462, filed on Nov. 5, 2020, now Pat. No. 11,537,323.

(60) Provisional application No. 62/959,668, filed on Jan. 10, 2020, provisional application No. 62/958,223, filed on Jan. 7, 2020.

(30) Foreign Application Priority Data

Jan. 17, 2020  (KR) .................. 10-2020-0006902

(51) Int. Cl.
*G06F 9/30* (2018.01)
*G06F 7/544* (2006.01)

(52) U.S. Cl.
CPC .......... *G06F 9/3001* (2013.01); *G06F 7/5443* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 10,042,639 B2 | 8/2018 | Gopal et al. | |
| 10,372,416 B2 | 8/2019 | Fais et al. | |
| 10,817,260 B1* | 10/2020 | Huang | .................... G06F 7/523 |
| 10,853,066 B1* | 12/2020 | Liu | ........................ G06F 3/0673 |

(Continued)

FOREIGN PATENT DOCUMENTS

KR    1020190100632 A    8/2019

*Primary Examiner* — Eric Coleman
(74) *Attorney, Agent, or Firm* — WILLIAM PARK & ASSOCIATES LTD.

(57) ABSTRACT

A processing-in-memory (PIM) device includes a data storage region and an arithmetic circuit. The data storage region is configured to store first data and second data. The arithmetic circuit includes a zero-detection circuit and multiplier. The zero-detection circuit including first transfer gates, second transfer gates, and an output control logic circuit. The first controller and the second controller are configured to receive a first output value and a second output value generated by inverting the first output value. The first output value is having a value of "1" when all bits of the first data or the second data have a value of "0". The output control logic circuit is configured to generate zero data including bits having a value of '0' as output data of the multiplier when the second output value is a value of '0'.

10 Claims, 55 Drawing Sheets

(56) References Cited

U.S. PATENT DOCUMENTS

| | | |
|---|---|---|
| 10,901,492 B1 | 1/2021 | BShara et al. |
| 2009/0089540 A1 | 4/2009 | Hansen et al. |
| 2012/0110423 A1 | 5/2012 | Song |
| 2013/0124592 A1 | 5/2013 | Manohar et al. |
| 2013/0336075 A1 | 12/2013 | Song |
| 2016/0182031 A1 | 6/2016 | Song |
| 2018/0121168 A1* | 5/2018 | Langhammer ...... G06F 7/49915 |
| 2018/0293695 A1* | 10/2018 | Sharma ................. G06T 15/005 |
| 2019/0018649 A1* | 1/2019 | Kroener .................. G06F 7/483 |
| 2020/0193277 A1 | 6/2020 | Kwon |
| 2020/0294575 A1 | 9/2020 | O et al. |

* cited by examiner

FIG. 32

$$\begin{pmatrix} W0.0 & W0.1 & W0.2 & \ldots & W0.N \\ W1.0 & W1.1 & W1.2 & \ldots & W1.N \\ W2.0 & W2.1 & W2.2 & \ldots & W2.N \\ \cdot & \cdot & \cdot & & \cdot \\ \cdot & \cdot & \cdot & & \cdot \\ \cdot & \cdot & \cdot & & \cdot \\ WM.0 & WM.1 & WM.2 & \ldots & WM.N \end{pmatrix} \times \begin{pmatrix} X0.0 \\ X1.0 \\ X2.0 \\ \cdot \\ \cdot \\ \cdot \\ XN.0 \end{pmatrix} = \begin{pmatrix} MAC0.0 \\ MAC1.0 \\ MAC2.0 \\ \cdot \\ \cdot \\ \cdot \\ MACN.0 \end{pmatrix}$$

WEIGHT MATRIX     VECTOR MATRIX     MAC RESULT MATRIX

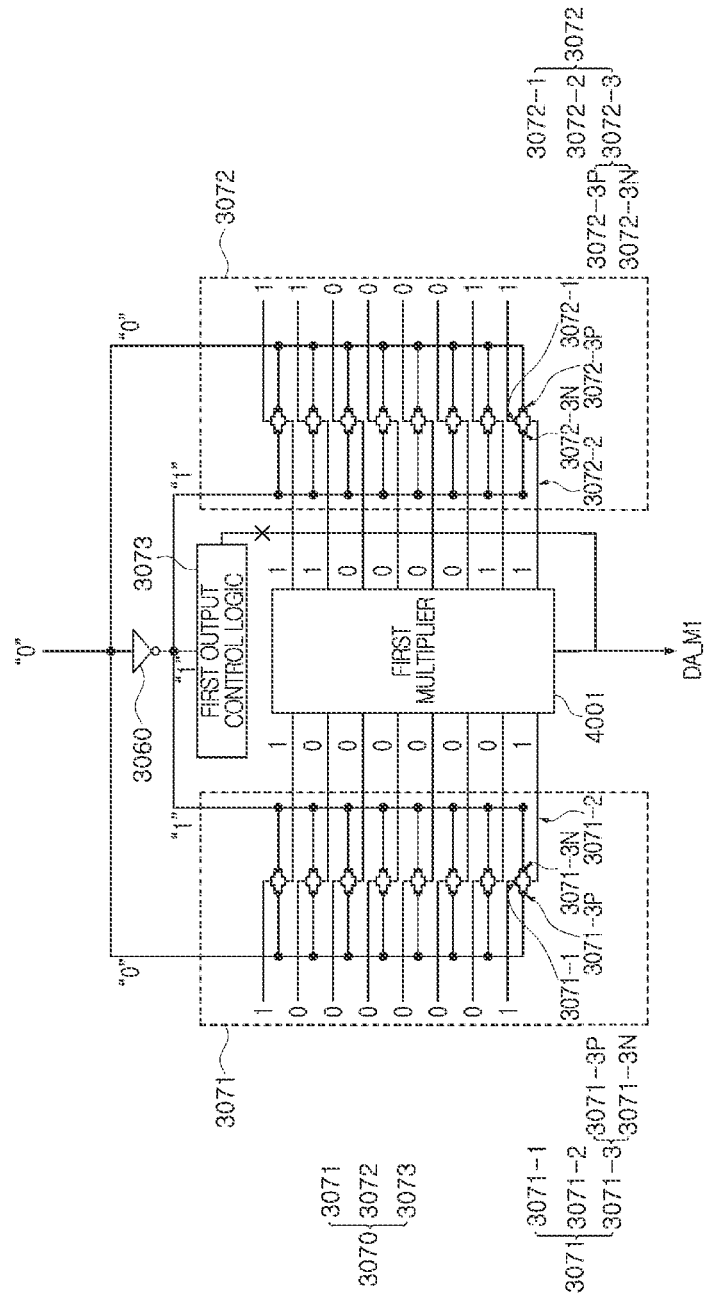

PROCESSING-IN-MEMORY (PIM) DEVICES

CROSS-REFERENCE TO RELATED APPLICATIONS

This is a continuation application of U.S. patent application Ser. No. 17/145,923, filed on Jan. 11, 2021, which is a continuation-in-part of U.S. patent application Ser. No. 17/090,462, filed Nov. 5, 2020, which claims the benefit of U.S. Provisional Application No. 62/958,223, filed on Jan. 7, 2020, and claims priority to Korean Application No. 10-2020-0006902, filed on Jan. 17, 2020, which are incorporated herein by reference in their entirety. The U.S. patent application Ser. No. 17/145,923 also claims the benefit of U.S. Provisional Application No. 62/959,668, filed on Jan. 10, 2020, which is incorporated herein by reference in its entirety.

BACKGROUND

1. Technical Field

Various embodiments of the present disclosure relate to processing-in-memory (PIM) devices and, more particularly, to PIM devices performing a deterministic arithmetic operation.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. One cause of this widespread interest may be due to the improved performance of processors performing arithmetic operations. To improve the performance of artificial intelligence, it may be necessary to increase the number of layers constituting a neural network of the artificial intelligence to educate the artificial intelligence. This trend has continued in recent years, which has led to an exponential increase in the amount of computations required for hardware actually performing the computations. Moreover, if artificial intelligence employs a general hardware system including a memory and a processor which are separated from each other, the performance of the artificial intelligence may be degraded due to a limitation of the amount of data communication between the memory and the processor. In order to solve this problem, a PIM device in which a processor and memory are integrated in one semiconductor chip has been used as a neural network computing device. Because the PIM device directly performs arithmetic operations in the PIM device, a data processing speed in the neural network may be improved.

SUMMARY

A processing-in-memory (PIM) device includes a data storage region and an arithmetic circuit. The data storage region is configured to store first data and second data. The arithmetic circuit includes a zero-detection circuit and multiplier. The zero-detection circuit including first transfer gates, second transfer gates, and an output control logic circuit. The each of the first transfer gates includes a first input terminal coupled to one bit included in the first data, a first output terminal coupled to the multiplier, and first controller coupled between the first input terminal and the first output terminal. The each of the second transfer gates includes a second input terminal coupled to one bit included in the second data, a second output terminal coupled to the multiplier, and second controller coupled between the second input terminal and the second output terminal. The first controller and the second controller are configured to receive a first output value and a second output value generated by inverting the first output value. The first output value is having a value of "1" when all bits of the first data or the second data have a value of "0". The output control logic circuit is configured to generate zero data including bits having a value of '0' as output data of the multiplier when the second output value is a value of '0'.

BRIEF DESCRIPTION OF THE DRAWINGS

Certain features of the disclosed technology are illustrated by various embodiments with reference to the attached drawings.

FIG. 32 illustrates an example of a MAC arithmetic operation performed in a PIM device according to an embodiment of the present disclosure.

FIGS. 50 to 55 illustrate an operation of the first zero-detection circuit illustrated in FIG. 44.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Various embodiments are directed to processing-in-memory (PIM) devices which are capable of performing a deterministic arithmetic operation at a high speed.

Figure 1:
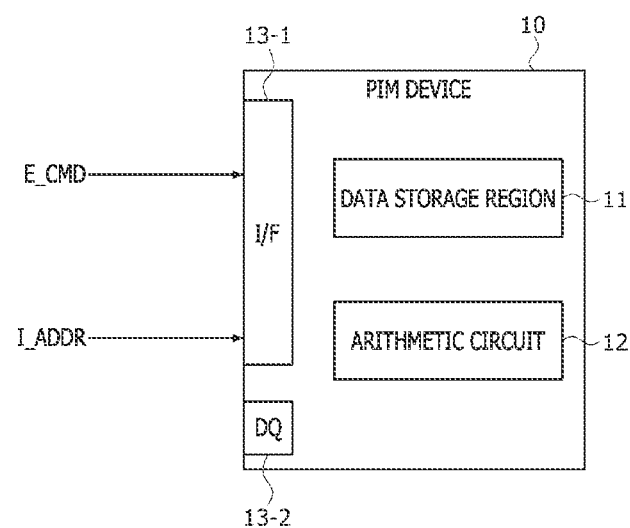
FIG. 1 is a block diagram illustrating a PIM device according to an embodiment of the present disclosure.

FIG. 1 is a block diagram illustrating a PIM device according to an embodiment of the present disclosure. As illustrated in FIG. 1, the PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2. In an embodiment, the arithmetic circuit 12 may perform additional operations, for example a bias addition operation and an active function operation, for a neural network calculation, for example, an arithmetic operation in a deep learning process. In another embodiment, the PIM device 10 may include a bias addition circuit and active function circuit separated from the arithmetic circuit 12.

The interface 13-1 of the PIM device 10 may receive an external command E_CMD and an input address I_ADDR from an external device. The external device may denote a host or a PIM controller coupled to the PIM device 10. Hereinafter, it may be assumed that the external command E_CMD transmitted to the PIM device 10 is a command requesting the MAC arithmetic operation. That is, the PIM device 10 may perform a MAC arithmetic operation in response to the external command E_CMD. The data I/O pad 13-2 of the PIM device 10 may function as a data communication terminal between a device external to the PIM device 10, for example the PIM controller or a host located outside the PIM system 1. Accordingly, data outputted from the host or the PIM controller may be inputted into the PIM device 10 through the data I/O pad 13-2. Also, data outputted from the PIM device 10 may be inputted to the host or the PIM controller through the data I/O pad 13-2.

In an embodiment, the PIM device 10 may operate in a memory mode or a MAC arithmetic mode. In the event that the PIM device 10 operates in the memory mode, the PIM device 10 may perform a data read operation or a data write operation for the data storage region 11. In the event that the PIM device 10 operates in the MAC arithmetic mode, the arithmetic circuit 12 of the PIM device 10 may receive first data and second data from the data storage region 11 to perform the MAC arithmetic operation. In the event that PIM device 10 operates in the MAC arithmetic mode, the PIM device 10 may also perform the data write operation for the data storage region 11 to execute the MAC arithmetic operation. The MAC arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 2:
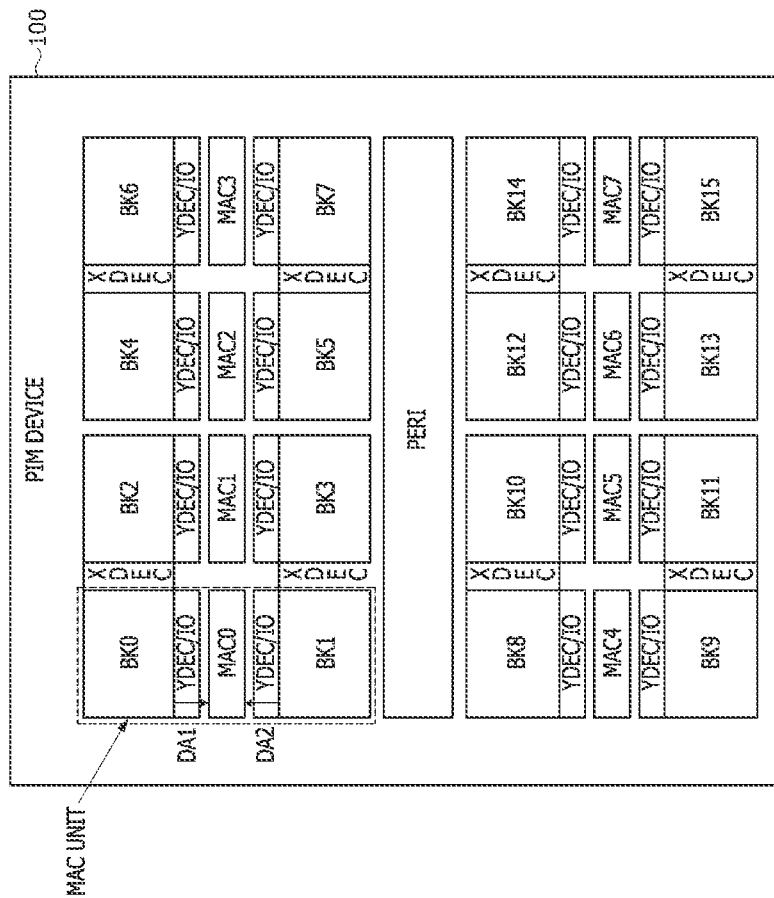
FIG. 2 is a schematic diagram illustrating an arrangement of memory banks and multiplication/accumulation (MAC) operators included in a PIM device according to a first embodiment of the present disclosure.

FIG. 2 illustrates a disposal structure indicating placement of memory banks BK0, . . . , and BK15 and MAC operators MAC0, . . . , and MAC7 included in a PIM device 100 according to an embodiment of the present disclosure. In an embodiment, the memory banks BK0, . . . , and BK15 and the MAC operators MAC0, . . . , and MAC7 may be included in the data storage region and the arithmetic circuit of the PIM device 10 of FIG. 1, respectively. Referring to FIG. 2, the PIM device 100 may include a data storage region and an arithmetic circuit. In an embodiment, the data storage region may include the memory banks BK0, . . . , and BK15. Although the present embodiment illustrates an example in which the data storage region includes the memory banks BK0, . . . , and BK15, the memory banks BK0, . . . , and BK15 are merely examples which are suitable for the data storage region. In some embodiments, the memory banks BK0, . . . , and BK15 may be a memory region corresponding to a volatile memory device, for example, a DRAM device. In an embodiment, each of the memory banks BK0, . . . , and BK15 may be a component unit which is independently activated and may be configured to have the same data bus width as data I/O lines in the PIM device 100. In an embodiment, the memory banks BK0, . . . , and BK15 may operate through interleaving such that an active operation of any one of the memory banks is performed in parallel while another memory bank is selected. Although the present embodiment illustrates an example in which the PIM device 100 includes the memory banks BK0, . . . , and BK15, the number of the memory banks is not limited to 16 and may be different in different embodiments. Each of the memory banks BK0, . . . , and BK15 may include at least one cell array which includes memory unit cells located at cross points of a plurality of rows and a plurality of columns. The memory banks BK0, . . . , and BK15 may include a first group of memory banks (e.g., odd-numbered memory banks BK0, BK2, . . . , and BK14) and a second group of memory banks (e.g., even-numbered memory banks BK1, BK3, . . . , and BK15).

A core circuit may be disposed to be adjacent to the memory banks BK0, . . . , and BK15. The core circuit may include X-decoders XDECs and Y-decoders/IO circuits YDEC/IOs. An X-decoder XDEC may also be referred to as a word line decoder or a row decoder. In an embodiment, two odd-numbered memory banks arrayed to be adjacent to each other in one row among the odd-numbered memory banks BK0, BK2, . . . , and BK14 may share one of the X-decoders XDECs with each other. For example, the first memory bank BK0 and the third memory bank BK2 adjacent to each other in a first row may share one of the X-decoders XDECs, and the fifth memory bank BK4 and the seventh memory bank BK6 adjacent to each other in the first row may also share one of the X-decoders XDECs. Similarly, two even-numbered memory banks arrayed to be adjacent to each other in one row among the even-numbered memory banks BK1, BK3, . . . , and BK15 may share one of the X-decoders XDECs with each other. For example, the second memory bank BK1 and the fourth memory bank BK3 adjacent to each other in a second row may share one of the X-decoders XDECs, and the sixth memory bank BK5 and the eighth memory bank BK7 adjacent to each other in the second row may also share one of the X-decoders XDECs. The X-decoder XDEC may receive a row address from an address latch included in a peripheral circuit PERI and may decode the row address to select and enable one of rows (i.e., word lines) coupled to the memory banks adjacent to the X-decoder XDEC.

The Y-decoders/IO circuits YDEC/IOs may be disposed to be allocated to the memory banks BK0, . . . , and BK15, respectively. For example, the first memory bank BK0 may be allocated to one of the Y-decoders/IO circuits YDEC/IOs, and the second memory bank BK1 may be allocated to another one of the Y-decoders/IO circuits YDEC/IOs. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address from an address latch included in the peripheral circuit PERI and may decode the column address to select and enable at least one of columns (i.e., bit lines) coupled to the selected memory bank. Each of the I/O circuits may include an I/O sense amplifier for sensing and amplifying a level of a read datum outputted from the corresponding memory bank during a read operation and a write driver for driving a write datum during a write operation for the corresponding memory bank.

In an embodiment, the arithmetic circuit may include MAC operators MAC0, . . . , and MAC7. Although the present embodiment illustrates an example in which the MAC operators MAC0, . . . , and MAC7 are employed as the arithmetic circuit, the present embodiment may be merely an example of the present disclosure. For example, in some other embodiments, processors other than the MAC operators MAC0, . . . , and MAC7 may be employed as the arithmetic circuit. The MAC operators MAC0, . . . , and MAC7 may be disposed such that one of the odd-numbered memory banks BK0, BK2, . . . , and BK14 and one of the even-numbered memory banks BK1, BK3, . . . , and BK15 share any one of the MAC operators MAC0, . . . , and MAC7 with each other. Specifically, one odd-numbered memory bank and one even-numbered memory bank arrayed in one column to be adjacent to each other may constitute a pair of memory banks sharing one of the MAC operators MAC0, . . . , and MAC7 with each other. One of the MAC operators MAC0, . . . , and MAC7 and a pair of memory banks sharing the one MAC operator with each other will be referred to as 'a MAC unit' hereinafter.

In an embodiment, the number of the MAC operators MAC0, . . . , and MAC7 may be equal to the number of the odd-numbered memory banks BK0, BK2, . . . , and BK14 or the number of the even-numbered memory banks BK1, BK3, . . . , and BK15. The first memory bank BK0, the second memory bank BK1, and the first MAC operator MAC0 between the first memory bank BK0 and the second memory bank BK1 may constitute a first MAC unit. In addition, the third memory bank BK2, the fourth memory bank BK3, and the second MAC operator MAC1 between the third memory bank BK2 and the fourth memory bank BK3 may constitute a second MAC unit. The first MAC operator MAC0 included in the first MAC unit may receive first data DA1 outputted from the first memory bank BK0 included in the first MAC unit and second data DA2 outputted from the second memory bank BK1 included in the first MAC unit. In addition, the first MAC operator MAC0 may perform a MAC arithmetic operation of the first data DA1 and the second data DA2. In the event that the PIM device 100 performs a neural network calculation, for example, an arithmetic operation in a deep learning process, one of the first data DA1 and the second data DA2 may be weight data and the other may be vector data. A configuration of any one of the MAC operators MAC0~MAC7 will be described in more detail hereinafter.

In the PIM device 100, the peripheral circuit PERI may be disposed in a region other than an area in which the memory banks BK0, BK1, . . . , and BK15, the MAC operators MAC0, . . . , and MAC7, and the core circuit are disposed. The peripheral circuit PERI may include a control circuit and a transmission path for a command/address signal, a control circuit and a transmission path for input/output of data, and a power supply circuit. The control circuit for the command/address signal may include a command decoder for decoding a command included in the command/address signal to generate an internal command signal, an address latch for converting an input address into a row address and a column address, a control circuit for controlling various functions of row/column operations, and a control circuit for controlling a delay locked loop (DLL) circuit. The control circuit for the input/output of data in the peripheral circuit PERI may include a control circuit for controlling a read/write operation, a read/write buffer, and an output driver. The power supply circuit in the peripheral circuit PERI may include a reference power voltage generation circuit for generating an internal reference power voltage and an internal power voltage generation circuit for generating an internal power voltage from an external power voltage.

The PIM device 100 according to the present embodiment may operate in any one mode of a memory mode and a MAC arithmetic mode. In the memory mode, the PIM device 100 may operate to perform the same operations as general memory devices. The memory mode may include a memory read operation mode and a memory write operation mode. In the memory read operation mode, the PIM device 100 may perform a read operation for reading out data from the memory banks BK0, BK1, . . . , and BK15 to output the read data, in response to an external request. In the memory write operation mode, the PIM device 100 may perform a write operation for storing data provided by an external device into the memory banks BK0, BK1, . . . , and BK15, in response to an external request.

In the MAC arithmetic mode, the PIM device 100 may perform the MAC arithmetic operation using the MAC operators MAC0, . . . , and MAC7. Specifically, the PIM device 100 may perform the read operation of the first data DA1 for each of the odd-numbered memory banks BK0, BK2, . . . , and BK14 and the read operation of the second data DA2 for each of the even-numbered memory banks BK1, BK3, . . . , and BK15, for the MAC arithmetic operation in the MAC arithmetic mode. In addition, each of the MAC operators MAC0, . . . , and MAC7 may perform the MAC arithmetic operation of the first data DA1 and the second data DA2 which are read out of the memory banks to store a result of the MAC arithmetic operation into the memory bank or to output the result of the MAC arithmetic operation. In some cases, the PIM device 100 may perform a data write operation for storing data to be used for the MAC arithmetic operation into the memory banks before the data read operation for the MAC arithmetic operation is performed in the MAC arithmetic mode.

The operation mode of the PIM device 100 according to the present embodiment may be determined by a command which is transmitted from a host or a controller to the PIM device 100. In an embodiment, if a first external command requesting a read operation or a write operation for the memory banks BK0, BK1, . . . , and BK15 is inputted to the PIM device 100, the PIM device 100 may perform the data read operation or the data write operation in the memory mode. Meanwhile, if a second external command requesting a MAC calculation corresponding to the MAC arithmetic operation is inputted to the PIM device 100, the PIM device 100 may perform the MAC arithmetic operation.

The PIM device 100 may perform a deterministic MAC arithmetic operation. The term "deterministic MAC arithmetic operation" used in the present disclosure may be defined as the MAC arithmetic operation performed in the PIM device 100 during a predetermined fixed time. Thus, the host or the controller may always predict a point in time (or a clock) when the MAC arithmetic operation terminates in the PIM device 100 at a point in time when an external command requesting the MAC arithmetic operation is transmitted from the host or the controller to the PIM device 100. No operation for informing the host or the controller of a status of the MAC arithmetic operation is required while the PIM device 100 performs the deterministic MAC arithmetic operation. In an embodiment, a latency during which the MAC arithmetic operation is performed in the PIM device 100 may be fixed for the deterministic MAC arithmetic operation.

Figure 3:
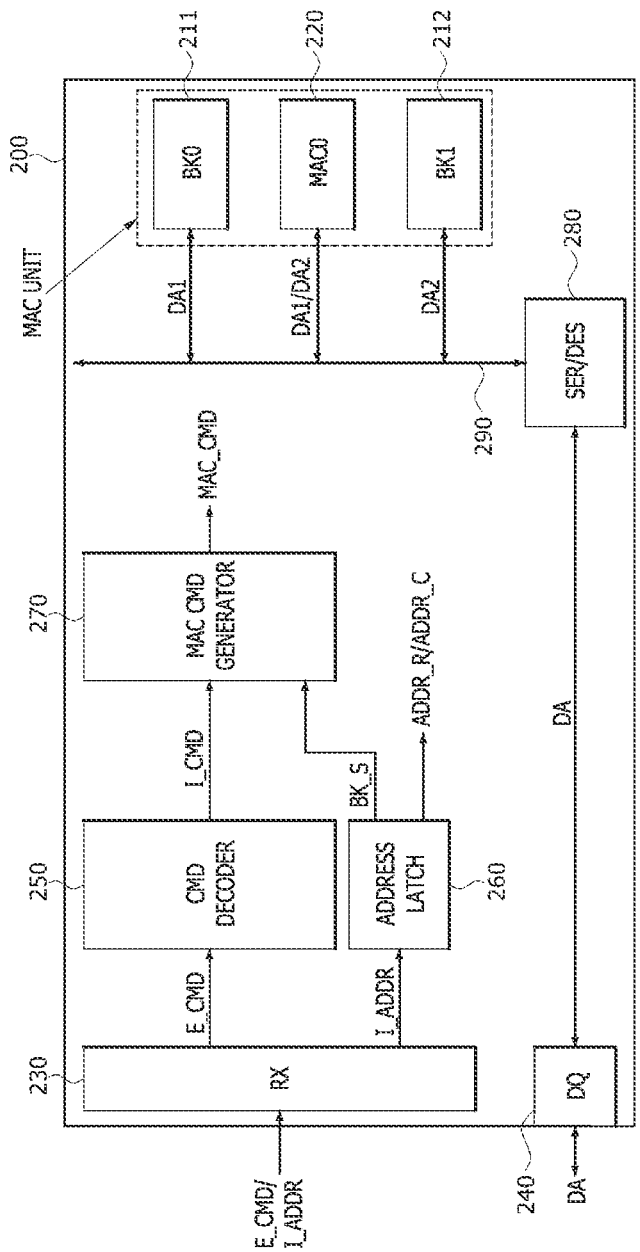
FIG. 3 is a block diagram illustrating a configuration of a PIM device according to the first embodiment of the present disclosure.
Figure 4:
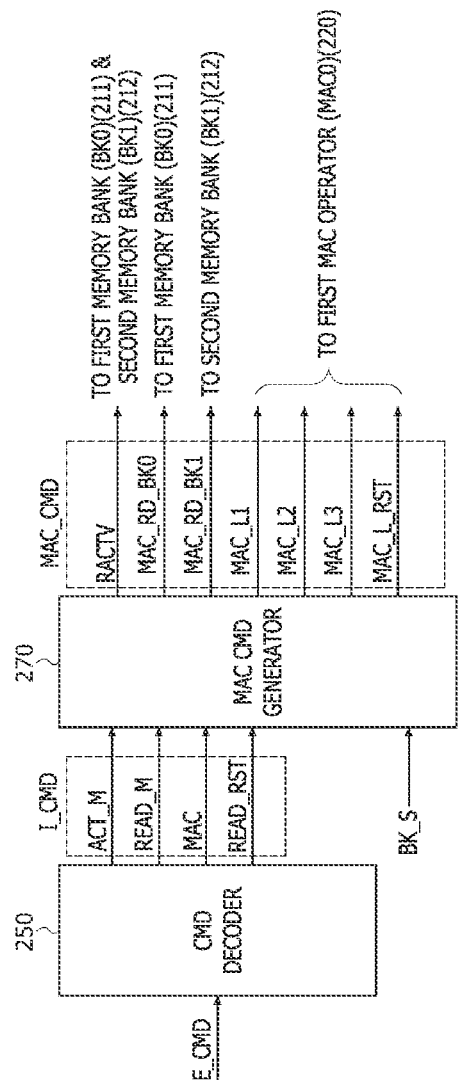
FIG. 4 illustrates internal command signals outputted from a command decoder and MAC command signals outputted from a MAC command generator in the PIM device of FIG. 3.

FIG. 3 is a block diagram illustrating a configuration of a PIM device 200 corresponding to the PIM device 100 illustrated in FIG. 3, and FIG. 4 illustrates an internal command signal I_CMD outputted from a command decoder 250 and a MAC command signal MAC_CMD outputted from a MAC command generator 270 included in the PIM device 200 of FIG. 3. FIG. 3 illustrates only the first memory bank (BK0) 211, the second memory bank (BK1) 212, and the first MAC operator (MAC0) 220 constituting the first MAC unit among the plurality of MAC units. However, FIG. 3 illustrates merely an example for simplification of the drawing. Accordingly, the following description for the first MAC unit may be equally applicable to the remaining MAC units. Referring to FIG. 3, the PIM device 200 may include a global I/O line (hereinafter, referred to as a 'GIO line') 290. The first memory bank (BK0) 211, the second memory bank (BK1) 212, and the first MAC operator (MAC0) 220 may communicate with each other through the GIO line 290. In an embodiment, the GIO line 290 may be disposed in the peripheral circuit PERI of FIG. 2.

The PIM device 200 may include a receiving driver (RX) 230, a data I/O circuit (DQ) 240, a command decoder 250, an address latch 260, a MAC command generator 270, and a serializer/deserializer (SER/DES) 280. The command decoder 250, the address latch 260, the MAC command generator 270, and the serializer/deserializer 280 may be disposed in the peripheral circuit PERI of the PIM device 100 illustrated in FIG. 2. The receiving driver 230 may receive an external command E_CMD and an input address I_ADDR from an external device. The external device may denote a host or a controller coupled to the PIM device 200. Hereinafter, it may be assumed that the external command E_CMD transmitted to the PIM device 200 is a command requesting the MAC arithmetic operation. That is, the PIM device 200 may perform the deterministic MAC arithmetic operation in response to the external command E_CMD. The data I/O circuit 240 may include an I/O pad. The data I/O circuit 240 may be coupled to data I/O line. The PIM device 200 may communicate with the external device through the data I/O circuit 240. The receiving driver 230 may separately output the external command E_CMD and the input address I_ADDR received from the external device. Data DA inputted to the PIM device 200 through the data I/O circuit 240 may be processed by the serializer/deserializer 280 and may be transmitted to the first memory bank (BK0) 211 and the second memory bank (BK1) 212 through the GIO line 290 of the PIM device 200. The data DA outputted from the first memory bank (BK0) 211, the second memory bank (BK1) 212, and the first MAC operator (MAC0) 220 through the GIO line 290 may be processed by the serializer/deserializer 280 and may be outputted to the external device through the data I/O circuit 240. The serializer/deserializer 280 may convert the data DA into parallel data if the data DA are serial data or may convert the data DA into serial data if the data DA are parallel data. For the data conversion, the serializer/deserializer 280 may include a serializer converting parallel data into serial data and a deserializer converting serial data into parallel data.

The command decoder 250 may decode the external command E_CMD outputted from the receiving driver 230 to generate and output the internal command signal I_CMD. As illustrated in FIG. 4, the internal command signal I_CMD outputted from the command decoder 250 may include first to fourth internal command signals. In an embodiment, the first internal command signal may be a memory active signal ACT_M, the second internal command signal may be a memory read signal READ_M, the third internal command signal may be a MAC arithmetic signal MAC, and the fourth internal command signal may be a result read signal READ_RST. The first to fourth internal command signals outputted from the command decoder 250 may be sequentially inputted to the MAC command generator 270.

In order to perform the deterministic MAC arithmetic operation of the PIM device 200, the memory active signal ACT_M, the memory read signal READ_M, the MAC arithmetic signal MAC, and the result read signal READ_RST outputted from the command decoder 250 may be sequentially generated at predetermined points in time (or clocks). In an embodiment, the memory active signal ACT_M, the memory read signal READ_M, the MAC arithmetic signal MAC, and the result read signal READ_RST may have predetermined latencies, respectively. For example, the memory read signal READ_M may be generated after a first latency elapses from a point in time when the memory active signal ACT_M is generated, the MAC arithmetic signal MAC may be generated after a second latency elapses from a point in time when the memory read signal READ_M is generated, and the result read signal READ_RST may be generated after a third latency elapses from a point in time when the MAC arithmetic signal MAC is generated. No signal is generated by the command decoder 250 until a fourth latency elapses from a point in time when the result read signal READ_RST is generated. The first to fourth latencies may be predetermined and fixed. Thus, the host or the controller outputting the external command E_CMD may predict the points in time when the first to fourth internal command signals constituting the internal command signal I_CMD are generated by the command decoder 250 in advance at a point in time when the external command E_CMD is outputted from the host or the controller.

The address latch 260 may convert the input address I_ADDR outputted from the receiving driver 230 into a bank selection signal BK_S and a row/column address ADDR_R/ADDR_C to output the bank selection signal BK_S and the row/column address ADDR_R/ADDR_C. The bank selection signal BK_S may be inputted to the MAC command generator 270. The row/column address ADDR_R/ADDR_C may be transmitted to the first and second memory banks 211 and 212. One of the first and second memory banks 211 and 212 may be selected by the bank selection signal BK_S. One of rows included in the selected memory bank and one of columns included in the selected memory bank may be selected by the row/column address ADDR_R/ADDR_C. In an embodiment, a point in time when the bank selection signal BK_S is inputted to the MAC command generator 270 may be the same moment as a point in time when the row/column address ADDR_R/ADDR_C is inputted to the first and second memory banks 211 and 212. In an embodiment, the point in time when the bank selection signal BK_S is inputted to the MAC command generator 270 and the point in time when the row/column address ADDR_R/ADDR_C is inputted to the first and second memory banks 211 and 212 may be a point in time when the MAC command is generated to read out data from the first and second memory banks 211 and 212 for the MAC arithmetic operation.

The MAC command generator 270 may output the MAC command signal MAC_CMD in response to the internal command signal I_CMD outputted from the command decoder 250 and the bank selection signal BK_S outputted from the address latch 260. As illustrated in FIG. 4, the MAC command signal MAC_CMD outputted from the MAC command generator 270 may include first to seventh MAC command signals. In an embodiment, the first MAC command signal may be a MAC active signal RACTV, the second MAC command signal may be a first MAC read signal MAC_RD_BK0, the third MAC command signal may be a second MAC read signal MAC_RD_BK1, the fourth MAC command signal may be a first MAC input latch signal MAC_L1, the fifth MAC command signal may be a second MAC input latch signal MAC_L2, the sixth MAC command signal may be a MAC output latch signal MAC_L3, and the seventh MAC command signal may be a MAC result latch signal MAC_L_RST.

The MAC active signal RACTV may be generated based on the memory active signal ACT_M outputted from the command decoder 250. The first MAC read signal MAC_RD_BK0 may be generated in response to the memory read signal READ_M outputted from the command decoder 250 and the bank selection signal BK_S having a first level (e.g., a logic "low" level) outputted from the address latch 260. The first MAC input latch signal MAC_L1 may be generated at a point in time when a certain time elapses from a point in time when the first MAC read signal MAC_RD_BK0 is generated. For various embodiments, a certain time means a fixed time duration. The second MAC read signal MAC_RD_BK1 may be generated in response to the memory read signal READ_M outputted from the command decoder 250 and the bank selection signal BK_S having a second level (e.g., a logic "high" level) outputted from the address latch 260. The second MAC input latch signal MAC_L2 may be generated at a point in time when a certain time elapses from a point in time when the second MAC read signal MAC_RD_BK1 is generated. The MAC output latch signal MAC_L3 may be generated in response to the MAC arithmetic signal MAC outputted from the command decoder 250. Finally, the MAC result latch signal MAC_L_RST may be generated in response to the result read signal READ_RST outputted from the command decoder 250.

The MAC active signal RACTV outputted from the MAC command generator 270 may control an activation operation for the first and second memory banks 211 and 212. The first MAC read signal MAC_RD_BK0 outputted from the MAC command generator 270 may control a data read operation for the first memory bank 211. The second MAC read signal MAC_RD_BK1 outputted from the MAC command generator 270 may control a data read operation for the second memory bank 212. The first MAC input latch signal MAC_L1 and the second MAC input latch signal MAC_L2 outputted from the MAC command generator 270 may control an input data latch operation of the first MAC operator (MAC0) 220. The MAC output latch signal MAC_L3 outputted from the MAC command generator 270 may control an output data latch operation of the first MAC operator (MAC0) 220. The MAC result latch signal MAC_L_RST outputted from the MAC command generator 270 may control a reset operation of the first MAC operator (MAC0) 220.

As described above, in order to perform the deterministic MAC arithmetic operation of the PIM device 200, the memory active signal ACT_M, the memory read signal READ_M, the MAC arithmetic signal MAC, and the result read signal READ_RST outputted from the command decoder 250 may be sequentially generated at predetermined points in time (or clocks), respectively. Thus, the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST may also be generated and outputted from the MAC command generator 270 at predetermined points in time after the external command E_CMD is inputted to the PIM device 200, respectively. That is, a time period from a point in time when the first and second memory banks 211 and 212 are activated by the MAC active signal RACTV until a point in time when the first MAC operator (MAC0) 220 is reset by the MAC result latch signal MAC_L_RST may be predetermined, and thus the PIM device 200 may perform the deterministic MAC arithmetic operation.

Figure 5:
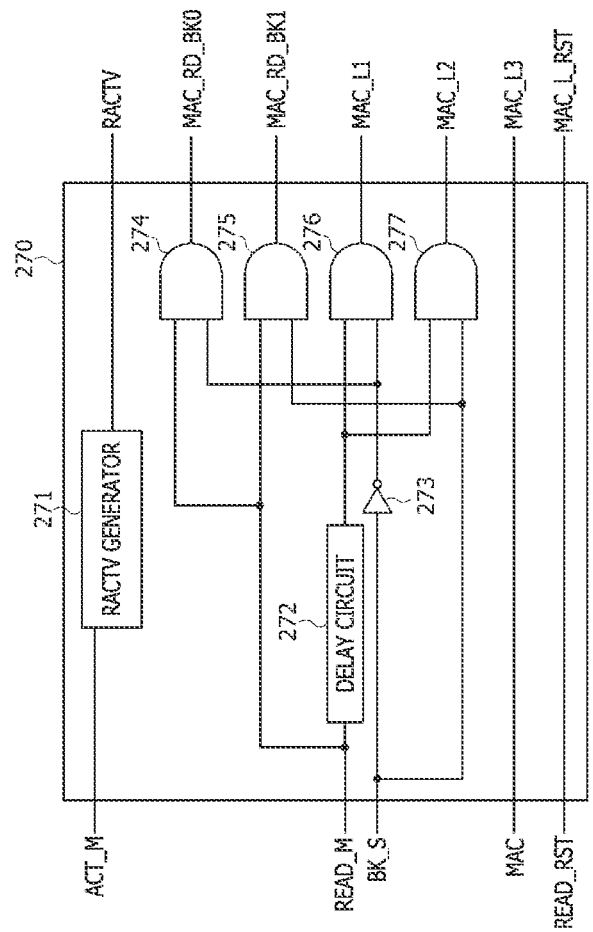
FIG. 5 illustrates an example of a configuration of a MAC command generator included in the PIM device of FIG. 3.

FIG. 5 illustrates an example of a configuration of the MAC command generator 270 included in the PIM device 200 illustrated in FIG. 3. Referring to FIG. 5, the MAC command generator 270 may sequentially receive the memory active signal ACT_M, the memory read signal READ_M, the MAC arithmetic signal MAC, and the result read signal READ_RST from the command decoder 250. In addition, the MAC command generator 270 may also receive the bank selection signal BK_S from the address latch 260. The MAC command generator 270 may output the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST in series with certain time intervals. For an embodiment, a certain time interval is a time interval having a fixed duration.

In an embodiment, the MAC command generator 270 may be configured to include an active signal generator 271, a delay circuit 272, an inverter 273, and first to fourth AND gates 274, 275, 276, and 277. The active signal generator 271 may receive the memory active signal ACT_M to generate and output the MAC active signal RACTV. The MAC active signal RACTV outputted from the active signal generator 271 may be transmitted to the first and second memory banks 211 and 212 to activate the first and second memory banks 211 and 212. The delay circuit 272 may receive the memory read signal READ_M and may delay the memory read signal READ_M by a delay time DELAY_T to output the delayed signal of the memory read signal READ_M. The inverter 273 may receive the bank selection signal BK_S and may invert a logic level of the bank selection signal BK_S to output the inverted signal of the bank selection signal BK_S.

The first AND gate 274 may receive the memory read signal READ_M and an output signal of the inverter 273 and may perform a logical AND operation of the memory read signal READ_M and an output signal of the inverter 273 to generate and output the first MAC read signal MAC_RD_BK0. The second AND gate 275 may receive the memory read signal READ_M and the bank selection signal BK_S and may perform a logical AND operation of the memory read signal READ_M and the bank selection signal BK_S to generate and output the second MAC read signal MAC_RD_BK1. The third AND gate 276 may receive an output signal of the delay circuit 272 and an output signal of the inverter 273 and may perform a logical AND operation of the output signals of the delay circuit 272 and the inverter 273 to generate and output the first MAC input latch signal MAC_L1. The fourth AND gate 277 may receive an output signal of the delay circuit 272 and the bank selection signal BK_S and may perform a logical AND operation of the output signal of the delay circuit 272 and the bank selection signal BK_S to generate and output the second MAC input latch signal MAC_L2.

It may be assumed that the memory read signal READ_M inputted to the MAC command generator 270 has a logic "high" level and the bank selection signal BK_S inputted to the MAC command generator 270 has a logic "low" level. A level of the bank selection signal BK_S may change from a logic "low" level into a logic "high" level after a certain time elapses. When the memory read signal READ_M has a logic "high" level and the bank selection signal BK_S has a logic "low" level, the first AND gate 274 may output the first MAC read signal MAC_RD_BK0 having a logic "high" level and the second AND gate 275 may output the second MAC read signal MAC_RD_BK1 having a logic "low" level. The first memory bank 211 may transmit the first data DA1 to the first MAC operator 220 according to a control operation based on the first MAC read signal MAC_RD_BK0 having a logic "high" level. If a level transition of the bank selection signal BK_S occurs so that both of the memory read signal READ_M and the bank selection signal BK_S have a logic "high" level, the first AND gate 274 may output the first MAC read signal MAC_RD_BK0 having a logic "low" level and the second AND gate 275 may output the second MAC read signal MAC_RD_BK1 having a logic "high" level. The second memory bank 212 may transmit the second data DA2 to the first MAC operator 220 according to a control operation based on the second MAC read signal MAC_RD_BK1 having a logic "high" level.

Due to the delay time of the delay circuit 272, the output signals of the third and fourth AND gates 276 and 277 may be generated after the first and second MAC read signals MAC_RD_BK0 and MAC_RD_BK1 are generated. Thus, after the second MAC read signal MAC_RD_BK1 is generated, the third AND gate 276 may output the first MAC input latch signal MAC_L1 having a logic "high" level. The first MAC operator 220 may latch the first data DA1 in response to the first MAC input latch signal MAC_L1 having a logic "high" level. After a certain time elapses from a point in time when the first data DA1 are latched by the first MAC operator 220, the fourth AND gate 277 may output the second MAC input latch signal MAC_L2 having a logic "high" level. The first MAC operator 220 may latch the second data DA2 in response to the second MAC input latch signal MAC_L2 having a logic "high" level. The first MAC operator 220 may start to perform the MAC arithmetic operation after the first and second data DA1 and DA2 are latched.

The MAC command generator 270 may generate the MAC output latch signal MAC_L3 in response to the MAC arithmetic signal MAC outputted from the command decoder 250. The MAC output latch signal MAC_L3 may have the same logic level as the MAC arithmetic signal MAC. For example, if the MAC arithmetic signal MAC having a logic "high" level is inputted to the MAC command generator 270, the MAC command generator 270 may generate the MAC output latch signal MAC_L3 having a logic "high" level. The MAC command generator 270 may generate the MAC result latch signal MAC_L_RST in response to the result read signal READ_RST outputted from the command decoder 250. The MAC result latch signal MAC_L_RST may have the same logic level as the result read signal READ_RST. For example, if the result read signal READ_RST having a logic "high" level is inputted to the MAC command generator 270, the MAC command generator 270 may generate the MAC result latch signal MAC_L_RST having a logic "high" level.

Figure 6:
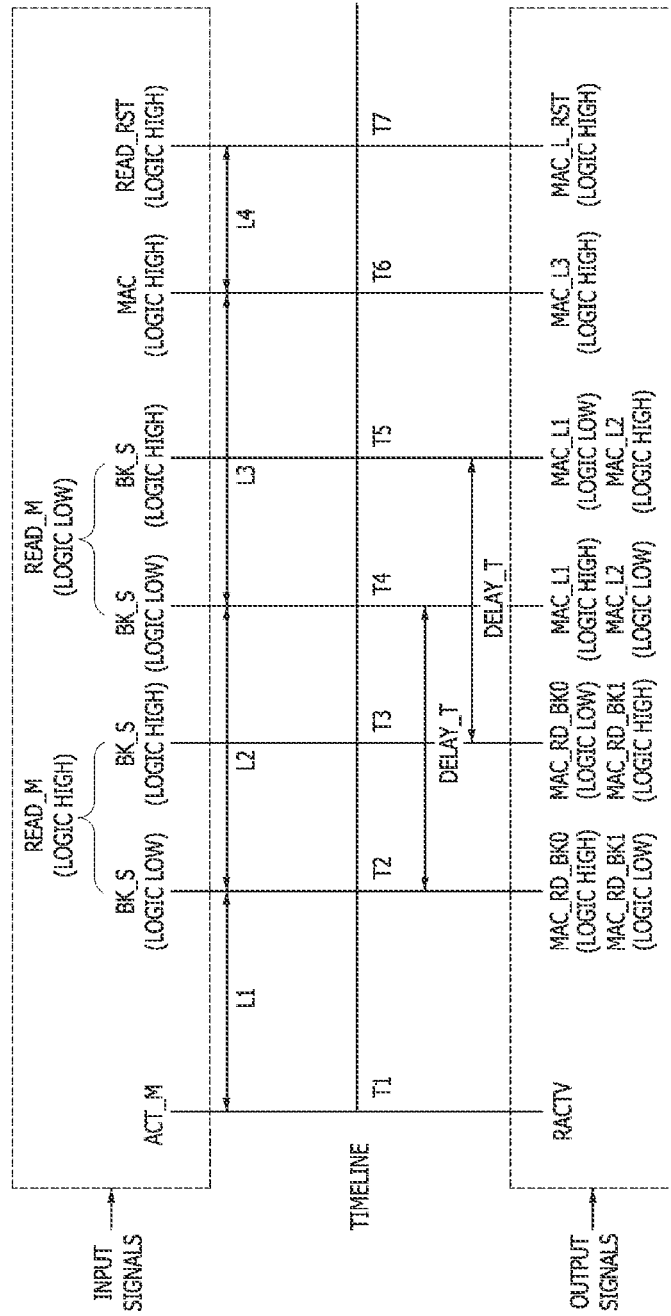
FIG. 6 illustrates input signals and output signals of the MAC command generator illustrated in FIG. 5 with a timeline.

FIG. 6 illustrates input signals and output signals of the MAC command generator 270 illustrated in FIG. 5 along a timeline. In FIG. 6, signals transmitted from the command decoder 250 to the MAC command generator 270 are illustrated in an upper dotted line box, and signals outputted from the MAC command generator 270 are illustrated in a lower dotted line box. Referring to FIGS. 5 and 6 at a first point in time "T1" of the timeline, the memory active signal ACT_M may be inputted to the MAC command generator 270 and the MAC command generator 270 may output the MAC active signal RACTV. At a second point in time "T2" when a certain time, for example, a first latency L1 elapses from the first point in time "T1", the memory read signal READ_M having a logic "high" level and the bank selection signal BK_S having a logic "low" level may be inputted to the MAC command generator 270. In response to the memory read signal READ_M having a logic "high" level and the bank selection signal BK_S having a logic "low" level, the MAC command generator 270 may output the first MAC read signal MAC_RD_BK0 having a logic "high" level and the second MAC read signal MAC_RD_BK1 having a logic "low" level in response to the memory read signal READ_M having a logic "high" level and the bank selection signal BK_S having a logic "low" level, as described with reference to FIG. 5. At a third point in time "T3" when a certain time elapses from the second point in time "T2", a logic level of the bank selection signal BK_S may change from a logic "low" level into a logic "high" level. In such a case, the MAC command generator 270 may output the first MAC read signal MAC_RD_BK0 having a logic "low" level and the second MAC read signal MAC_RD_BK1 having a logic "high" level, as described with reference to FIG. 5.

At a fourth point in time "T4" when the delay time DELAY_T elapses from the second point in time "T2", the MAC command generator 270 may output the first MAC input latch signal MAC_L1 having a logic "high" level and the second MAC input latch signal MAC_L2 having a logic "low" level. The delay time DELAY_T may be set by the delay circuit 272. The delay time DELAY_T may bet to be different according a logic design scheme of the delay circuit 272 and may be fixed once the logic design scheme of the delay circuit 272 is determined. In an embodiment, the delay time DELAY_T may be set to be equal to or greater than a second latency L2. At a fifth point in time "T5" when a certain time elapses from the fourth point in time "T4", the MAC command generator 270 may output the first MAC input latch signal MAC_L1 having a logic "low" level and the second MAC input latch signal MAC_L2 having a logic "high" level. The fifth point in time "T5" may be a moment when the delay time DELAY_T elapses from the third point in time "T3".

At a sixth point in time "T6" when a certain time, for example, a third latency L3 elapses from the fourth point in time "T4", the MAC arithmetic signal MAC having a logic "high" level may be inputted to the MAC command generator 270. In response to the MAC arithmetic signal MAC having a logic "high" level, the MAC command generator 270 may output the MAC output latch signal MAC_L3 having a logic "high" level, as described with reference to FIG. 5. Subsequently, at a seventh point in time "T7" when a certain time, for example, a fourth latency L4 elapses from the sixth point in time "T6", the result read signal READ_RST having a logic "high" level may be inputted to the MAC command generator 270. In response to the result read signal READ_RST having a logic "high" level, the MAC command generator 270 may output the MAC result latch signal MAC_L_RST having a logic "high" level, as described with reference to FIG. 5.

In order to perform the deterministic MAC arithmetic operation, moments when the internal command signals ACT_M, READ_M, MAC, and READ_RST generated by the command decoder 250 are inputted to the MAC command generator 270 may be fixed and moments when the MAC command signals RACTV, MAC_RD_BK0, MAC_RD_BK1, MAC_L1, MAC_L2, MAC_L3, and MAC_L_RST are outputted from the MAC command generator 270 in response to the internal command signals ACT_M, READ_M, MAC, and READ_RST may also be fixed. Thus, all of the first latency L1 between the first point in time "T1" and the second point in time "T2", the second latency L2 between the second point in time "T2" and the fourth point in time "T4", the third latency L3 between the fourth point in time "T4" and the sixth point in time "T6", and the fourth latency L4 between the sixth point in time "T6" and the seventh point in time "T7" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks BK0 and BK1 based on the first and second MAC read signals MAC_RD_BK0 and MAC_RD_BK1 and to input the first and second data DA1 and DA2 into the first MAC operator (MAC0) 220. The third latency L3 may be defined as a time it takes to latch the first and second data DA1 and DA2 in the first MAC operator (MAC0) 220 based on the first and second MAC input latch signals MAC_L1 and MAC_L2 and it takes the first MAC operator (MAC0) 220 to perform the MAC arithmetic operation of the first and second data. The fourth latency L4 may be defined as a time it takes to latch the output data in the first MAC operator (MAC0) 220 based on the MAC output latch signal MAC_L3.

Figure 7:
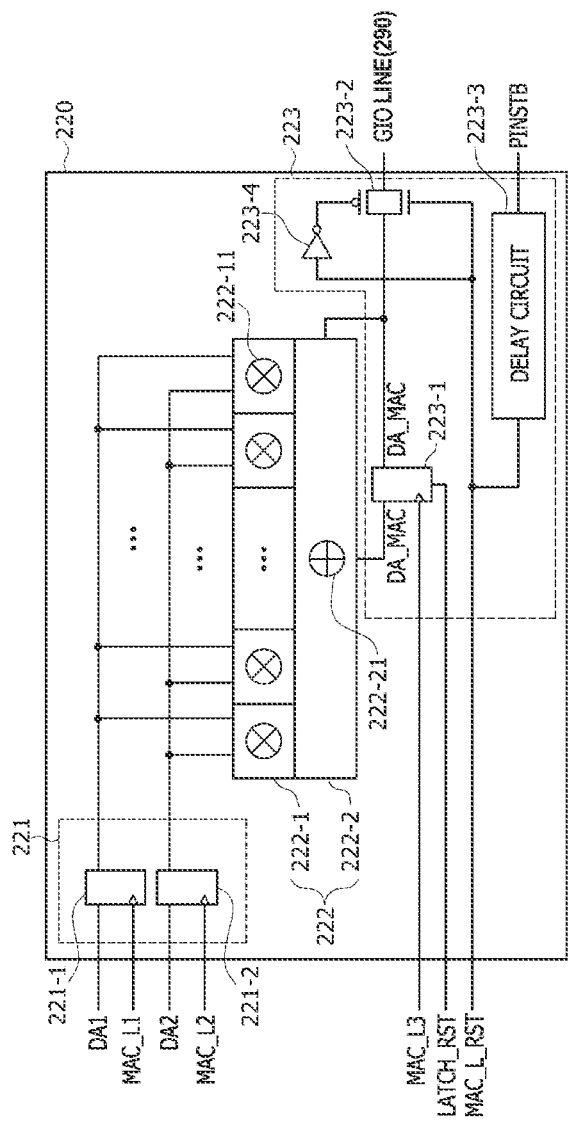
FIG. 7 illustrates an example of a configuration of a MAC operator included in the PIM device of FIG. 3.
Figure 8:
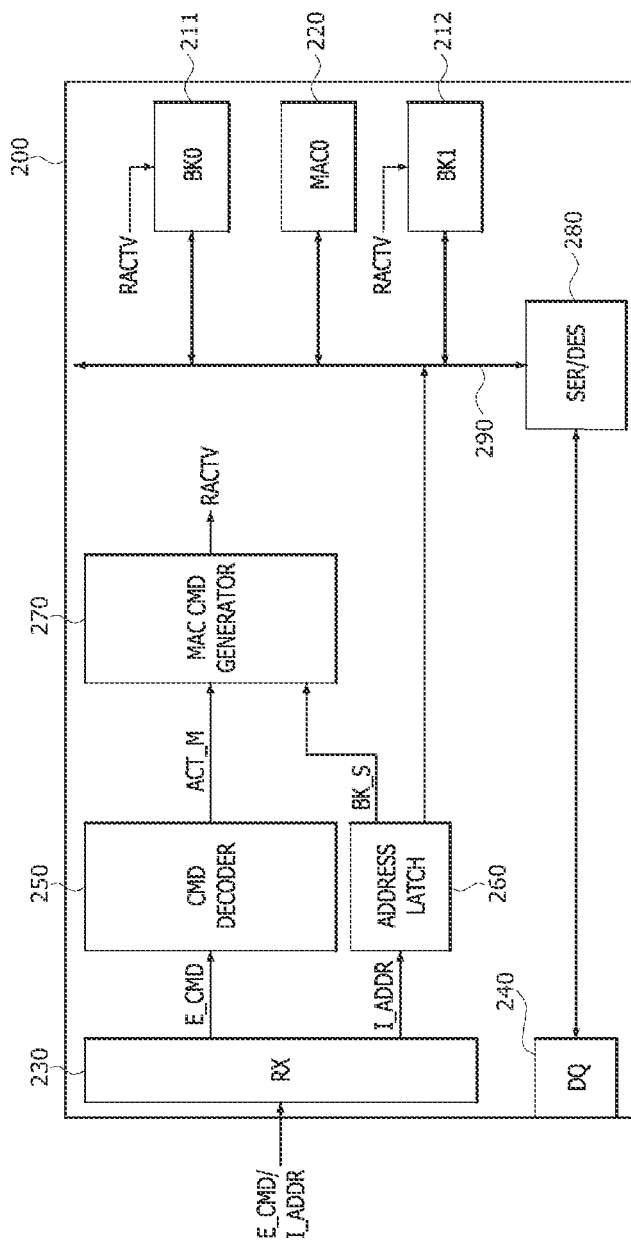
FIGS. 8 to 14 are block diagrams illustrating operations of the PIM device illustrated in FIG. 3.

FIG. 7 illustrates an example of a configuration of the first MAC operator (MAC0) 220 included in the PIM device 200 illustrated in FIG. 3. Referring to FIG. 7, the first MAC operator (MAC0) 220 may be configured to include a data input circuit 221, a MAC circuit 222, and a data output circuit 223. The data input circuit 221 may be configured to include a first input latch 221-1 and a second input latch 221-2. The MAC circuit 222 may be configured to include a multiplication logic circuit 222-1 and an addition logic circuit 222-2. The data output circuit 223 may be configured to include an output latch 223-1, a transfer gate 223-2, a delay circuit 223-3, and an inverter 223-4. In an embodiment, the first input latch 221-1, the second input latch 221-2, and the output latch 223-1 may be realized using flip-flops.

The data input circuit 221 of the first MAC operator (MAC0) 220 may be synchronized with the first and second MAC input latch signals MAC_L1 and MAC_L2 to receive and output the first and second data DA1 and DA2 inputted through the GIO line 290 to the MAC circuit 222. Specifically, the first data DA1 may be transmitted from the first memory bank BK0 (211 of FIG. 3) to the first input latch 221-1 of the data input circuit 221 through the GIO line 290, in response to the first MAC read signal MAC_RD_BK0 having a logic "high" level outputted from the MAC command generator (270 of FIG. 3). The second data DA2 may be transmitted from the second memory bank BK1 (212 of FIG. 2) to the second input latch 221-2 of the data input circuit 221 through the GIO line 290, in response to the second MAC read signal MAC_RD_BK1 having a logic "high" level outputted from the MAC command generator 270. The first input latch 221-1 may output the first data DA1 to the MAC circuit 222 in synchronization with the first MAC input latch signal MAC_L1 having a logic "high" level outputted from the MAC command generator 270 (270 of FIG. 3). The second input latch 221-2 may output the second data DA2 to the MAC circuit 222 in synchronization with the second MAC input latch signal MAC_L2 having a logic "high" level outputted from the MAC command generator (270 of FIG. 3). As described with reference to FIG. 5, the second MAC input latch signal MAC_L2 may be generated at a moment (corresponding to the fifth point in time "T5" of FIG. 6) when a certain time elapses from a moment (corresponding to the fourth point in time "T4" of FIG. 6) when the first MAC input latch signal MAC_L1 is generated. Thus, after the first data DA1 is inputted to the MAC circuit 222, the second data DA2 may then be inputted to the MAC circuit 222.

The MAC circuit 222 may perform a multiplying calculation and an accumulative adding calculation for the first and second data DA1 and DA2. The multiplication logic circuit 222-1 of the MAC circuit 222 may include a plurality of multipliers 222-11. Each of the plurality of multipliers 222-11 may perform a multiplying calculation of the first data DA1 outputted from the first input latch 221-1 and the second data DA2 outputted from the second input latch 221-2 and may output the result of the multiplying calculation. Bit values constituting the first data DA1 may be separately inputted to the multipliers 222-11. Similarly, bit values constituting the second data DA2 may also be separately inputted to the multipliers 222-11. For example, if each of the first and second data DA1 and DA2 is comprised of an 'N'-bit binary stream and the number of the multipliers 222-11 is 'M', the first data DA1 having 'N/M' bits and the second data DA2 having 'N/M' bits may be inputted to each of the multipliers 222-11. That is, each of the multipliers 222-11 may be configured to perform a multiplying calculation of first 'N/M'-bit data and second 'N/M'-bit data. Multiplication result data outputted from each of the multipliers 222-11 may have '2N/M' bits.

The addition logic circuit 222-2 of the MAC circuit 222 may include a plurality of adders 222-21. Although not shown in the drawings, the plurality of adders 222-21 may be disposed to provide a tree structure including a plurality of stages. Each of the adders 222-21 disposed at a first stage may receive two sets of multiplication result data from two of the multipliers 222-11 included in the multiplication logic circuit 222-1 and may perform an adding calculation of the two sets of multiplication result data to output addition result data. Each of the adders 222-21 disposed at a second stage may receive two sets of addition result data from two of the adders 222-21 disposed at the first stage and may perform an adding calculation of the two sets of addition result data to output addition result data. The adders 222-21 disposed at a last stage may receive two sets of addition result data from two adders 222-21 disposed at the previous stage and may perform an adding calculation of the two sets of addition result data to output the addition result data. The adders 222-21 constituting the addition logic circuit 222-2 may include an adder for performing an accumulative adding calculation of the addition result data outputted from the adder 222-21 disposed at the last stage and previous MAC result data stored in the output latch 223-1 of the data output circuit 223.

The data output circuit 223 may output MAC result data DA_MAC outputted from the MAC circuit 222 to the GIO line 290. Specifically, the output latch 223-1 of the data output circuit 223 may latch the MAC result data DA_MAC outputted from the MAC circuit 222 and may output the latched data of the MAC result data DA_MAC in synchronization with the MAC output latch signal MAC_L3 having a logic "high" level outputted from the MAC command generator (270 of FIG. 3). The MAC result data DA_MAC outputted from the output latch 223-1 may be fed back to the MAC circuit 222 for the accumulative adding calculation. In addition, the MAC result data DA_MAC may be inputted to the transfer gate 223-2, and the transfer gate 223-2 may output the MAC result data DA_MAC to the GIO line 290. The output latch 223-1 may be initialized if a latch reset signal LATCH_RST is inputted to the output latch 223-1. In such a case, all of data latched by the output latch 223-1 may be removed. In an embodiment, the latch reset signal LATCH_RST may be activated by generation of the MAC result latch signal MAC_L_RST having a logic "high" level and may be inputted to the output latch 223-1.

The MAC result latch signal MAC_L_RST outputted from the MAC command generator 270 may be inputted to the transfer gate 223-2, the delay circuit 223-3, and the inverter 223-4. The inverter 223-4 may inversely buffer the MAC result latch signal MAC_L_RST to output the inversely buffered signal of the MAC result latch signal MAC_L_RST to the transfer gate 223-2. The transfer gate 223-2 may transfer the MAC result data DA_MAC from the output latch 223-1 to the GIO line 290 in response to the MAC result latch signal MAC_L_RST having a logic "high" level. The delay circuit 223-3 may delay the MAC result latch signal MAC_L_RST by a certain time to generate and output a latch control signal PINSTB.

FIGS. 8 to 14 are block diagrams illustrating operations of the PIM device 200 illustrated in FIG. 3. In FIGS. 8 to 14, the same reference numerals or the same reference symbols as used in FIG. 3 denote the same elements. First, referring to FIG. 8, if the external command E_CMD requesting the MAC arithmetic operation and the input address I_ADDR are transmitted from an external device to the receiving driver 230, the receiving driver 230 may output the external command E_CMD and the input address I_ADDR to the command decoder 250 and the address latch 260, respectively. The command decoder 250 may decode the external command E_CMD to generate and transmit the memory active signal ACT_M to the MAC command generator 270. The address latch 260 receiving the input address I_ADDR may generate and transmit the bank selection signal BK_S to the MAC command generator 270. The MAC command generator 270 may generate and output the MAC active signal RACTV in response to the memory active signal ACT_M and the bank selection signal BK_S. The MAC active signal RACTV may be transmitted to the first memory bank (BK0) 211 and the second memory bank (BK1) 212. The first memory bank (BK0) 211 and the second memory bank (BK1) 212 may be activated by the MAC active signal RACTV.

Figure 9:
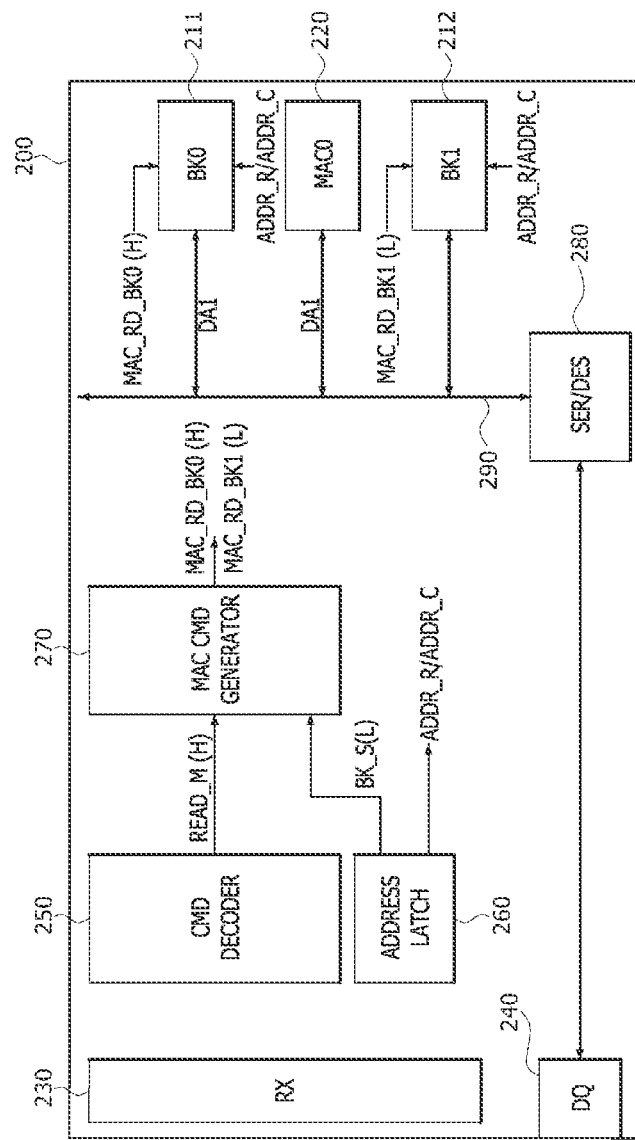

Next, referring to FIG. 9, the command decoder 250 may generate and output the memory read signal READ_M having a logic "high(H)" level to the MAC command generator 270. In addition, the address latch 260 may generate and output the bank selection signal BK_S having a logic "low(L)" level to the MAC command generator 270. In response to the memory read signal READ_M having a logic "high(H)" level and the bank selection signal BK_S having a logic "low(L)" level, the MAC command generator 270 may generate and output the first MAC read signal MAC_RD_BK0 having a logic "high(H)" level and the second MAC read signal MAC_RD_BK1 having a logic "low(L)" level, as described with reference to FIG. 4. The first MAC read signal MAC_RD_BK0 having a logic "high (H)" level, together with the row/column address ADDR_R/ADDR_C, may be transmitted to the first memory bank (BK0) 211. The second MAC read signal MAC_RD_BK1 having a logic "low(L)" level, together with the row/column address ADDR_R/ADDR_C, may be transmitted to the second memory bank (BK1) 212. The first data DA1 may be read out of the first memory bank (BK0) 211 by the first MAC read signal MAC_RD_BK0 having a logic "high(H)" level and may be transmitted to the first MAC operator (MAC0) 220 through the GIO line 290.

Figure 10:
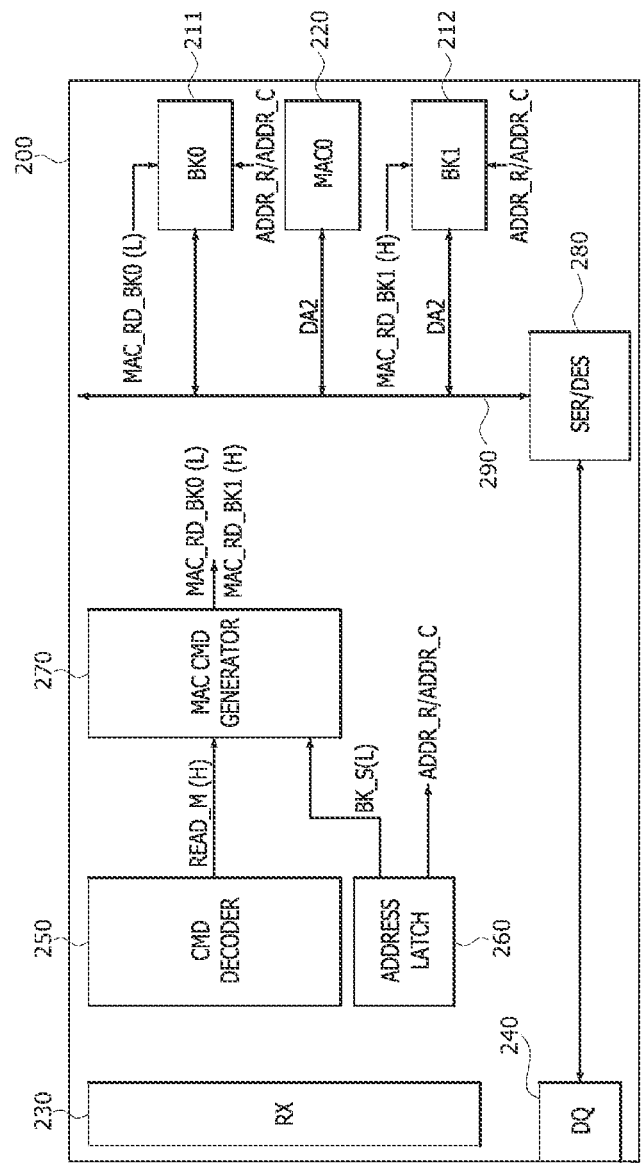

Next, referring to FIG. 10, a logic level of the bank selection signal BK_S may change from a logic "low(L)" level into a logic "high(H)" level while the memory read signal READ_M maintains a logic "high(H)" level. In such a case, as described with reference to FIG. 5, the MAC command generator 270 may generate and output the first MAC read signal MAC_RD_BK0 having a logic "low(L)" level and the second MAC read signal MAC_RD_BK1 having a logic "high(H)" level. The first MAC read signal MAC_RD_BK0 having a logic "low(L)" level, together with the row/column address ADDR_R/ADDR_C, may be transmitted to the first memory bank (BK0) 211. The second MAC read signal MAC_RD_BK1 having a logic "high(H)" level, together with the row/column address ADDR_R/ADDR_C, may be transmitted to the second memory bank (BK1) 212. The second data DA2 may be read out of the second memory bank (BK1) 212 by the second MAC read signal MAC_RD_BK1 having a logic "high(H)" level and may be transmitted to the first MAC operator (MAC0) 220 through the GIO line 290.

Figure 11:
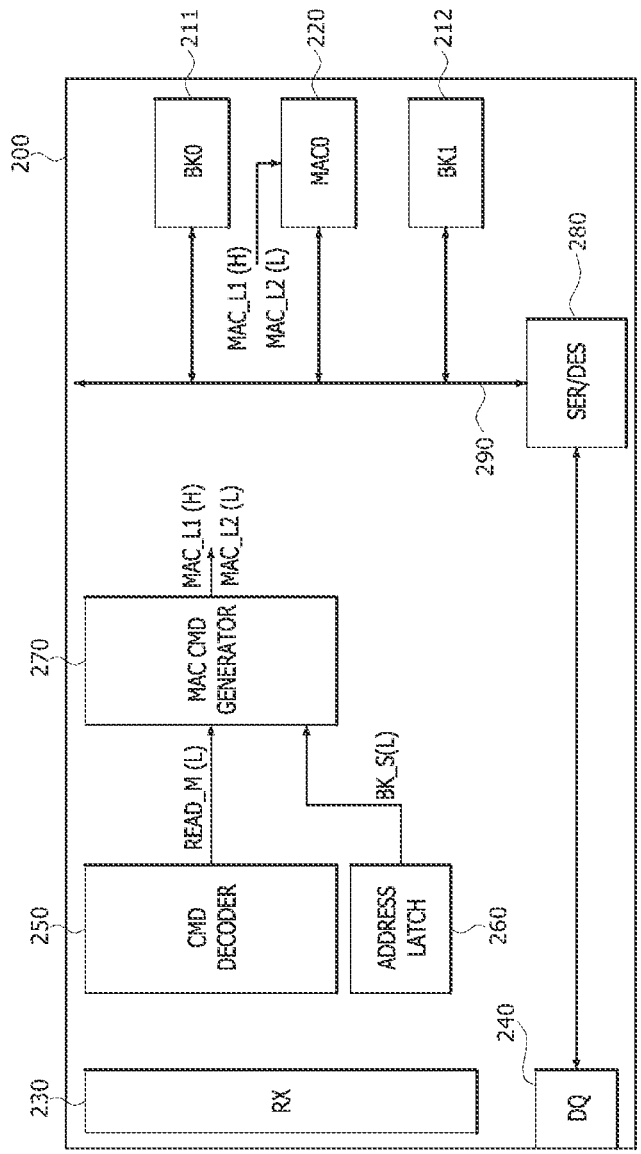

Next, referring to FIG. 11, a logic level of the memory read signal READ_M transmitted from the command decoder 250 to the MAC command generator 270 may change from a logic "high(H)" level into a logic "low(L)" level. In addition, a logic level of the bank selection signal BK_S transmitted from the address latch 260 to the MAC command generator 270 may change from a logic "high(H)" level into a logic "low(L)" level. In such a case, the MAC command generator 270 may generate and output the first MAC input latch signal MAC_L1 having a logic "high(H)" level and the second MAC input latch signal MAC_L2 having a logic "low(L)" level. A point in time when the first MAC input latch signal MAC_L1 having a logic "high(H)" level and the second MAC input latch signal MAC_L2 having a logic "low(L)" level are outputted from the MAC command generator 270 may be determined by a delay time of the delay circuit (271 of FIG. 4), as described with reference to FIG. 5. The first MAC input latch signal MAC_L1 having a logic "high(H)" level and the second MAC input latch signal MAC_L2 having a logic "low(L)" level outputted from the MAC command generator 270 may be transmitted to the first MAC operator (MAC0) 220. As described with reference to FIG. 7, the first MAC operator (MAC0) 220 may perform a latch operation of the first data DA1.

Figure 12:
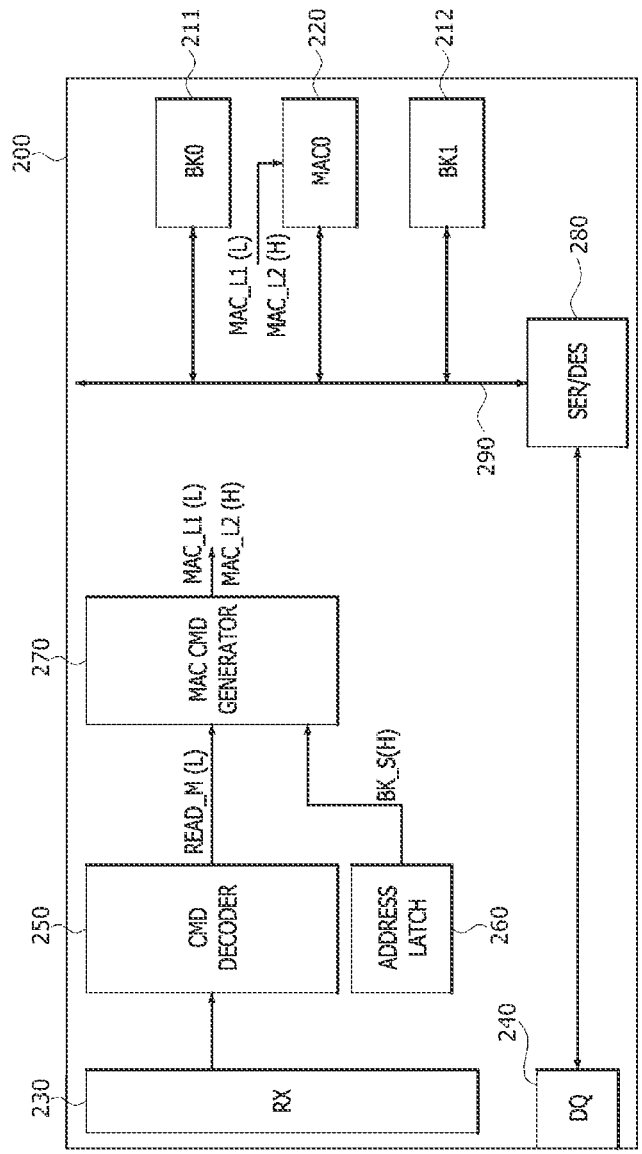

Next, referring to FIG. 12, a logic level of the bank selection signal BK_S transmitted from the address latch 260 to the MAC command generator 270 may change from a logic "low(L)" level into a logic "high(H)" level while the memory read signal READ_M maintains a logic "low(L)" level. In such a case, the MAC command generator 270 may generate and output the first MAC input latch signal MAC_L1 having a logic "low(L)" level and the second MAC input latch signal MAC_L2 having a logic "high(H)" level. A point in time when the first MAC input latch signal MAC_L1 having a logic "low(L)" level and the second MAC input latch signal MAC_L2 having a logic "high(H)" level are outputted from the MAC command generator 270 may be determined by a delay time of the delay circuit (271 of FIG. 5), as described with reference to FIG. 5. The first MAC input latch signal MAC_L1 having a logic "low(L)" level and the second MAC input latch signal MAC_L2 having a logic "high(H)" level outputted from the MAC command generator 270 may be transmitted to the first MAC operator (MAC0) 220. As described with reference to FIG. 7, the first MAC operator (MAC0) 220 may perform a latch operation of the second data DA2. After the latch operations of the first and second data DA1 and DA2 terminate, the first MAC operator (MAC0) 220 may perform the MAC arithmetic operation and may generate the MAC result data DA_MAC. The MAC result data DA_MAC generated by the first MAC operator (MAC0) 220 may be inputted to the output latch 223-1 included in the first MAC operator (MAC0) 220.

Figure 13:
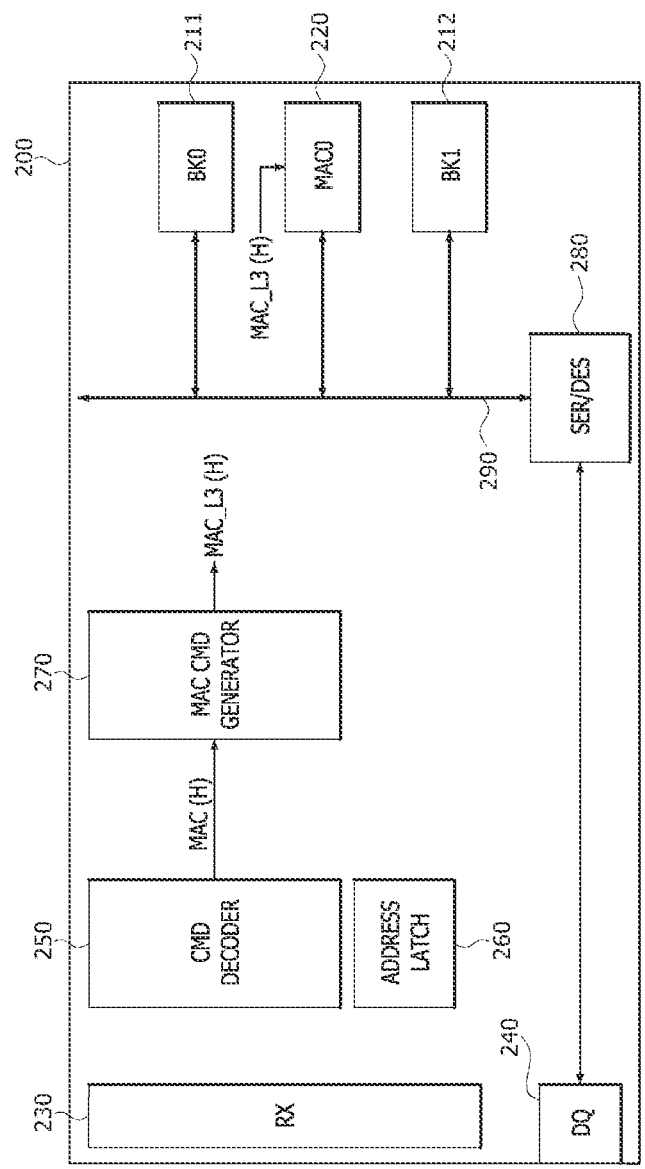

Next, referring to FIG. 13, the command decoder 250 may output and transmit the MAC arithmetic signal MAC having a logic "high(H)" level to the MAC command generator 270. The MAC command generator 270 may generate and output the MAC output latch signal MAC_L3 having a logic "high" level in response to the MAC arithmetic signal MAC having a logic "high(H)" level. The MAC output latch signal MAC_L3 having a logic "high" level may be transmitted to the first MAC operator (MAC0) 220. As described with reference to FIG. 7, the output latch (223-1 of FIG. 7) of the first MAC operator (MAC0) 220 may be synchronized with the MAC output latch signal MAC_L3 having a logic "high" level to transfer the MAC result data DA_MAC outputted from the MAC circuit 222 of the first MAC operator (MAC0) 220 to the transfer gate (233-2 of FIG. 7) of the first MAC operator (MAC0) 220. The MAC result data DA_MAC outputted from the output latch (223-1 of FIG. 7) may be fed back to the addition logic circuit (222-2 of FIG. 7) for the accumulative adding calculation.

Figure 14:
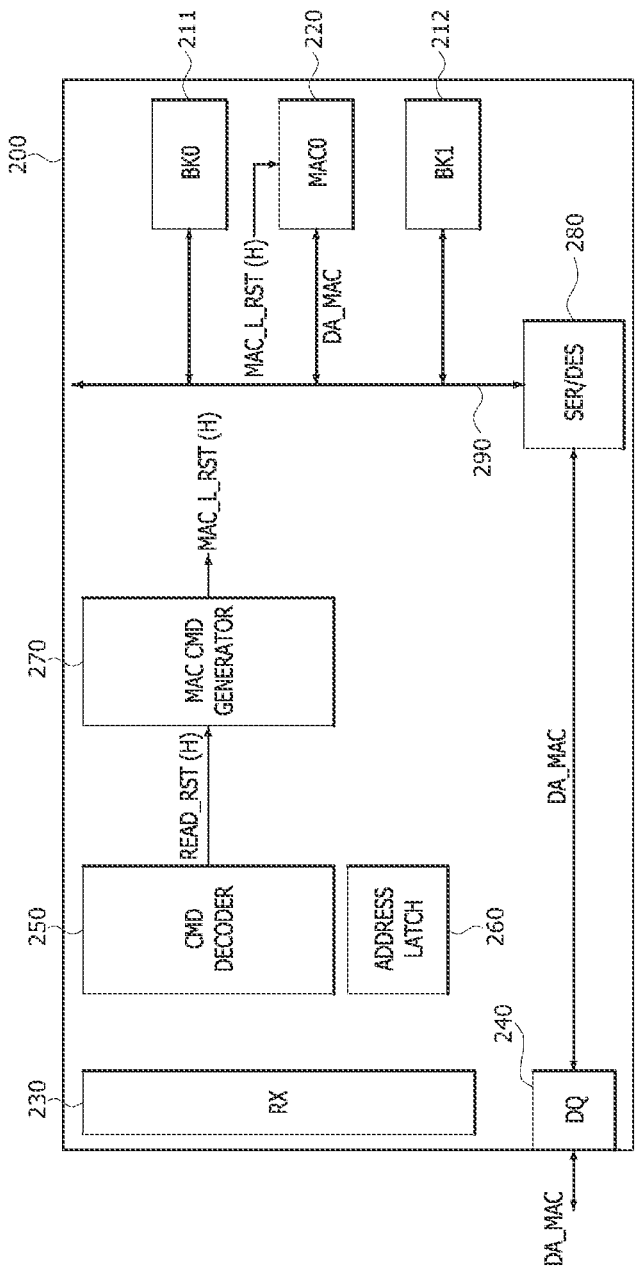

Next, referring to FIG. 14, the command decoder 250 may output and transmit the result read signal READ_RST having a logic "high(H)" level to the MAC command generator 270. The MAC command generator 270 may generate and output the MAC result latch signal MAC_L_RST having a logic "high" level in response to the result read signal READ_RST having a logic "high(H)" level. The MAC result latch signal MAC_L_RST having a logic "high" level may be transmitted to the first MAC operator (MAC0) 220. As described with reference to FIG. 7, the first MAC operator (MAC0) 220 may output the MAC result data DA_MAC to the GIO line 290 in response to the MAC result latch signal MAC_L_RST having a logic "high" level and may also reset the output latch (223-1 of FIG. 6) included in the first MAC operator (MAC0) 220 in response to the MAC result latch signal MAC_L_RST having a logic "high" level. The MAC result data DA_MAC transmitted to the GIO line 290 may be outputted to an external device through the serializer/deserializer 280 and the data I/O circuit 240.

Figure 15:
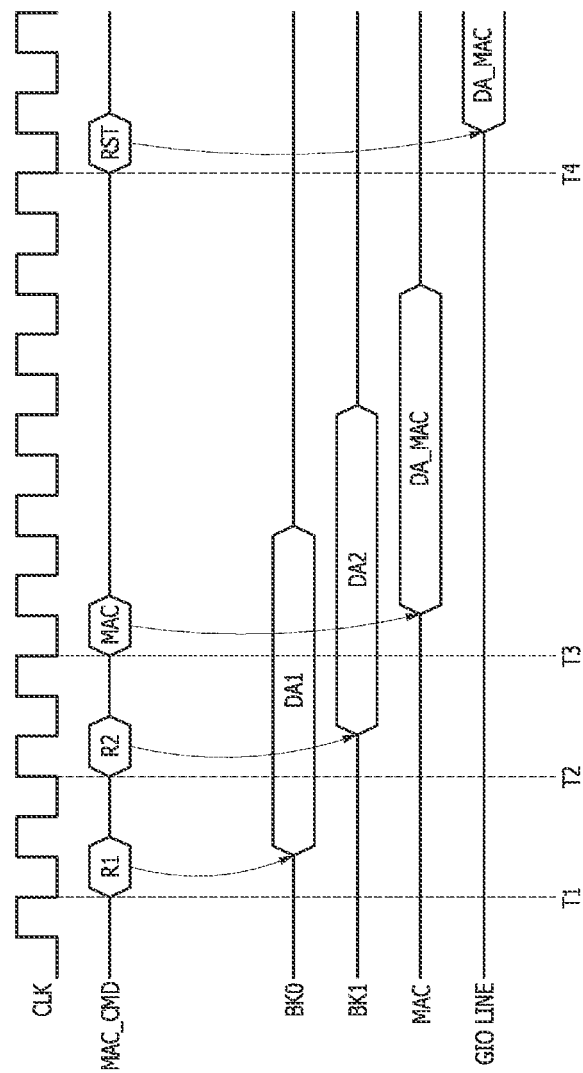
FIG. 15 is a timing diagram illustrating an operation of the PIM device illustrated in FIG. 3.

FIG. 15 is a timing diagram illustrating an operation of the PIM device 200 illustrate in FIG. 3. Referring to FIG. 15, at a first point in time "T1", the MAC command generator 270 may be synchronized with a falling edge of a clock signal CLK to generate and output the first MAC read signal MAC_RD_BK0 (R1) having a logic "high(H)" level. The first memory bank (BK0) 211 may be selected by the first MAC read signal MAC_RD_BK0 (R1) having a logic "high(H)" level so that the first data DA1 are read out of the first memory bank (BK0) 211. At a second point in time "T2", the MAC command generator 270 may be synchronized with a falling edge of the clock signal CLK to generate and output the second MAC read signal MAC_RD_BK1 (R2) having a logic "high(H)" level. The second memory bank (BK1) 212 may be selected by the second MAC read signal MAC_RD_BK1 (R2) having a logic "high(H)" level so that the second data DA2 are read out of the second memory bank (BK1) 212. At a third point in time "T3", the MAC command generator 270 may be synchronized with a falling edge of the clock signal CLK to generate and output the MAC arithmetic signal MAC having a logic "high(H)" level. The first MAC operator (MAC0) 220 may perform the multiplying calculations and the adding calculations of the first and second data DA1 and DA2 to generate the MAC result data DA_MAC, in response to the MAC arithmetic signal MAC having a logic "high(H)" level. At a fourth point in time "T4", the MAC command generator 270 may be synchronized with a falling edge of the clock signal CLK to generate and output the MAC result latch signal MAC_L_RST (RST) having a logic "high" level. The MAC result data DA_MAC generated by the first MAC operator (MAC0) 220 may be transmitted to the GIO line 290 by the MAC result latch signal MAC_L_RST (RST) having a logic "high" level.

Figure 16:
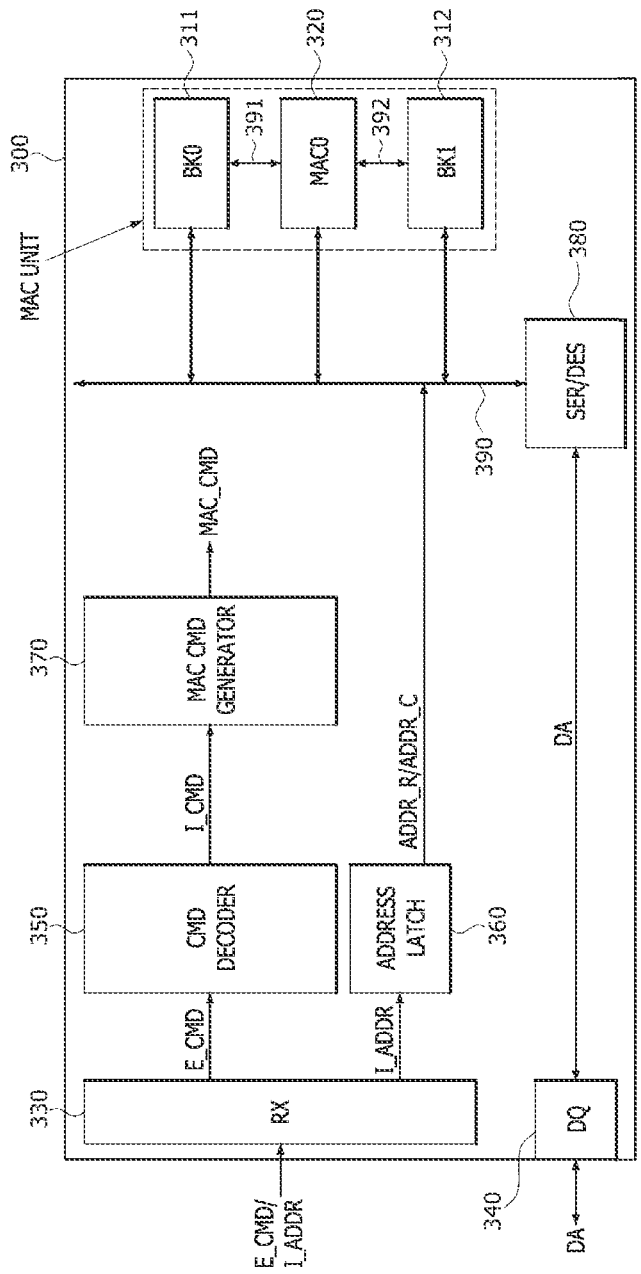
FIG. 16 is a block diagram illustrating another configuration of a PIM device according to the first embodiment of the present disclosure.
Figure 17:
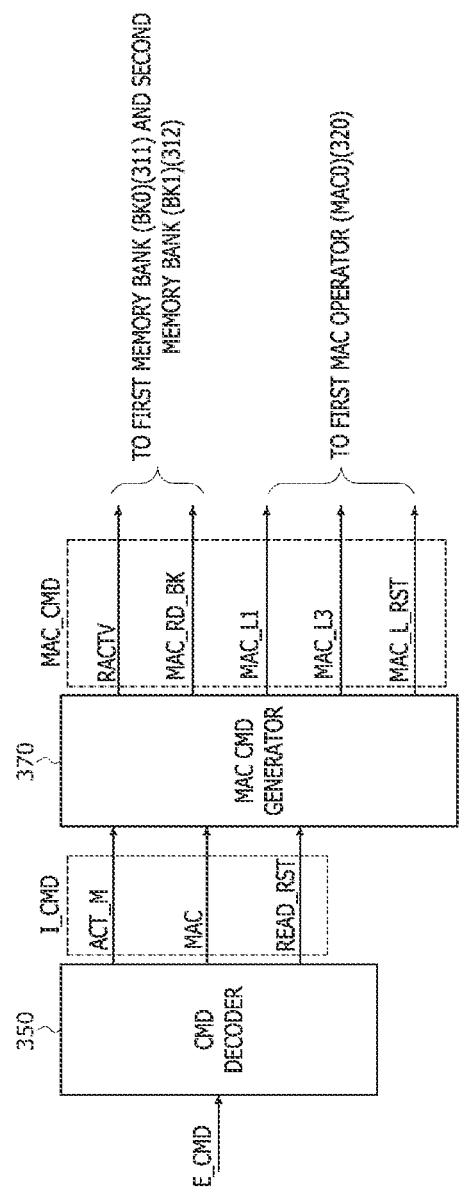
FIG. 17 illustrates internal command signals outputted from a command decoder and MAC command signals outputted from a MAC command generator in the PIM device of FIG. 16.

FIG. 16 is a block diagram illustrating another configuration of a PIM device 300 according to an embodiment of the present disclosure, and FIG. 17 illustrates an internal command signal I_CMD outputted from a command decoder 350 of the PIM device 300 and a MAC command signal MAC_CMD outputted from a MAC command generator 370 of the PIM device 300. FIG. 16 illustrates only a first memory bank (BK0) 311, a second memory bank (BK1) 312, and a first MAC operator (MAC0) 320 constituting a first MAC unit among the plurality of MAC units. However, FIG. 16 illustrates merely an example for simplification of the drawing. Accordingly, the following description for the first MAC unit may be equally applicable to the remaining MAC units.

Referring to FIG. 16, the PIM device 300 may be configured to include the first memory bank (BK0) 311, the second memory bank (BK1) 312, and the first MAC operator (MAC0) 320. The PIM device 300 according to the present embodiment may include a GIO line 390, a first bank input/output (BIO) line 391, and a second BIO line 392 acting as data transmission lines. Data communication of the first memory bank (BK0) 311, the second memory bank (BK1) 312, and the first MAC operator (MAC0) 320 may be achieved through the GIO line 390. Only the data transmission between the first memory bank (BK0) 311 and the first MAC operator (MAC0) 320 may be achieved through the first BIO line 391, and only the data transmission between the second memory bank (BK1) 312 and the first MAC operator (MAC0) 320 may be achieved through the second BIO line 392. Thus, the first MAC operator (MAC0) 320 may directly receive first data and second data from the first and second memory banks (BK0 and BK1) 311 and 312 through the first BIO line 391 and the second BIO line 392 without using the GIO line 390.

The PIM device 300 may further include a receiving driver (RX) 330, a data I/O circuit (DQ) 340, the command decoder 350, an address latch 360, the MAC command generator 370, and a serializer/deserializer (SER/DES) 380. The command decoder 350, the address latch 360, the MAC command generator 370, and the serializer/deserializer 380 may be disposed in the peripheral circuit PERI of the PIM device 100 illustrated in FIG. 2. The receiving driver 330 may receive an external command E_CMD and an input address I_ADDR from an external device. The external device may denote a host or a controller coupled to the PIM device 300. Hereinafter, it may be assumed that the external command E_CMD transmitted to the PIM device 300 is a command requesting the MAC arithmetic operation. That is, the PIM device 300 may perform the deterministic MAC arithmetic operation in response to the external command E_CMD. The data I/O circuit 340 may include a data I/O pad. The data I/O pad may be coupled with an data I/O line. The PIM device 300 communicates with the external device through the data I/O circuit 340.

The receiving driver 330 may separately output the external command E_CMD and the input address I_ADDR received from the external device. Data DA inputted to the PIM device 300 through the data I/O circuit 340 may be processed by the serializer/deserializer 380 and may be transmitted to the first memory bank (BK0) 311 and the second memory bank (BK1) 312 through the GIO line 390 of the PIM device 300. The data DA outputted from the first memory bank (BK0) 311, the second memory bank (BK1) 312, and the first MAC operator (MAC0) 320 through the GIO line 390 may be processed by the serializer/deserializer 380 and may be outputted to the external device through the data I/O circuit 340. The serializer/deserializer 380 may convert the data DA into parallel data if the data DA are serial data or may convert the data DA into serial data if the data DA are parallel data. For the data conversion, the serializer/deserializer 380 may include a serializer for converting parallel data into serial data and a deserializer for converting serial data into parallel data.

The command decoder 350 may decode the external command E_CMD outputted from the receiving driver 330 to generate and output the internal command signal I_CMD. As illustrated in FIG. 17, the internal command signal I_CMD outputted from the command decoder 350 may include first to third internal command signals. In an embodiment, the first internal command signal may be a memory active signal ACT_M, the second internal command signal may be a MAC arithmetic signal MAC, and the third internal command signal may be a result read signal READ_RST. The first to third internal command signals outputted from the command decoder 350 may be sequentially inputted to the MAC command generator 370.

In order to perform the deterministic MAC arithmetic operation of the PIM device 300, the memory active signal ACT_M, the MAC arithmetic signal MAC, and the result read signal READ_RST outputted from the command decoder 350 may be sequentially generated at predetermined points in time (or clocks). In an embodiment, the memory active signal ACT_M, the MAC arithmetic signal MAC, and the result read signal READ_RST may have predetermined latencies, respectively. For example, the MAC arithmetic signal MAC may be generated after a first latency elapses from a point in time when the memory active signal ACT_M is generated, and the result read signal READ_RST may be generated after a third latency elapses from a point in time when the MAC arithmetic signal MAC is generated. No signal is generated by the command decoder 350 until a fourth latency elapses from a point in time when the result read signal READ_RST is generated. The first to fourth latencies may be predetermined and fixed. Thus, the host or the controller outputting the external command E_CMD may predict the points in time when the first to third internal command signals constituting the internal command signal I_CMD are generated by the command decoder 350 in advance at a point in time when the external command E_CMD is outputted from the host or the controller. That is, the host or the controller may predict a point in time (or a clock) when the MAC arithmetic operation terminates in the PIM device 300 after the external command E_CMD requesting the MAC arithmetic operation is transmitted from the host or the controller to the PIM device 300, even without receiving any signals from the PIM device 300.

The address latch 360 may convert the input address I_ADDR outputted from the receiving driver 330 into a row/column address ADDR_R/ADDR_C to output the row/column address ADDR_R/ADDR_C. The row/column address ADDR_R/ADDR_C outputted from the address latch 360 may be transmitted to the first and second memory banks 311 and 312. According to the present embodiment, the first data and the second data to be used for the MAC arithmetic operation may be simultaneously read out of the first and second memory banks (BK0 and BK1) 311 and 312, respectively. Thus, it may be unnecessary to generate a bank selection signal for selecting any one of the first and second memory banks 311 and 312. In an embodiment, a point in time when the row/column address ADDR_R/ADDR_C is inputted to the first and second memory banks 311 and 312 may be a point in time when a MAC command (i.e., the MAC arithmetic signal MAC) requesting a data read operation for the first and second memory banks 311 and 312 for the MAC arithmetic operation is generated.

The MAC command generator 370 may output the MAC command signal MAC_CMD in response to the internal command signal I_CMD outputted from the command decoder 350. As illustrated in FIG. 16, the MAC command signal MAC_CMD outputted from the MAC command generator 370 may include first to fifth MAC command signals. In an embodiment, the first MAC command signal may be a MAC active signal RACTV, the second MAC command signal may be a MAC read signal MAC_RD_BK, the third MAC command signal may be a MAC input latch signal MAC_L1, the fourth MAC command signal may be a MAC output latch signal MAC_L3, and the fifth MAC command signal may be a MAC result latch signal MAC_L_RST.

The MAC active signal RACTV may be generated based on the memory active signal ACT_M outputted from the command decoder 350. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC outputted from the command decoder 350. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST outputted from the command decoder 350.

The MAC active signal RACTV outputted from the MAC command generator 370 may control an activation operation for the first and second memory banks 311 and 312. The MAC read signal MAC_RD_BK outputted from the MAC command generator 370 may control a data read operation for the first and second memory banks 311 and 312. The MAC input latch signal MAC_L1 outputted from the MAC command generator 370 may control an input data latch operation of the first MAC operator (MAC0) 320. The MAC output latch signal MAC_L3 outputted from the MAC command generator 370 may control an output data latch operation of the first MAC operator (MAC0) 320. The MAC result latch signal MAC_L_RST outputted from the MAC command generator 370 may control an output operation of MAC result data of the first MAC operator (MAC0) 320 and a reset operation of the first MAC operator (MAC0) 320.

As described above, in order to perform the deterministic MAC arithmetic operation of the PIM device 300, the memory active signal ACT_M, the MAC arithmetic signal MAC, and the result read signal READ_RST outputted from the command decoder 350 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and outputted from the MAC command generator 370 at predetermined points in time after the external command E_CMD is inputted to the PIM device 300, respectively. That is, a time period from a point in time when the first and second memory banks 311 and 312 are activated by the MAC active signal RACTV until a point in time when the first MAC operator (MAC0) 320 is reset by the MAC result latch signal MAC_L_RST may be predetermined.

Figure 18:
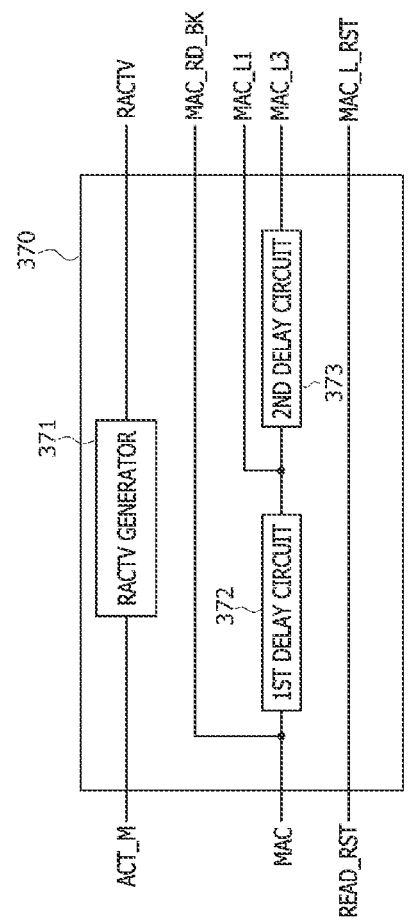
FIG. 18 illustrates an example of a configuration of a MAC command generator included in the PIM device of FIG. 16.

FIG. 18 illustrates an example of a configuration of the MAC command generator 370 included in the PIM device 300 illustrated in FIG. 16. Referring to FIG. 18, the MAC command generator 370 may sequentially receive the memory active signal ACT_M, the MAC arithmetic signal MAC, and the result read signal READ_RST from the command decoder 350. In addition, the MAC command generator 370 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be outputted in series with certain time intervals.

In an embodiment, the MAC command generator 370 may be configured to include an active signal generator 371, a first delay circuit 372, and a second delay circuit 373. The active signal generator 371 may receive the memory active signal ACT_M to generate and output the MAC active signal RACTV. The MAC active signal RACTV outputted from the active signal generator 371 may be transmitted to the first and second memory banks 311 and 312 to activate the first and second memory banks 311 and 312. The MAC command generator 370 may receive the MAC arithmetic signal MAC outputted from the command decoder 350 to output the MAC arithmetic signal MAC as the MAC read signal MAC_RD_BK. The first delay circuit 372 may receive the MAC arithmetic signal MAC and may delay the MAC arithmetic signal MAC by a first delay time DELAY_T1 to generate and output the MAC input latch signal MAC_L1. The second delay circuit 373 may receive an output signal of the first delay circuit 372 and may delay the output signal of the first delay circuit 372 by a second delay time DELAY_T2 to generate and output the MAC output latch signal MAC_L3. The MAC command generator 370 may generate the MAC result latch signal MAC_L_RST in response to the result read signal READ_RST outputted from the command decoder 350.

The MAC command generator 370 may generate and output the MAC active signal RACTV in response to the memory active signal ACT_M outputted from the command decoder 350. Subsequently, the MAC command generator 370 may generate and output the MAC read signal MAC_RD_BK in response to the MAC arithmetic signal MAC outputted from the command decoder 350. The MAC arithmetic signal MAC may be inputted to the first delay circuit 372. The MAC command generator 370 may delay the MAC arithmetic signal MAC by a certain time determined by the first delay circuit 372 to generate and output an output signal of the first delay circuit 372 as the MAC input latch signal MAC_L1. The output signal of the first delay circuit 372 may be inputted to the second delay circuit 373. The MAC command generator 370 may delay the MAC input latch signal MAC_L1 by a certain time determined by the second delay circuit 373 to generate and output an output signal of the second delay circuit 373 as the MAC output latch signal MAC_L3. Subsequently, the MAC command generator 370 may generate and output the MAC result latch signal MAC_L_RST in response to the result read signal READ_RST outputted from the command decoder 350.

Figure 19:
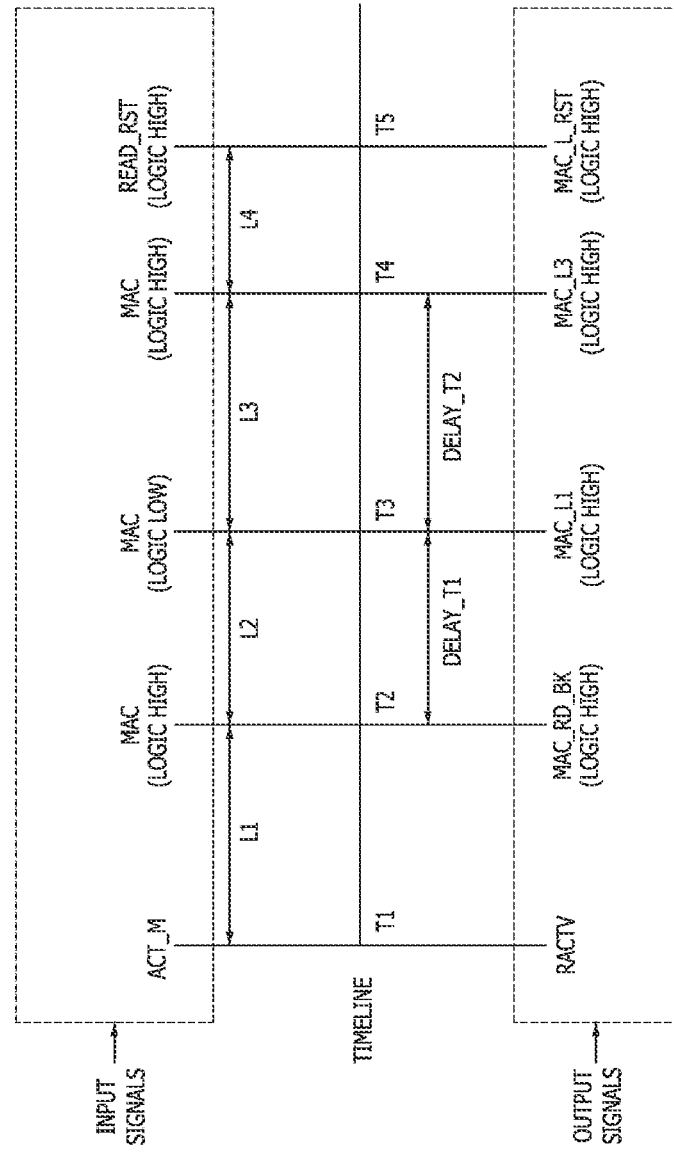
FIG. 19 illustrates input signals and output signals of the MAC command generator illustrated in FIG. 18 with a timeline.

FIG. 19 illustrates input signals and output signals of the MAC command generator 370 illustrated in FIG. 18 with a timeline. In FIG. 19, signals transmitted from the command decoder 350 to the MAC command generator 370 are illustrated in an upper dotted line box, and signals outputted from the MAC command generator 370 are illustrated in a lower dotted line box. Referring to FIGS. 18 and 19, at a first point in time "T1" of the timeline, the memory active signal ACT_M may be inputted to the MAC command generator 370 and the MAC command generator 370 may output the MAC active signal RACTV. At a second point in time "T2" when a certain time, for example, a first latency L1 elapses from the first point in time "T1", the MAC arithmetic signal MAC having a logic "high" level may be inputted to the MAC command generator 370. In response to the MAC arithmetic signal MAC having a logic "high" level, the MAC command generator 370 may output the MAC read signal MAC_RD_BK having a logic "high" level. At a third point in time "T3" when a certain time elapses from the second point in time "T2", a logic level of the MAC arithmetic signal MAC may change from a logic "high" level into a logic "low" level.

At the third point in time "T3" when the first delay time DELAY_T1 elapses from the second point in time "T2", the MAC command generator 370 may output the MAC input latch signal MAC_L1 having a logic "high" level. The first delay time DELAY_T1 may correspond to a delay time determined by the first delay circuit 372 illustrated in FIG. 18. The first delay time DELAY_T1 may be set to be different according to a logic design scheme of the first delay circuit 372. In an embodiment, the first delay time DELAY_T1 may be set to be equal to or greater than a second latency L2. At a fourth point in time "T4" when a certain time elapses from the third point in time "T3", the MAC command generator 370 may output the MAC output latch signal MAC_L3 having a logic "high" level. The fourth point in time "T4" may be a moment when the second delay time DELAY_T2 elapses from the third point in time "T3". The second delay time DELAY_T2 may correspond to a delay time determined by the second delay circuit 373 illustrated in FIG. 18. The second delay time DELAY_T2 may be set to be different according to a logic design scheme of the second delay circuit 373. In an embodiment, the second delay time DELAY_T2 may be set to be equal to or greater than a third latency L3. At a fifth point in time "T5" when a certain time, for example, a fourth L4 elapses from the fourth point in time "T4", the result read signal READ_RST having a logic "high" level may be inputted to the MAC command generator 370. In response to the result read signal READ_RST having a logic "high" level, the MAC command generator 370 may output the MAC result latch signal MAC_L_RST having a logic "high" level, as described with reference to FIG. 18.

In order to perform the deterministic MAC arithmetic operation, moments when the internal command signals ACT_M, MAC, and READ_RST generated by the command decoder 350 are inputted to the MAC command generator 370 may be fixed and moments when the MAC command signals RACTV, MAC_RD_BK, MAC_L1, MAC_L3, and MAC_L_RST are outputted from the MAC command generator 370 in response to the internal command signals ACT_M, MAC, and READ_RST may also be fixed. Thus, all of the first latency L1 between the first point in time "T1" and the second point in time "T2", the second latency L2 between the second point in time "T2" and the third point in time "T3", the third latency L3 between the third point in time "T3" and the fourth point in time "T4", and the fourth latency L4 between the fourth point in time "T4" and the fifth point in time "T5" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks (BK0 and BK1) 311 and 312 based on the MAC read signals MAC_RD_BK and to input the first and second data DA1 and DA2 into the first MAC operator (MAC0) 320. The third latency L3 may be defined as a time it takes to latch the first and second data DA1 and DA2 in the first MAC operator (MAC0) 320 based on the MAC input latch signals MAC_L1 and it takes the first MAC operator (MAC0) 320 to perform the MAC arithmetic operation of the first and second data. The fourth latency L4 may be defined as a time it takes to latch the output data in the first MAC operator (MAC0) 320 based on the MAC output latch signal MAC_L3.

Figure 20:
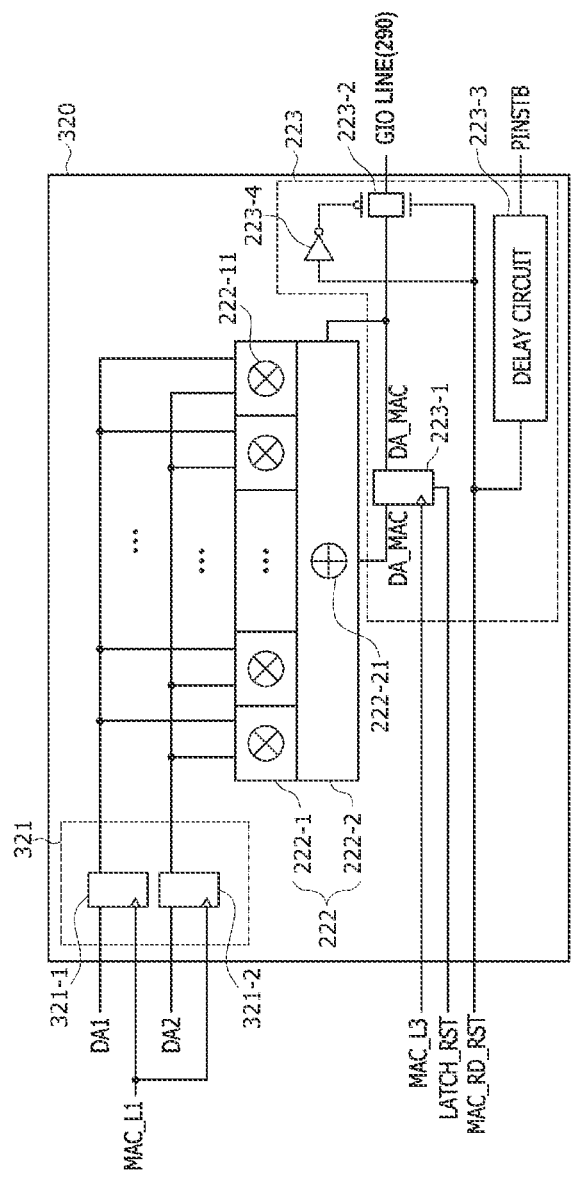
FIG. 20 illustrates an example of a configuration of a MAC operator included in the PIM device of FIG. 16.
Figure 21:
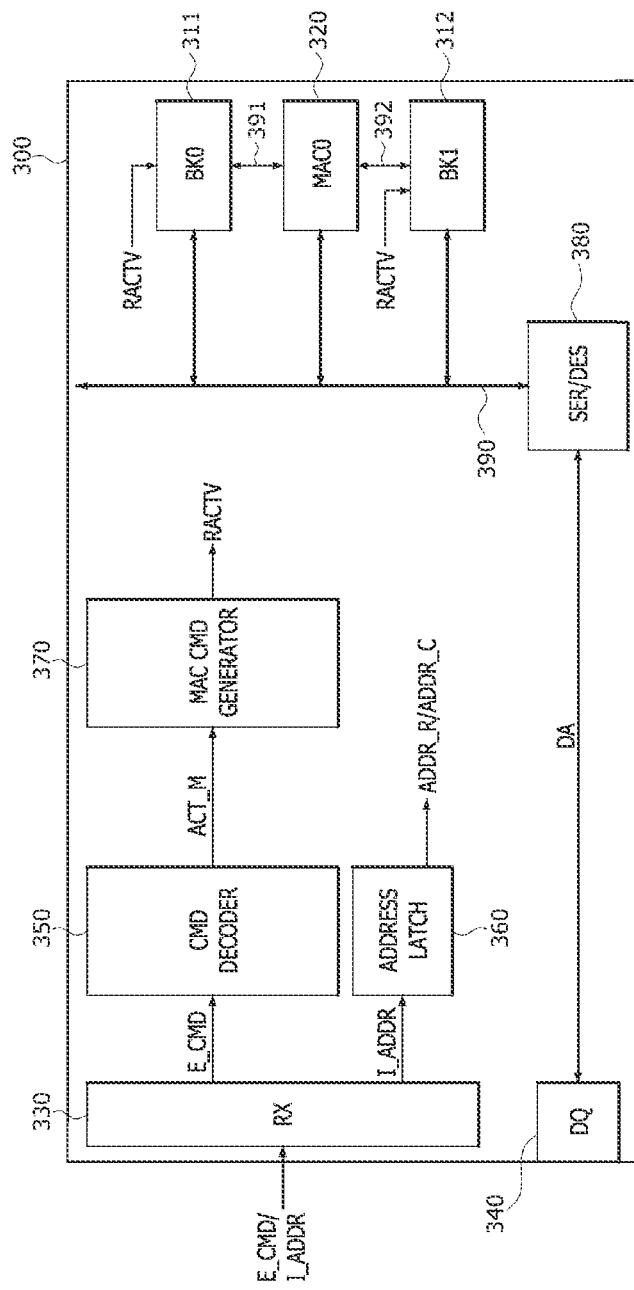
FIGS. 21 to 25 are block diagrams illustrating operations of the PIM device illustrated in FIG. 16.

FIG. 20 illustrates an example of a configuration of the first MAC operator (MAC0) 320 included in the PIM device 300 of FIG. 16. The first MAC operator (MAC0) 320 included in the PIM device 300 may have the same configuration as the first MAC operator (MAC0) 220 described with reference to FIG. 7 except for a signal applied to clock terminals of first and second input latches 321-1 and 321-2 constituting a data input circuit 321. Thus, in FIG. 20, the same reference numerals or the same reference symbols as used in FIG. 7 denote the same elements, and descriptions of the same elements as set forth with reference to FIG. 7 will be omitted hereinafter.

Describing in detail the differences between the first MAC operator (MAC0) 220 and the first MAC operator (MAC0) 320, in case of the first MAC operator (MAC0) 220 illustrated in FIG. 7, the first input latch (221-1 of FIG. 7) and the second input latch (221-2 of FIG. 7) of the data input circuit (221 of FIG. 7) may be synchronized with the first and second MAC input latch signals MAC_L1 and MAC_L2, respectively, sequentially generated with a certain time interval to output the first data DA1 and the second data DA2. In contrast, in case of the first MAC operator (MAC0) 320, the MAC input latch signal MAC_L1 may be inputted to both of the clock terminals of the first and second input latches 321-1 and 321-2 constituting a data input circuit 321. Thus, both of the first and second input latches 321-1 and 321-2 may be synchronized with the MAC input latch signal MAC_L1 to output the first data DA1 and the second data DA2, respectively. Accordingly, the first MAC operator (MAC0) 320 may transmit the first and second data DA1 and DA2 to the MAC circuit 222 in parallel without any time interval between the first and second data DA1 and DA2. As a result, the MAC arithmetic operation of the MAC circuit 222 may be quickly performed without any delay of data input time.

FIGS. 21 to 25 are block diagrams illustrating operations of the PIM device 300 illustrated in FIG. 16. In FIGS. 21 to 25, the same reference numerals or the same reference symbols as used in FIG. 16 denote the same elements. First, referring to FIG. 21, if the external command E_CMD requesting the MAC arithmetic operation and the input address I_ADDR are transmitted from an external device to the receiving driver 330, the receiving driver 330 may output the external command E_CMD and the input address I_ADDR to the command decoder 350 and the address latch 360, respectively. The command decoder 350 may decode the external command E_CMD to generate and transmit the memory active signal ACT_M to the MAC command generator 370. The MAC command generator 370 may generate and output the MAC active signal RACTV in response to the memory active signal ACT_M. The MAC active signal RACTV may be transmitted to the first memory bank (BK0) 311 and the second memory bank (BK1) 312. Both of the first memory bank (BK0) 311 and the second memory bank (BK1) 312 may be activated by the MAC active signal RACTV.

Figure 22:
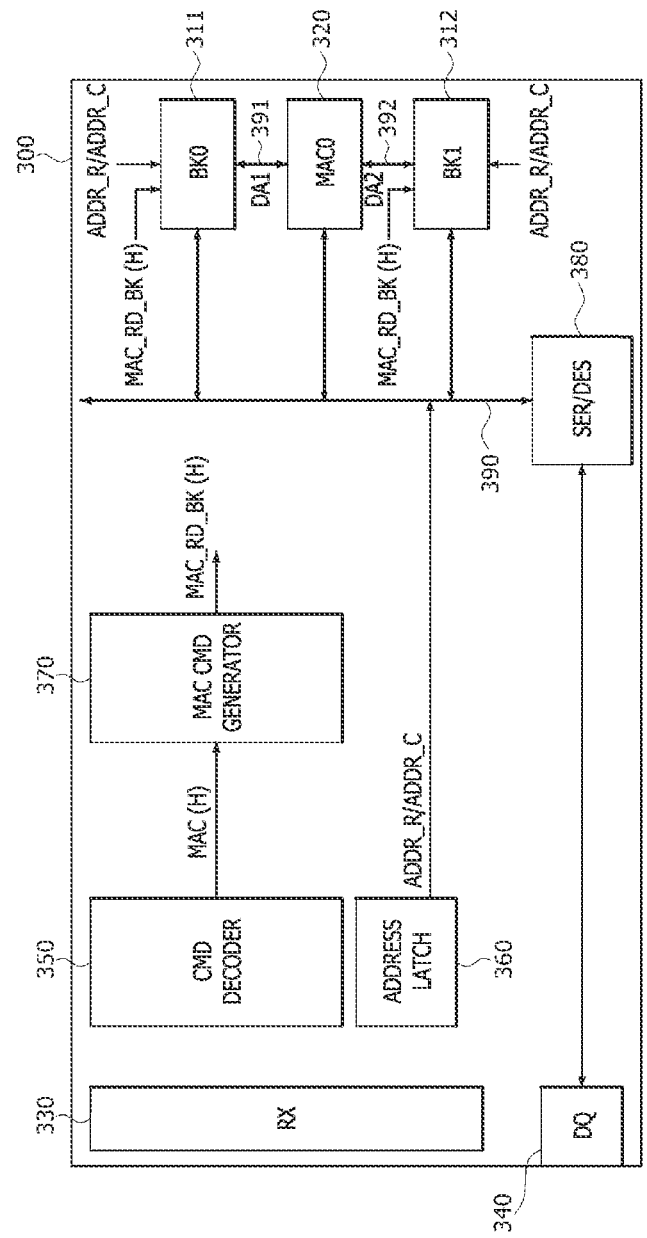

Next, referring to FIG. 22, the command decoder 350 may generate and output the MAC arithmetic signal MAC having a logic "high(H)" level to the MAC command generator 370. In response to the MAC arithmetic signal MAC having a logic "high(H)" level, the MAC command generator 370 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 311 and the second memory bank (BK1) 312. The first data DA1 may be read out of the first memory bank (BK0) 311 by the MAC read signal MAC_RD_BK having a logic "high(H)" level and may be transmitted to the first MAC operator (MAC0) 320 through the first BIO line 391. In addition, the second data DA2 may be read out of the second memory bank (BK1) 312 by the MAC read signal MAC_RD_BK having a logic "high(H)" level and may be transmitted to the first MAC operator (MAC0) 320 through the second BIO line 392.

Figure 23:
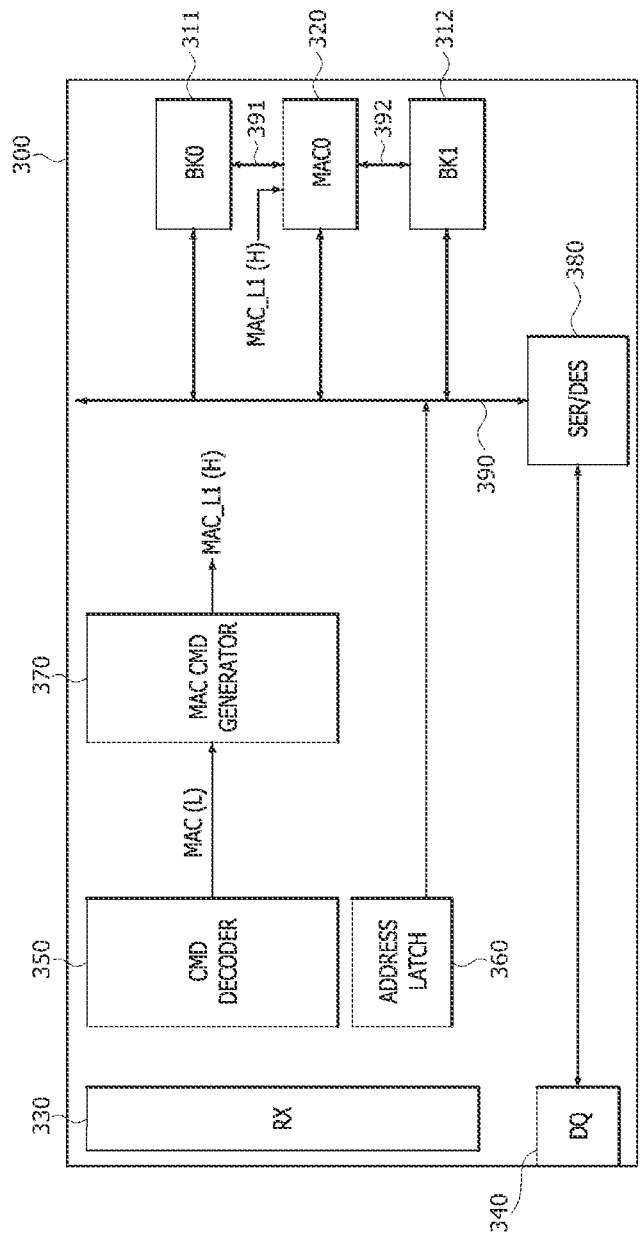

Next, referring to FIG. 23, a logic level of the MAC arithmetic signal MAC outputted from the command decoder 350 may change from a logic "high(H)" level into a logic "low(L)" level at a point in time when the first delay time DELAY_T1 determined by the first delay circuit (372 of FIG. 18) elapses from a point in time when the MAC read signal MAC_RD_BK is outputted from the MAC command generator 370. The MAC command generator 370 may generate and output the MAC input latch signal MAC_L1 having a logic "high(H)" level in response to the MAC arithmetic signal MAC having a logic "low(L)" level. The MAC input latch signal MAC_L1 having a logic "high(H)" level may be transmitted to the first MAC operator (MAC0) 320. The first MAC operator (MAC0) 320 may be synchronized with the MAC input latch signal MAC_L1 having a logic "high(H)" level to perform a latch operation of the first and second data DA1 and DA2 outputted from the first and second memory banks (BK0 and BK1) 311 and 312. If the latch operation of the first and second data DA1 and DA2 terminates, the first MAC operator (MAC0) 320 may perform the MAC arithmetic operation and may generate the MAC result data DA_MAC. The MAC result data DA_MAC generated by the first MAC operator (MAC0) 320 may be inputted to the output latch (223-1 of FIG. 20) included in the first MAC operator (MAC0) 320.

Figure 24:
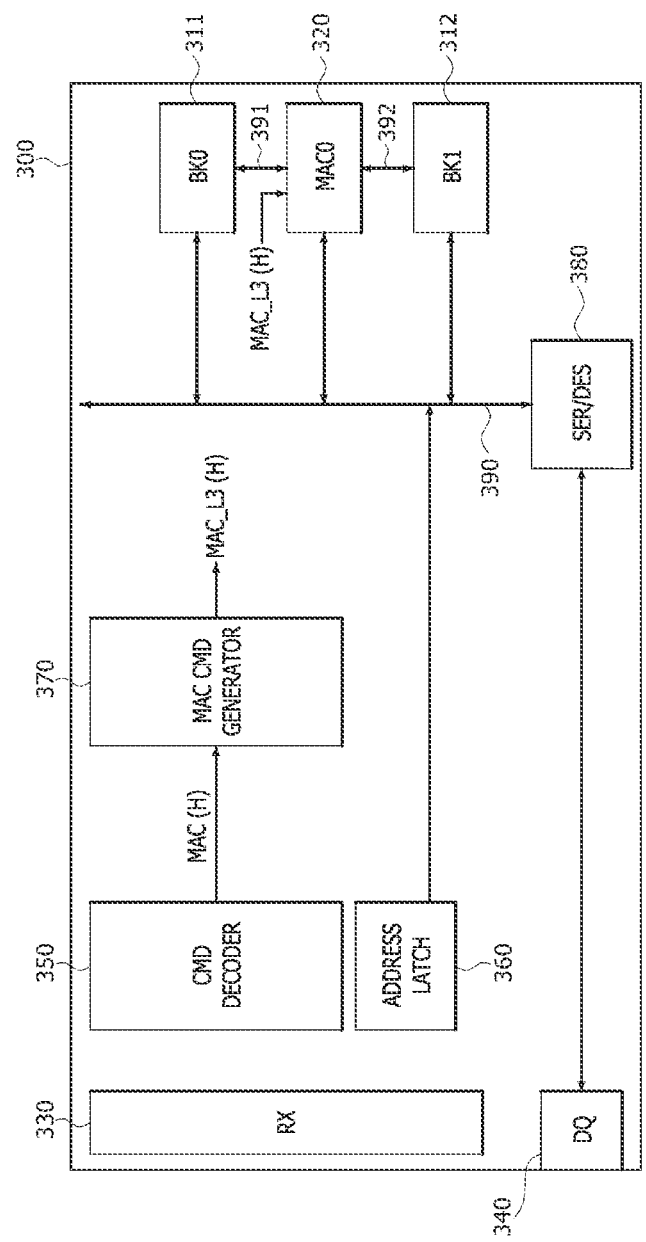

Next, referring to FIG. 24, a logic level of the MAC arithmetic signal MAC outputted from the command decoder 350 may change from a logic "low(L)" level into a logic "high(H)" level at a point in time when the second delay time DELAY_T2 determined by the second delay circuit (373 of FIG. 18) elapses from a point in time when the MAC input latch signal MAC_L1 having a logic "high (H)" level is outputted from the MAC command generator 370. The MAC command generator 370 may generate and output the MAC output latch signal MAC_L3 having a logic "high(H)" level in response to the MAC arithmetic signal MAC having a logic "high(H)" level. The MAC output latch signal MAC_L3 having a logic "high(H)" level may be transmitted to the first MAC operator (MAC0) 320. The output latch (223-1 of FIG. 20) included in the first MAC operator (MAC0) 320 may be synchronized with the MAC output latch signal MAC_L3 having a logic "high(H)" level to transfer the MAC result data DA_MAC generated by the MAC circuit (222 of FIG. 20) to the transfer gate (223-2 of FIG. 20) included in the first MAC operator (MAC0) 320. The MAC result data DA_MAC outputted from the output latch (223-1 of FIG. 20) may be fed back to the addition logic circuit (222-2 of FIG. 20) for the accumulative adding calculation executed by the MAC circuit (222 of FIG. 20).

Figure 25:
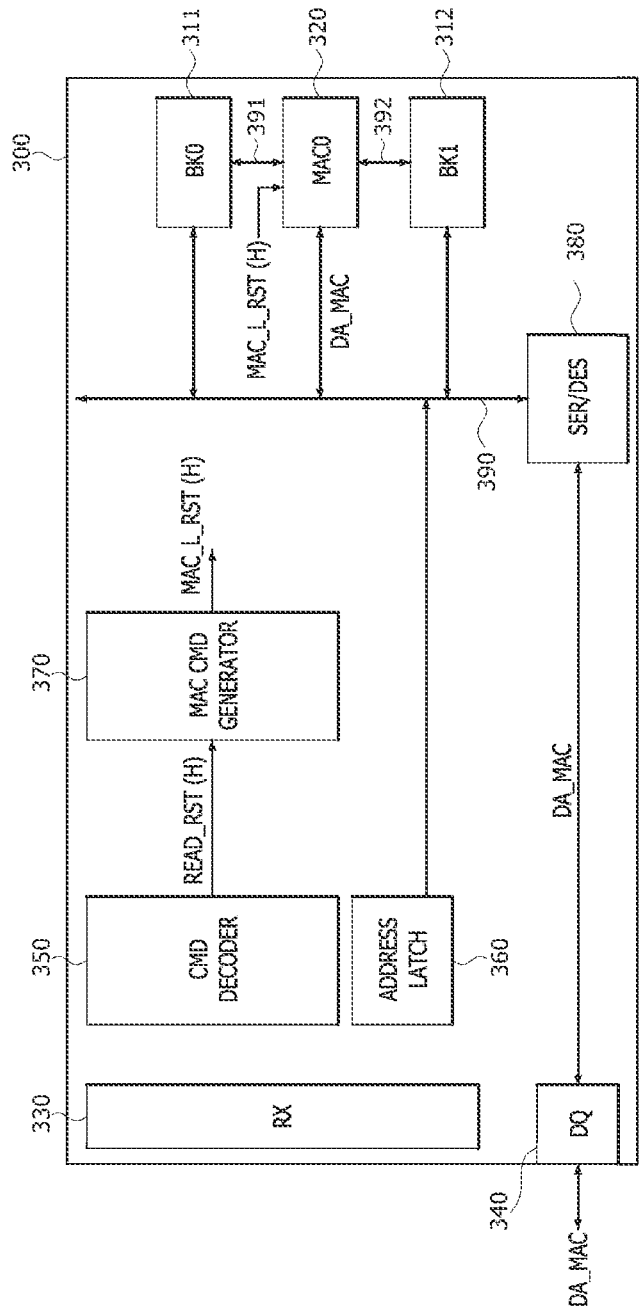

Next, referring to FIG. 25, the command decoder 350 may output and transmit the result read signal READ_RST having a logic "high(H)" level to the MAC command generator 370. The MAC command generator 370 may generate and output the MAC result latch signal MAC_L_RST having a logic "high" level in response to the result read signal READ_RST having a logic "high(H)" level. The MAC result latch signal MAC_L_RST having a logic "high" level may be transmitted to the first MAC operator (MAC0) 320. As described with reference to FIG. 20, the first MAC operator (MAC0) 320 may output the MAC result data DA_MAC to the GIO line 390 in response to the MAC result latch signal MAC_L_RST having a logic "high" level and may also reset the output latch (223-1 of FIG. 20) included in the first MAC operator (MAC0) 320 in response to the MAC result latch signal MAC_L_RST having a logic "high" level. The MAC result data DA_MAC transmitted to the GIO line 390 may be outputted to an external device through the serializer/deserializer 380 and the data I/O line 340. Although not shown in the drawings, the MAC result data DA_MAC outputted from the first MAC operator (MAC0) 320 may be written into the first memory bank (BK0) 311 through the first BIO line 391 without using the GIO line 390 or may be written into the second memory bank (BK1) 312 through the second BIO line 392 without using the GIO line 390.

Figure 26:
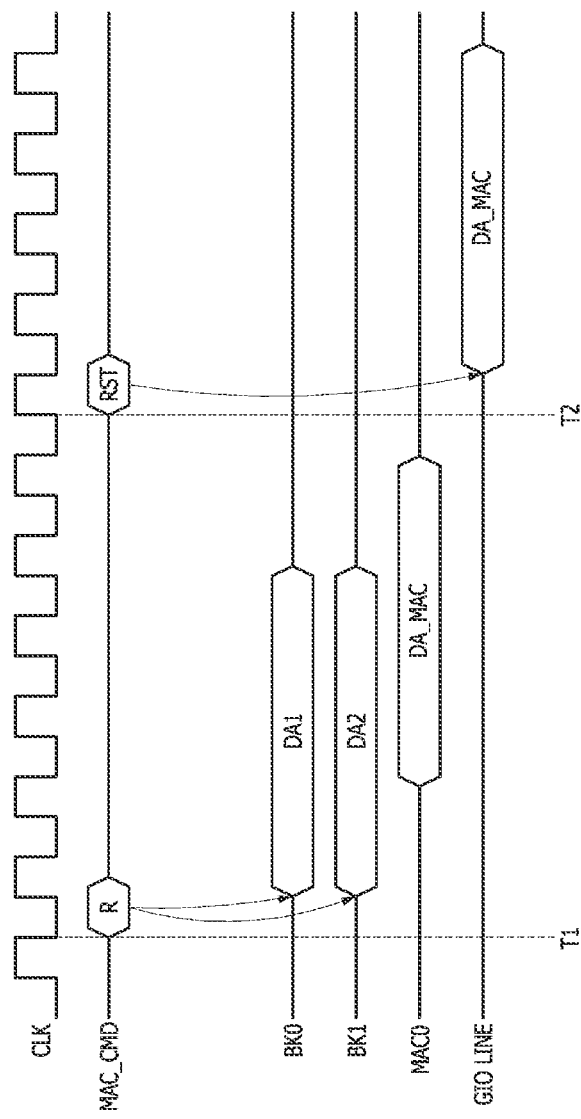
FIG. 26 is a timing diagram an operation of the PIM device illustrated in FIG. 16.

FIG. 26 is a timing diagram illustrating an operation of the PIM device 300 illustrated in FIG. 16. Referring to FIG. 26, at a first point in time "T1", the MAC command generator 370 may be synchronized with a falling edge of a clock signal CLK to generate and output the MAC read signal MAC_RD_BK (R) having a logic "high(H)" level. The first and second memory banks (BK0 and BK1) 311 and 312 may be selected by the MAC read signal MAC_RD_BK (R) having a logic "high(H)" level so that the first data DA1 and the second data DA2 are read out of the first and second memory banks (BK0 and BK1) 311 and 312. If a certain time elapses from a point in time when first data DA1 and the second data DA2 are read out, the first MAC operator (MAC0) 320 may perform the MAC arithmetic operation of the first and second data DA1 and DA2 to generate the MAC result data DA_MAC. At a second point in time "T2", the MAC command generator 370 may be synchronized with a falling edge of the clock signal CLK to generate and output the MAC result latch signal MAC_L_RST (RST) having a logic "high" level. The MAC result data DA_MAC may be transmitted to the GIO line 390 by the MAC result latch signal MAC_L_RST (RST) having a logic "high" level.

Figure 27:
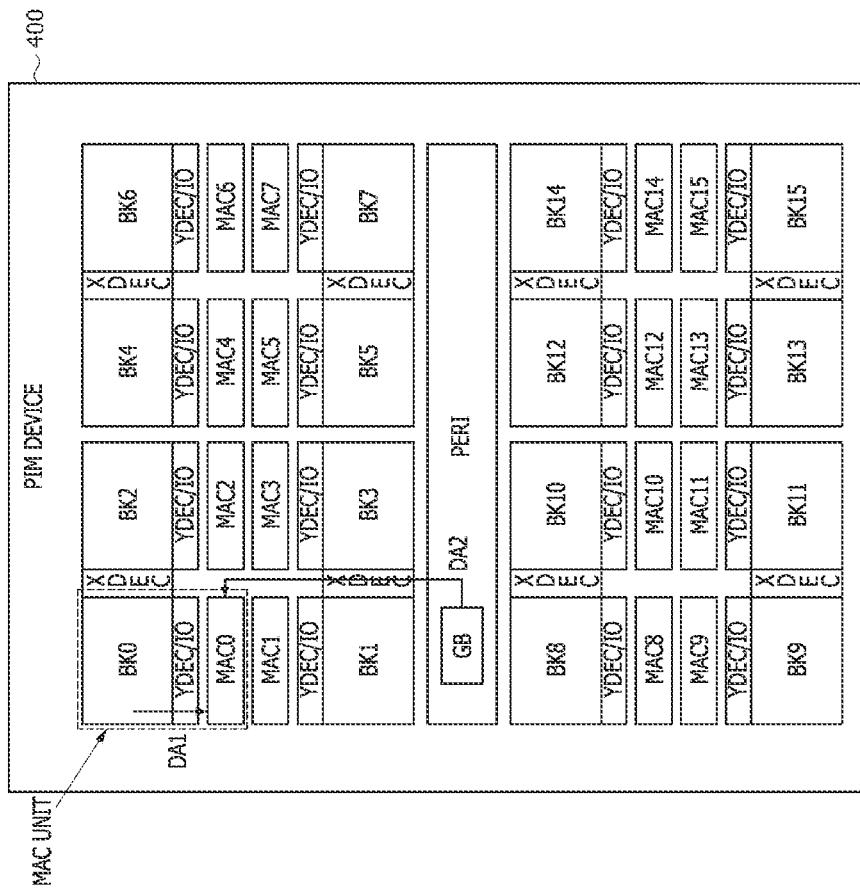
FIG. 27 is a schematic diagram illustrating an arrangement of memory banks and multiplication/accumulation (MAC) operators included in a PIM device according to a second embodiment of the present disclosure.

FIG. 27 illustrates a disposal structure indicating placement of memory banks and MAC operators included in a PIM device 400 according to another embodiment of the present disclosure. Referring to FIG. 27, the PIM device 400 may include memory devices such as a plurality of memory banks (e.g., first to sixteenth memory banks BK0, . . . , and BK15), processing devices such as a plurality of MAC operators (e.g., first to sixteenth MAC operators MAC0, . . . , and MAC15), and a global buffer GB. A core circuit may be disposed to be adjacent to the memory banks BK0, . . . , and BK15. The core circuit may include X-decoders XDECs and Y-decoders/IO circuits YDEC/IOs. The memory banks BK0, . . . , and BK15 and the core circuit may have the same configuration as described with reference to FIG. 2. Thus, descriptions of the memory banks BK0, . . . , and BK15 and the core circuit will be omitted hereinafter. The MAC operators MAC0, . . . , and MAC15 may be disposed to be allocated to the memory banks BK0, . . . , and BK15, respectively. That is, in the PIM device 400, two or more memory banks do not share one MAC operator with each other. Thus, the number of the MAC operators MAC0, . . . , and MAC15 included in the PIM device 400 may be equal to the number of the memory banks BK0, . . . , and BK15 included in the PIM device 400. One of the memory banks BK0, . . . , and BK15 together with one of the MAC operators MAC0, . . . , and MAC15 may constitute one MAC unit. For example, the first memory bank BK0 and the first MAC operator MAC0 may constitute a first MAC unit, and the second memory bank BK1 and the second MAC operator MAC1 may constitute a second MAC unit. Similarly, the sixteenth memory bank BK15 and the sixteenth MAC operator MAC15 may constitute a sixteenth MAC unit. In each of the first to sixteenth MAC units, the MAC operator may receive first data DA1 to be used for the MAC arithmetic operation from the respective memory bank.

The PIM device 400 may further include a peripheral circuit PERI. The peripheral circuit PERI may be disposed in a region other than an area in which the memory banks BK0, BK1, . . . , and BK15; the MAC operators MAC0, . . . , and MAC15; and the core circuit are disposed. The peripheral circuit PERI may be configured to include a control circuit relating to a command/address signal, a control circuit relating to input/output of data, and a power supply circuit. The peripheral circuit PERI of the PIM device 400 may have substantially the same configuration as the peripheral circuit PERI of the PIM device 100 illustrated in FIG. 2. A difference between the peripheral circuit PERI of the PIM device 400 and the peripheral circuit PERI of the PIM device 100 is that the global buffer GB is disposed in the peripheral circuit PERI of the PIM device 400. The global buffer GB may receive second data DA2 to be used for the MAC operation from an external device and may store the second data DA2. The global buffer GB may output the second data DA2 to each of the MAC operators MAC0, . . . , and MAC15 through a GIO line. In the event that the PIM device 400 performs neural network calculation, for example, an arithmetic operation in a deep learning process, the first data DA1 may be weight data and the second data DA2 may be vector data.

The PIM device 400 according to the present embodiment may operate in a memory mode or a MAC arithmetic mode. In the memory mode, the PIM device 400 may operate to perform the same operations as general memory devices. The memory mode may include a memory read operation mode and a memory write operation mode. In the memory read operation mode, the PIM device 400 may perform a read operation for reading out data from the memory banks BK0, BK1, . . . , and BK15 to output the read data, in response to an external request. In the memory write operation mode, the PIM device 400 may perform a write operation for storing data provided by an external device into the memory banks BK0, BK1, . . . , and BK15, in response to an external request. In the MAC arithmetic mode, the PIM device 400 may perform the MAC arithmetic operation using the MAC operators MAC0, . . . , and MAC15. In the PIM device 400, the MAC arithmetic operation may be performed in a deterministic way, and the deterministic MAC arithmetic operation of the PIM device 400 will be described more fully hereinafter. Specifically, the PIM device 400 may perform the read operation of the first data DA1 for each of the memory banks BK0, . . . , and BK15 and the read operation of the second data DA2 for the global buffer GB, for the MAC arithmetic operation in the MAC arithmetic mode. In addition, each of the MAC operators MAC0, . . . , and MAC15 may perform the MAC arithmetic operation of the first data DA1 and the second data DA2 to store a result of the MAC arithmetic operation into the memory bank or to output the result of the MAC arithmetic operation to an external device. In some cases, the PIM device 400 may perform a data write operation for storing data to be used for the MAC arithmetic operation into the memory banks before the data read operation for the MAC arithmetic operation is performed in the MAC arithmetic mode.

The operation mode of the PIM device 400 according to the present embodiment may be determined by a command which is transmitted from a host or a controller to the PIM device 400. In an embodiment, if a first external command requesting a read operation or a write operation for the memory banks BK0, BK1, . . . , and BK15 is transmitted from the host or the controller to the PIM device 400, the PIM device 400 may perform the data read operation or the data write operation in the memory mode. Alternatively, if a second external command requesting the MAC arithmetic operation is transmitted from the host or the controller to the PIM device 400, the PIM device 400 may perform the data read operation and the MAC arithmetic operation.

The PIM device 400 may perform the deterministic MAC arithmetic operation. Thus, the host or the controller may always predict a point in time (or a clock) when the MAC arithmetic operation terminates in the PIM device 400 from a point in time when an external command requesting the MAC arithmetic operation is transmitted from the host or the controller to the PIM device 400. Because the timing is predictable, no operation for informing the host or the controller of a status of the MAC arithmetic operation is required while the PIM device 400 performs the deterministic MAC arithmetic operation. In an embodiment, a latency during which the MAC arithmetic operation is performed in the PIM device 400 may be set to a fixed value for the deterministic MAC arithmetic operation.

Figure 28:
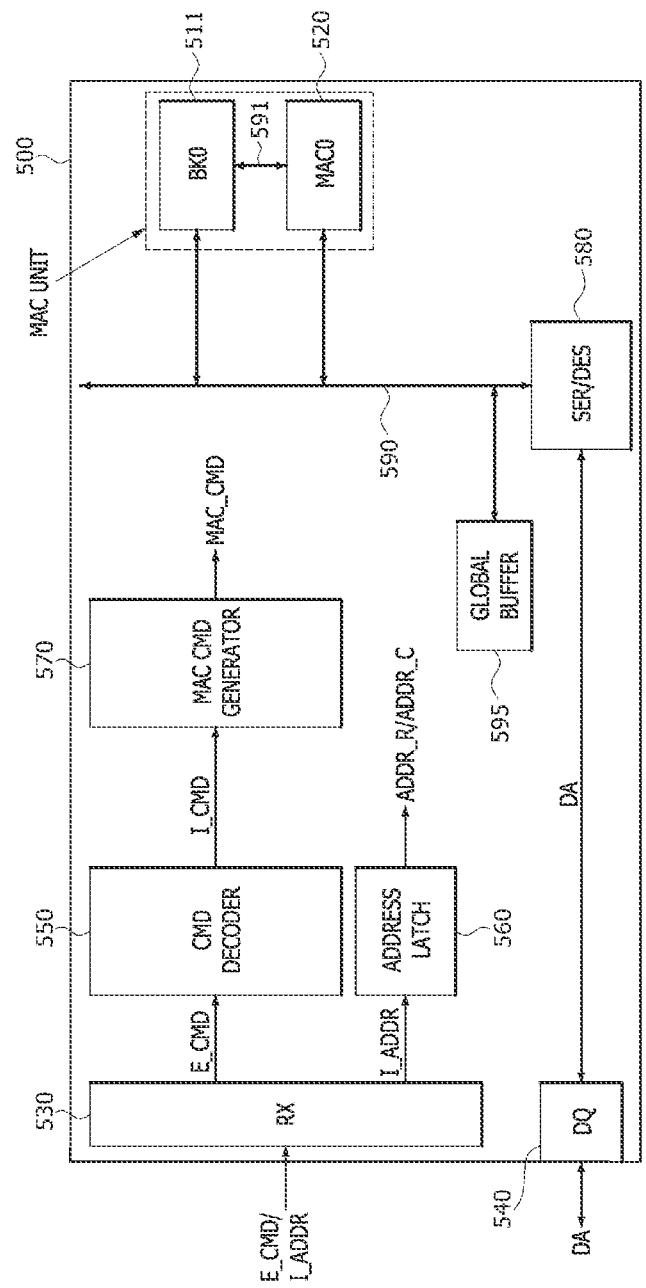
FIG. 28 is a block diagram illustrating a configuration of a PIM device according to the second embodiment of the present disclosure.

FIG. 28 is a block diagram illustrating an example of a detailed configuration of a PIM device 500 corresponding to the PIM device 400 illustrated in FIG. 27. FIG. 28 illustrates only a first memory bank (BK0) 511 and a first MAC operator (MAC0) 520 constituting a first MAC unit among a plurality of MAC units. However, FIG. 28 illustrates merely an example for simplification of the drawing. Accordingly, the following description for the first MAC unit may be equally applicable to the remaining MAC units. Referring to FIG. 28, the PIM device 500 may be configured to include the first memory bank (BK0) 511 and the first MAC operator (MAC0) 520 constituting the first MAC unit as well as a global buffer 595. The PIM device 500 may further include a GIO line 590 and a BIO line 591 used as data transmission lines. The first memory bank (BK0) 511 and the first MAC operator (MAC0) 520 may communicate with the global buffer 595 through the GIO line 590. Only the data transmission between the first memory bank (BK0) 511 and the first MAC operator (MAC0) 520 may be achieved through the BIO line 591. The BIO line 591 is dedicated specifically for data transmission between the first memory bank (BK0) 511 and the first MAC operator (MAC0) 520. Thus, the first MAC operator (MAC0) 520 may receive the first data DA1 to be used for the MAC arithmetic operation from the first memory bank (BK0) 511 through the BIO line 591 and may receive the second data DA2 to be used for the MAC arithmetic operation from the global buffer 595 through the GIO line 590.

The PIM device 500 may include a receiving driver (RX) 530, a data I/O circuit (DQ) 540, a command decoder 550, an address latch 560, a MAC command generator 570, and a serializer/deserializer (SER/DES) 580. The command decoder 550, the address latch 560, the MAC command generator 570, and the serializer/deserializer 580 may be disposed in the peripheral circuit PERI of the PIM device 400 illustrated in FIG. 27. The receiving driver 530 may receive an external command E_CMD and an input address I_ADDR from an external device. The external device may denote a host or a controller coupled to the PIM device 500. Hereinafter, it may be assumed that the external command E_CMD transmitted to the PIM device 500 is a command requesting the MAC arithmetic operation. That is, the PIM device 500 may perform the deterministic MAC arithmetic operation in response to the external command E_CMD. The data I/O circuit 540 may provide a means through which the PIM device 500 communicates with the external device.

The receiving driver 530 may separately output the external command E_CMD and the input address I_ADDR received from the external device. Data DA inputted to the PIM device 500 through the data I/O circuit 540 may be processed by the serializer/deserializer 580 and may be transmitted to the first memory bank (BK0) 511 and the global buffer 595 through the GIO line 590 of the PIM device 500. The data DA outputted from the first memory bank (BK0) 511 and the first MAC operator (MAC0) 520 through the GIO line 590 may be processed by the serializer/deserializer 580 and may be outputted to the external device through the data I/O circuit 540. The serializer/deserializer 580 may convert the data DA into parallel data if the data DA are serial data or may convert the data DA into serial data if the data DA are parallel data. For the data conversion, the serializer/deserializer 580 may include a serializer converting parallel data into serial data and a deserializer converting serial data into parallel data.

The command decoder 550 may decode the external command E_CMD outputted from the receiving driver 530 to generate and output the internal command signal I_CMD. The internal command signal I_CMD outputted from the command decoder 550 may be the same as the internal command signal I_CMD described with reference to FIG. 17. That is, the internal command signal I_CMD may include a first internal command signal corresponding to the memory active signal ACT_M, a second internal command signal corresponding to the MAC arithmetic signal MAC, and a third internal command signal corresponding to the result read signal READ_RST. The first to third internal command signals outputted from the command decoder 550 may be sequentially inputted to the MAC command generator 570. As described with reference to FIG. 17, the memory active signal ACT_M, the MAC arithmetic signal MAC, and the result read signal READ_RST outputted from the command decoder 550 may be sequentially generated at predetermined points in time (or clocks) in order to perform the deterministic MAC arithmetic operation of the PIM device 500. Thus, the host or the controller outputting the external command E_CMD may predict the points in time when the first to third internal command signals constituting the internal command signal I_CMD are generated by the command decoder 550 in advance at a point in time when the external command E_CMD is outputted from the host or the controller. That is, the host or the controller may predict a point in time (or a clock) when the MAC arithmetic operation terminates in the PIM device 500 after the external command E_CMD requesting the MAC arithmetic operation is transmitted from the host or the controller to the PIM device 500, even without receiving any signals from the PIM device 500.

The address latch 560 may convert the input address I_ADDR outputted from the receiving driver 530 into a row/column address ADDR_R/ADDR_C to output the row/column address ADDR_R/ADDR_C. The row/column address ADDR_R/ADDR_C outputted from the address latch 560 may be transmitted to the first memory bank (BK0) 511. According to the present embodiment, the first data and the second data to be used for the MAC arithmetic operation may be simultaneously read out of the first memory bank (BK0) 511 and the global buffer 595, respectively. Thus, it may be unnecessary to generate a bank selection signal for selecting the first memory bank 511. A point in time when the row/column address ADDR_R/ADDR_C is inputted to the first memory bank 511 may be a point in time when a MAC command (i.e., the MAC arithmetic signal MAC) requesting a data read operation for the first memory bank 511 for the MAC arithmetic operation is generated.

The MAC command generator 570 may output the MAC command signal MAC_CMD in response to the internal command signal I_CMD outputted from the command decoder 550. The MAC command signal MAC_CMD outputted from the MAC command generator 570 may be the same as the MAC command signal MAC_CMD described with reference to FIG. 17. That is, the MAC command signal MAC_CMD outputted from the MAC command generator 570 may include the MAC active signal RACTV corresponding to the first MAC command signal, the MAC read signal MAC_RD_BK corresponding to the second MAC command signal, the MAC input latch signal MAC_L1 corresponding to the third MAC command signal, the MAC output latch signal MAC_L3 corresponding to the fourth MAC command signal, and the MAC result latch signal MAC_L_RST corresponding to the fifth MAC command signal.

The MAC active signal RACTV may be generated based on the memory active signal ACT_M outputted from the command decoder 550. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC outputted from the command decoder 550. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST outputted from the command decoder 550.

The MAC active signal RACTV outputted from the MAC command generator 570 may control an activation operation for the first memory bank 511. The MAC read signal MAC_RD_BK outputted from the MAC command generator 570 may control a data read operation for the first memory bank 511 and the global buffer 595. The MAC input latch signal MAC_L1 outputted from the MAC command generator 570 may control an input data latch operation of the first MAC operator (MAC0) 520. The MAC output latch signal MAC_L3 outputted from the MAC command generator 570 may control an output data latch operation of the first MAC operator (MAC0) 520. The MAC result latch signal MAC_L_RST outputted from the MAC command generator 570 may control an output operation of MAC result data of the first MAC operator (MAC0) 520 and a reset operation of the first MAC operator (MAC0) 520.

As described above, in order to perform the deterministic MAC arithmetic operation of the PIM device 500, the memory active signal ACT_M, the MAC arithmetic signal MAC, and the result read signal READ_RST outputted from the command decoder 550 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and outputted from the MAC command generator 570 at predetermined points in time after the external command E_CMD is inputted to the PIM device 500, respectively. That is, a time period from a point in time when the first and second memory banks 511 is activated by the MAC active signal RACTV until a point in time when the first MAC operator (MAC0) 520 is reset by the MAC result latch signal MAC_L_RST may be predetermined.

The MAC command generator 570 of the PIM device 500 according to the present embodiment may have the same configuration as described with reference to FIG. 18. In addition, the input signals and the output signals of the MAC command generator 570 may be inputted to and outputted from the MAC command generator 570 at the same points in time as described with reference to FIG. 19. As described with reference to FIGS. 18 and 19, the MAC command generator 570 may sequentially receive the memory active signal ACT_M, the MAC arithmetic signal MAC, and the result read signal READ_RST from the command decoder 550. In addition, the MAC command generator 570 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be outputted from the MAC command generator 570 in series with certain time intervals.

The MAC command generator 570 may generate and output the MAC active signal RACTV in response to the memory active signal ACT_M outputted from the command decoder 550. Subsequently, the MAC command generator 570 may generate and output the MAC read signal MAC_RD_BK in response to the MAC arithmetic signal MAC outputted from the command decoder 550. The MAC command generator 570 may delay the MAC arithmetic signal MAC by a certain time determined by the first delay circuit (372 of FIG. 18) to generate and output the MAC input latch signal MAC_L1. The MAC command generator 570 may delay the MAC input latch signal MAC_L1 by a certain time determined by the second delay circuit (373 of FIG. 18) to generate and output the MAC output latch signal MAC_L3. Subsequently, the MAC command generator 570 may generate and output the MAC result latch signal MAC_L_RST in response to the result read signal READ_RST outputted from the command decoder 550.

Figure 29:
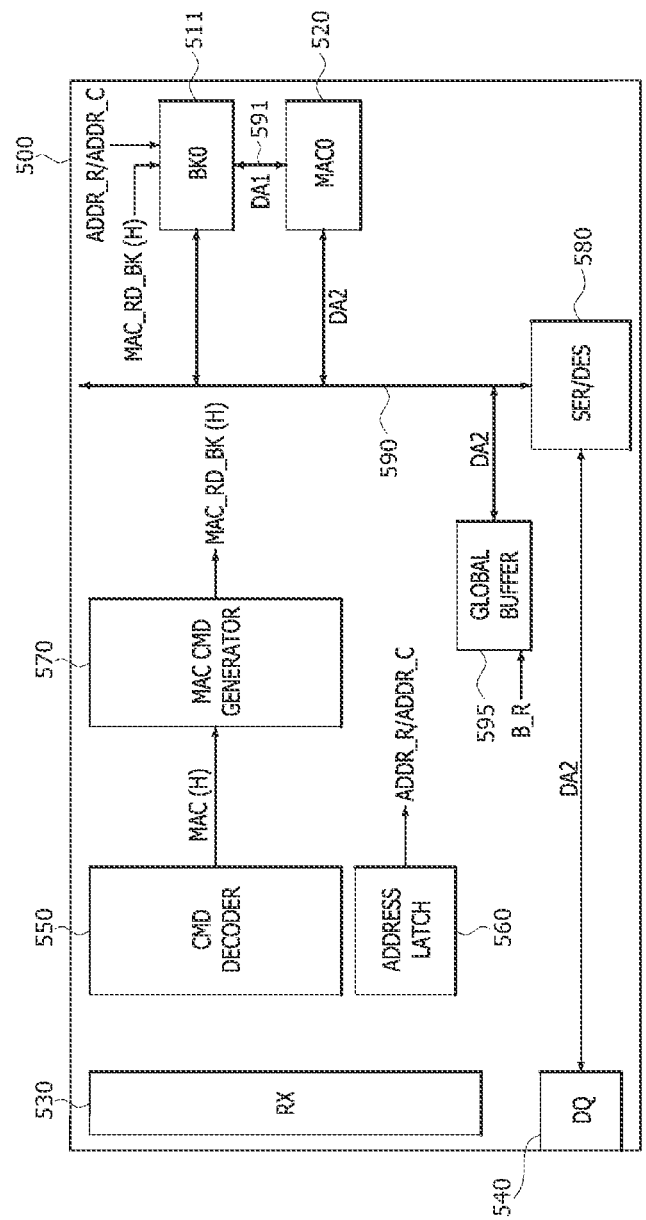
FIG. 29 is a block diagram illustrating an operation of the PIM device illustrated in FIG. 28.

FIG. 29 is a block diagram illustrating an operation of the PIM device 500 illustrated in FIG. 28. In FIG. 29, the same reference numerals or the same reference symbols as used in FIG. 16 denote the same elements. The operation of the PIM device 500 according to the present embodiment may be similar to the operation of the PIM device 300 described with reference to FIG. 16 except a transmission process of the first and second data DA1 and DA2 inputted to the first MAC operator (MAC0) 520. Thus, the operation of the PIM device 500 executed before the first and second data DA1 and DA2 are transmitted to the first MAC operator (MAC0) 520 may be the same as the operation of the PIM device 300 described with reference to FIG. 21. As illustrated in FIG. 29, when the MAC arithmetic signal MAC having a logic "high(H)" level is transmitted from the command decoder 550 to the MAC command generator 570, the MAC command generator 570 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 511. In such a case, a global buffer read signal B_R may also be transmitted to the global buffer 595. The first data DA1 may be read out of the first memory bank (BK0) 511 by the MAC read signal MAC_RD_BK having a logic "high(H)" level and may be transmitted to the first MAC operator (MAC0) 520 through the BIO line 591. In addition, the second data DA2 may be read out of the global buffer 595 by the global buffer read signal B_R and may be transmitted to the first MAC operator (MAC0) 520 through the GIO line 590. The operation of the PIM device 500 executed after the first and second data DA1 and DA2 are transmitted to the first MAC operator (MAC0) 520 may be the same as the operation of the PIM device 300 described with reference to FIGS. 23 to 25.

Figure 30:
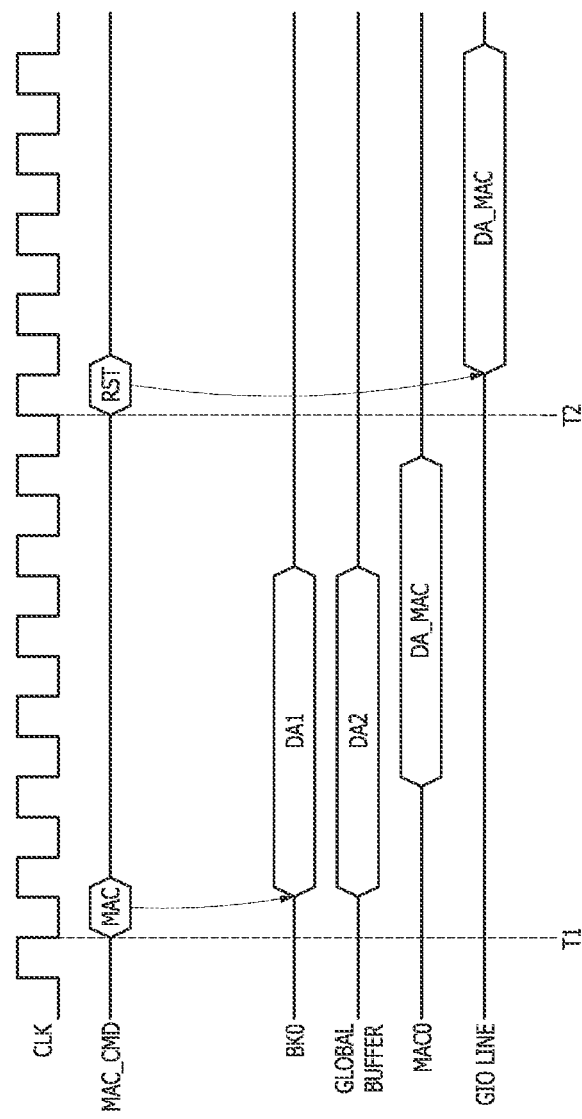
FIG. 30 is a timing diagram illustrating an operation of the PIM device illustrated in FIG. 28.

FIG. 30 is a timing diagram illustrating an operation of the PIM device 500 illustrate in FIG. 28. Referring to FIG. 30, at a first point in time "T1", the MAC command generator 570 may be synchronized with a falling edge of a clock signal CLK to generate and output the MAC read signal MAC_RD_BK (R) having a logic "high(H)" level. The first memory bank (BK0) 511 may be selected by the MAC read signal MAC_RD_BK (R) having a logic "high(H)" level so that the first data DA1 are read out of the first memory bank (BK0) 511. In addition, the second data DA2 may be read out of the global buffer 595. If a certain time elapses from a point in time when the first and second data DA1 and DA2 are read out of the first memory bank (BK0) 511 and the global buffer 595, the first MAC operator (MAC0) 520 may perform the MAC arithmetic operation of the first and second data DA1 and DA2 to generate the MAC result data DA_MAC. At a second point in time "T2", the MAC command generator 570 may be synchronized with a falling edge of the clock signal CLK to generate and output the MAC result latch signal MAC_L_RST (RST). The MAC result data DA_MAC may be transmitted to an external device through the GIO line 590 or to the first memory bank (BK0) 511 through the BIO line 591, by the MAC result latch signal MAC_L_RST (RST).

Figure 31:
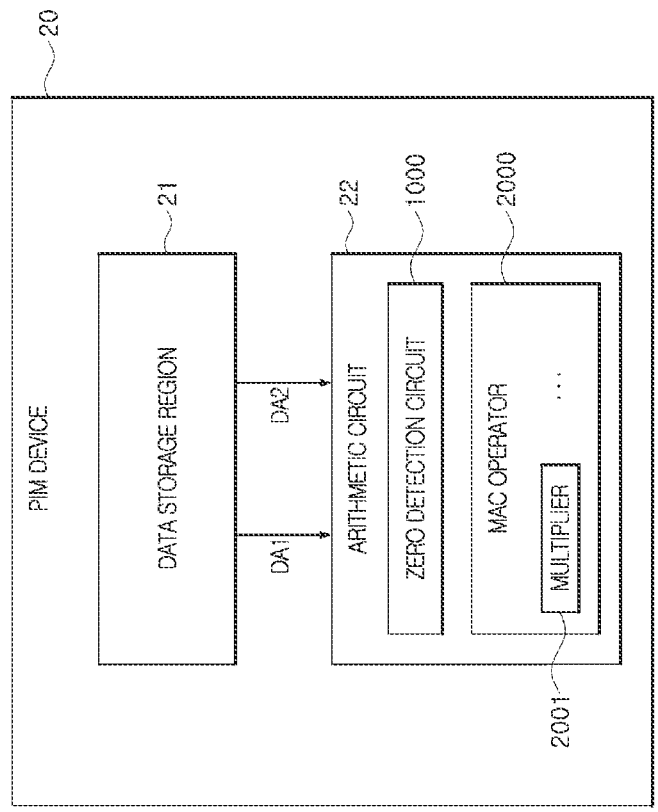
FIG. 31 is a block diagram illustrating a configuration of a PIM device according to an embodiment of the present disclosure.

FIG. 31 is a block diagram illustrating a configuration of a PIM device 20 according to an embodiment of the present disclosure. Referring to FIG. 31, the PIM device 20 may include a data storage region 21 and an arithmetic circuit 22. The data storage region 21 may store first data DA1 and second data DA2. The arithmetic circuit 22 may perform the MAC arithmetic operation of the first data DA1 and the second data DA2 outputted from the data storage region 21. The data storage region 21 may have substantially the same configuration as the data storage region 11 illustrated in FIG. 1. Thus, detailed descriptions of the data storage region 21 will be omitted hereinafter. The descriptions of the PIM device 10 illustrated in FIG. 1 may also be equally applicable to the PIM device 20 illustrated in FIG. 31. For example, the PIM device 20 may operate in a memory mode or a MAC arithmetic mode, like the PIM device 10 illustrated in FIG. 1.

The arithmetic circuit 22 may include at least one zero-detection circuit 1000 and at least one MAC operator 2000. The MAC operator 2000 may include multiple multipliers 2001. In an embodiment, one zero-detection circuit 1000 is allocated to one multiplier 2001. The zero-detection circuit 1000 may disable the input of the multiplier 2001 and may generate zero data including multiple bits, all of which have a value of zero, as output data of the multiplier 2001, when all of the bits included in at least one of the first data DA1 and the second data DA2 have a value of zero. The zero-detection circuit 1000 may allow the multiplier 2001 to receive the first and second data DA1 and DA2 when at least one of the bits included in at least one of the first data DA1 and the second data DA2 has a value of one.

When all of the bits included in the first data DA1 have a value of zero or all of the bits included in the second data DA2 have a value of zero, it may be apparent that a result of the multiplying calculation of the first data DA1 and the second data DA2 has a value of zero even without performing the multiplying calculation of the first data DA1 and the second data DA2. According to the PIM device 20, the input of the multiplier 2001 may be disabled to prevent the multiplier 2001 from performing an unnecessary arithmetic operation when all of the bits included in at least one of the first data DA1 and the second data DA2 have a value of zero. Thus, it may be possible to reduce power consumption of the PIM device 20.

FIG. 32 illustrates an example of the MAC arithmetic operation performed in the PIM device 20 illustrated in FIG. 31. Referring to FIG. 32, the MAC arithmetic operation performed by the PIM device 20 may be executed through a matrix calculation. Specifically, the PIM device 20 may execute a matrix multiplying calculation of a '(M+1)×(N+1)' weight matrix and a '(N+1)×1' vector matrix according to control of an external controller (where, "M" and "N" are natural numbers). As a result of the matrix multiplying calculation of the '(M+1)×(N+1)' weight matrix and the '(N+1)×1' vector matrix, an '(N+1)×1' MAC result matrix may be generated. The '(M+1)×(N+1)' weight matrix may include '(M+1)×(N+1)'-number of elements W0.0, . . . , and WM.N. The '(N+1)×1' vector matrix may include '(N+1)'-number of elements X0.0, . . . , and XN.0. The MAC result matrix may include '(N+1)'-number of elements MAC0.0, . . . , and MACN.0.

In an embodiment, the matrix multiplying calculation may be performed for an '8×8' weight matrix and an '8×1' vector matrix. In such a case, an '8×1' MAC result matrix may be generated as a result of the matrix multiplying calculation. The '8×8' weight matrix may include sixty four elements W0.0, . . . , and W7.7, and the '8×1' vector matrix may include eight elements X0.0, . . . , and X7.0. In addition, the '8×1' MAC result matrix may include eight elements MAC0.0, . . . , and MAC7.0.

Each of the elements W0.0, . . . , and WM.N included in the weight matrix and the elements X0.0, . . . , and XN.0 included in the vector matrix may be a binary stream having multiple bits. In an embodiment, the first data DA1 may be comprised of the elements W0.0, . . . , W0.N arrayed in a first row of the weight matrix, and the second data DA2 may be comprised of the elements X0.0, . . . , and XN.0 arrayed in the vector matrix.

The matrix multiplying calculation of the weight matrix and the vector matrix may be used in a multi-layered perceptron-type (MLP-type) neural network. In general, the MLP-type neural network for executing a deep learning process may include at least three hidden layers and an output layer. The matrix multiplying calculation (i.e., the MAC arithmetic operation) of the weight matrix and the vector matrix illustrated in FIG. 32 may correspond to an arithmetic operation executed in one of the multiple hidden layers. The MAC arithmetic operation in the first hidden layer may be performed using the vector data which are inputted to the first hidden layer. However, the MAC arithmetic operations in the second to last hidden layers may be performed using the arithmetic result data generated in a previous hidden layer as the vector data.

Referring to FIGS. 31 and 32, the first data DA1 may be assumed to be comprised of the elements W0.0, . . . , and W0.7 arrayed in a first row of the '8×8' weight matrix, and the second data DA2 may be assumed to be comprised of the elements X0.0, . . . , and X7.0 arrayed in the '8×1' vector matrix. In such a case, each of the elements included in the first and second data DA1 and DA2 may be comprised of an 8-bit binary stream. For example, the element W0.0 may be a binary stream of '00000000', and each the elements W0.1, . . . , and W0.7 may include at least one bit having a value of '1'. In addition, the element X7.0 may be a binary stream of '00000000', and each of the elements X0.0, . . . , and X6.0 may include at least one bit having a value of '1'.

In the present embodiment, for the purpose of ease and convenience in explanation, it may be assumed that the arithmetic circuit 22 of the PIM device 20 illustrated in FIG. 31 includes eight multipliers 2001 (i.e., first to eighth multipliers 2001) and eight zero-detection circuits 1000 (i.e., first to eighth zero-detection circuits 1000) allocated to respective multipliers of the first to eighth multipliers 2001. In such a case, all of the bits included in the element W0.0 of the elements W0.0 and X0.0 inputted to the first multiplier 2001 have a value of zero. Thus, the first zero-detection circuit 1000 may inhibit the elements W0.0 and X0.0 from being inputted to the first multiplier 2001. In addition, the first zero-detection circuit 1000 may generate 16-bit data of '0000000000000000' as output data of the first multiplier 2001.

Each of the elements W0.1 and X1.0 inputted to the second multiplier 2001 may include at least one bit having a value of '1'. Thus, the second zero-detection circuit 1000 may allow the elements W0.1 and X1.0 to be inputted to the second multiplier 2001. Each of the elements W0.2, . . . , W0.6, X2.0, . . . , and X6.0 inputted to the third to seventh multipliers 2001 may also include at least one bit having a value of '1'. Thus, the third to seventh zero-detection circuits 1000 may also allow the elements W0.2, . . . , W0.6, X2.0, . . . , and X6.0 to be inputted to the third to seventh multipliers 2001.

All of the bits included in the element X7.0 of the elements W0.7 and X7.0 inputted to the eighth multiplier 2001 have a value of zero. Thus, the eighth zero-detection circuit 1000 may inhibit the elements W0.7 and X7.0 from being inputted to the eighth multiplier 2001. In addition, the eighth zero-detection circuit 1000 may generate 16-bit data of '0000000000000000' as output data of the eighth multiplier 2001.

The data outputted from the multipliers 2001 may be used for adding operations and accumulating operations of the MAC operator 2000. Thus, the MAC operator 2000 may finally generate the element MAC0.0 as the MAC result data of the MAC arithmetic operation of the first and second data DA1 and DA2.

Figure 33:
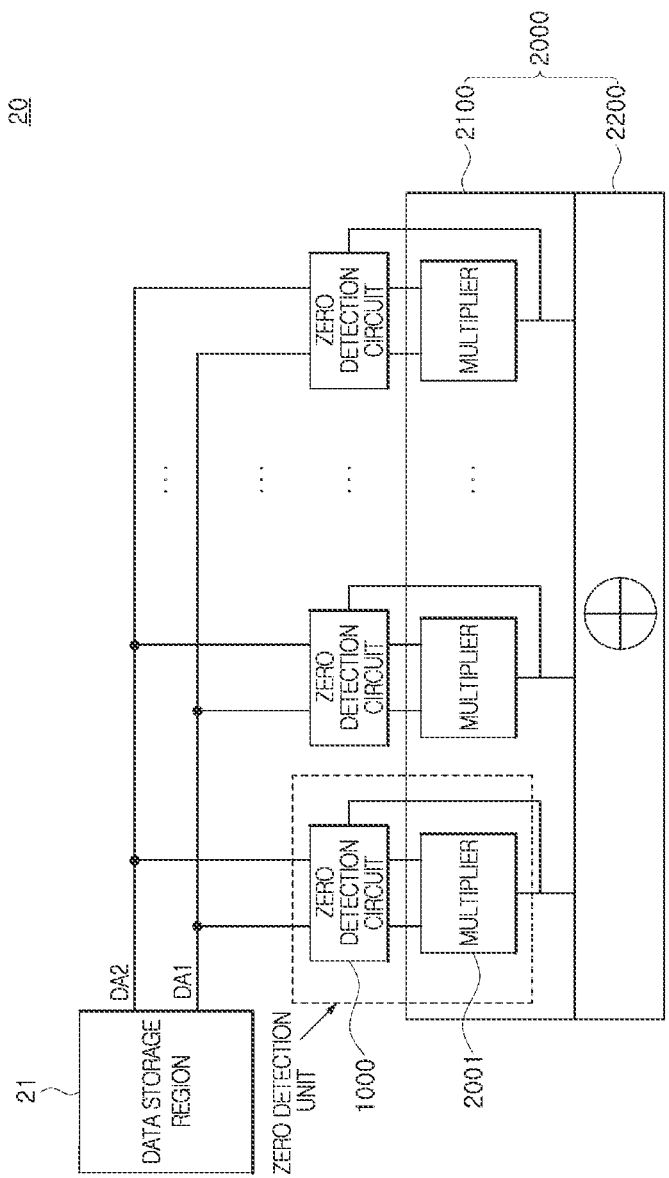
FIG. 33 illustrates a detailed configuration of the PIM device illustrated in FIG. 31.
Figure 34:
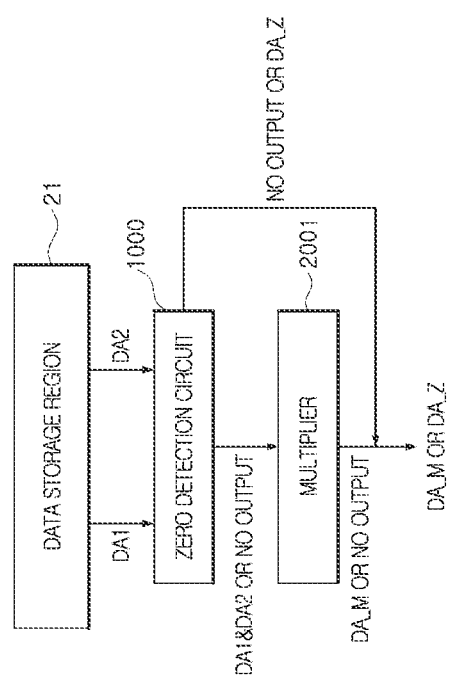
FIG. 34 illustrates data flow in the PIM device illustrated in FIG. 31.

FIG. 33 illustrates a detailed configuration of the PIM device 20 illustrated in FIG. 31, and FIG. 34 illustrates data flow in the PIM device 20 illustrated in FIG. 31. Referring to FIGS. 33 and 34, the MAC operator 2000 may include a multiplication logic circuit 2100 having a plurality of multipliers 2001 and an addition logic circuit 2200 having a plurality of adders. The multiplication logic circuit 2100 may have substantially the same configuration as the multiplication logic circuit 222-1 illustrated in FIG. 7, and the addition logic circuit 2200 may have substantially the same configuration as the addition logic circuit 222-2 illustrated in FIG. 7. Thus, the detailed descriptions of the multiplication logic circuit 2100 and the addition logic circuit 2200 will be omitted hereinafter. One zero-detection circuit 1000 and one multiplier 2001 coupled to each other may constitute one zero-detection unit. A description of the one zero-detection unit may be equally applicable to each of other zero-detection units.

The zero-detection circuit 1000 and the multiplier 2001 constituting the zero-detection unit may be located to be adjacent to each other. The zero-detection circuit 1000 may receive the first data DA1 and the second data DA2 from the data storage region 21 to determine whether all of the bits included in at least one of the first data DA1 and the second data DA2 have a value of '0'. According to the determination result of the zero-detection circuit 1000, the first and second data DA1 and DA2 are transmitted or not transmitted from the zero-detection circuit 1000 to the multiplier 2001.

In an embodiment, when all of the bits included in at least one of the first data DA1 and the second data DA2 have a value of '0', the zero-detection circuit 1000 may disable the input of the multiplier 2001 coupled to the zero-detection circuit 1000 and may generate zero data DA_Z including bits, all of which have a value of '0', as output data of the multiplier 2001. The zero data DA_Z outputted from the multiplier 2001 may be inputted to the addition logic circuit 2200 and may be used for an accumulative adding calculation of the MAC operator 2000. In another embodiment, when both of the first data DA1 and the second data DA2 have non-zero data (i.e., at least one of the bits included in each of the first data DA1 and the second data DA2 has a value of '1'), the zero-detection circuit 1000 may allow the multiplier 2001 to receive the first and second data DA1 and DA2. In such a case, the multiplier 2001 may perform a multiplying calculation of the first and second data DA1 and DA2 to generate and output multiplication result data DA_M. The multiplication result data DA_M may be inputted to the addition logic circuit 2200 and may be used for the accumulative adding calculation of the MAC operator 2000.

Figure 35:
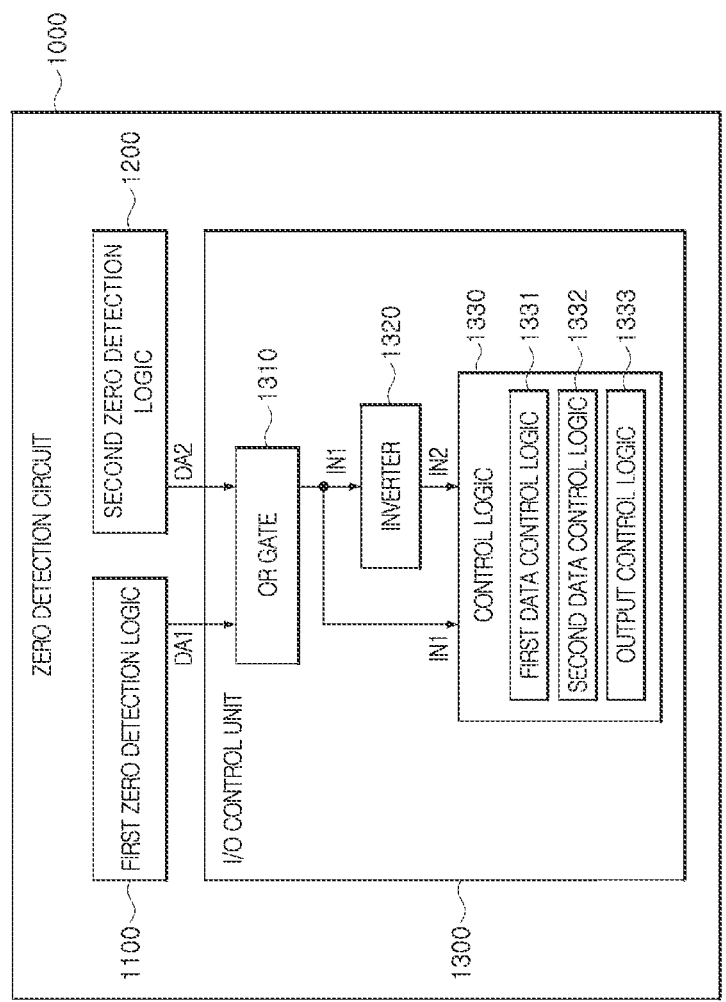
FIG. 35 is a block diagram illustrating a configuration of a zero-detection circuit included in the PIM device illustrated in FIG. 31.
Figure 36:
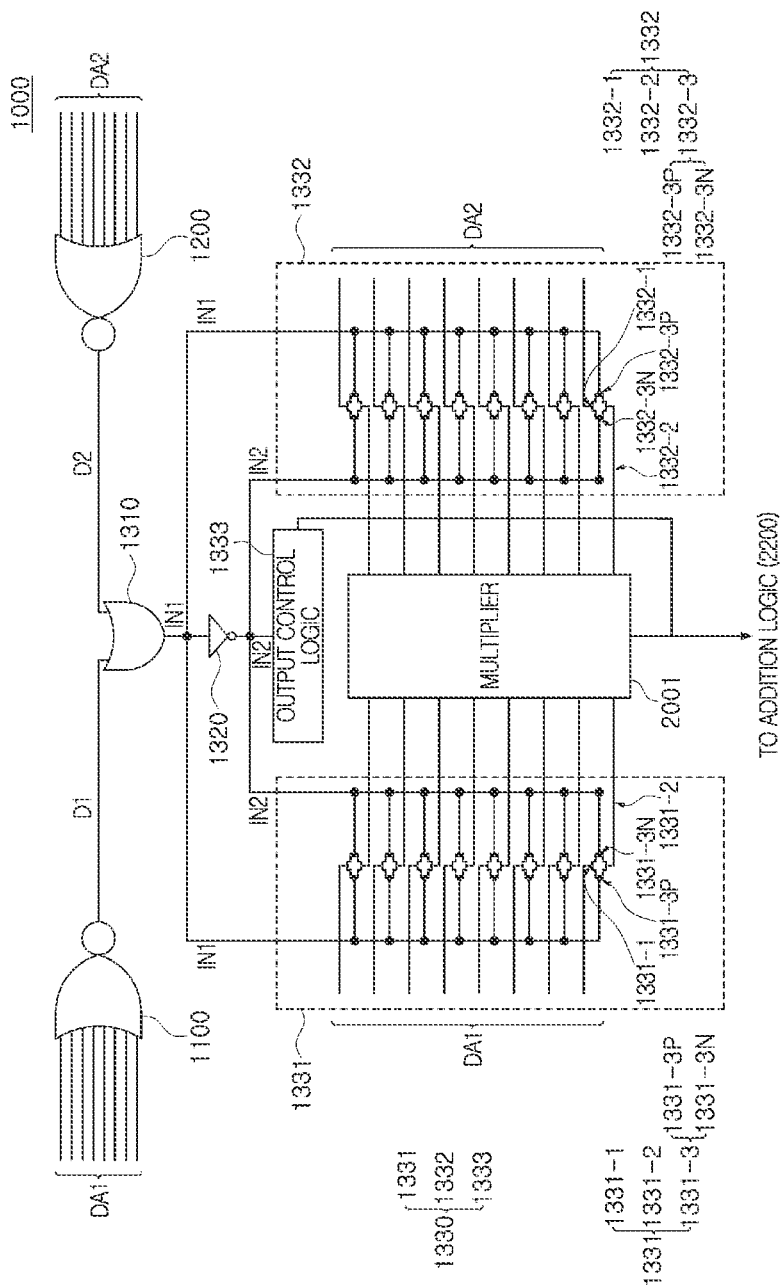
FIG. 36 illustrates a detailed configuration of the zero-detection circuit illustrated in FIG. 35.

FIG. 35 is a block diagram illustrating a configuration of the zero-detection circuit 1000 included in the PIM device 20 illustrated in FIG. 31, and FIG. 36 illustrates a detailed configuration of the zero-detection circuit 1000 illustrated in FIG. 35. Referring to FIGS. 35 and 36, the zero-detection circuit 1000 may include a first zero-detection logic circuit 1100, a second zero-detection logic circuit 1200, and an I/O control unit 1300.

The first zero-detection logic circuit 1100 may output a first value when all of the bits included in the first data DA1 have a value of '0' and may output a second value when at least one of the bits included in the first data DA1 has a value of '1'. In an embodiment, the first zero-detection logic circuit 1100 may be realized using a NOR gate that outputs a value of '1' when all of the bits included in the first data DA1 have a value of '0' and outputs a value of '0' when at least one of the bits included in the first data DA1 has a value of '1'.

The second zero-detection logic circuit 1200 may output the first value when all of the bits included in the second data DA2 have a value of '0' and may output the second value when at least one of the bits included in the second data DA2 has a value of '1'. In an embodiment, the second zero-detection logic circuit 1200 may be realized using a NOR gate that outputs a value of '1' when all of the bits included in the second data DA2 have a value of '0' and outputs a value of '0' when at least one of the bits included in the second data DA2 has a value of '1'.

The I/O control unit 1300 may disable the input of the multiplier 2001 and may generate the zero data including bits having a value of '0' as output data of the multiplier 2001, when at least one of an output value D1 of the first zero-detection logic circuit 1100 and an output value D2 of the second zero-detection logic circuit 1200 has the first value. The I/O control unit 1300 may allow the multiplier 2001 to receive the first data DA1 and the second data DA2 when both of the output value D1 of the first zero-detection logic circuit 1100 and the output value D2 of the second zero-detection logic circuit 1200 have the second value.

The I/O control unit 1300 may include an OR gate 1310, an inverter 1320, and a control logic circuit 1330. The OR gate 1310 may perform a logical OR operation of the output value D1 of the first zero-detection logic circuit 1100 and the output value D2 of the second zero-detection logic circuit 1200 to output the result of the logical OR operation. The OR gate 1310 may output a value of '0' when both of the output value D1 of the first zero-detection logic circuit 1100 and the output value D2 of the second zero-detection logic circuit 1200 have a value of '0' and may output a value of '1' when at least one of the output value D1 of the first zero-detection logic circuit 1100 and the output value D2 of the second zero-detection logic circuit 1200 has a value of '1'.

The inverter 1320 may invert an output value IN1 of the OR gate 1310 to output the inverted value of the output value IN1 of the OR gate 1310. The inverter 1320 may output a value of '0' when the output value IN1 of the OR gate 1310 has a value of '1' and may output a value of '1' when the output value IN1 of the OR gate 1310 has a value of '0'.

The control logic circuit 1330 may receive the output value IN1 of the OR gate 1310 and an output value IN2 of the inverter 1320. When the output value IN1 of the OR gate 1310 has a value of '1' and the output value IN2 of the inverter 1320 has a value '0', the control logic circuit 1330 may disable the input of the multiplier 2001 and may generate the zero data including bits having a value of '0' as output data of the multiplier 2001. When the output value IN1 of the OR gate 1310 has a value of '0' and the output value IN2 of the inverter 1320 has a value '1', the control logic circuit 1330 may allow the input of the multiplier 2001 to receive the first and second data DA1 and DA2.

The control logic circuit 1330 may include a first data control logic circuit 1331, a second data control logic circuit 1332, and an output control logic circuit 1333. The first data control logic circuit 1331 and the second data control logic circuit 1332 may determine input enablement/disablement of the multiplier 2001. The first data control logic circuit 1331 may control whether the first data DA1 are inputted to the multiplier 2001, and the second data control logic circuit 1332 may control whether the second data DA2 are inputted to the multiplier 2001. The output control logic circuit 1333 may disable the input of the multiplier 2001 and may generate the zero data including bits having a value of '0' as output data of the multiplier 2001, when the inverter 1320 outputs the output value IN2 having a value of '0' to the output control logic circuit 1333. The output control logic circuit 1333 does not operate when the inverter 1320 outputs the output value IN2 having a value of '1' to the output control logic circuit 1333. That is, no data are outputted from the output control logic circuit 1333 when the inverter 1320 outputs the output value IN2 having a value of '1' to the output control logic circuit 1333.

The first data control logic circuit 1331 may include a plurality of first transfer gates corresponding to respective bits included in the first data DA1. Each of the plurality of first transfer gates may include a first input terminal 1331-1 coupled to one of the bits included in the first data DA1, a first output terminal 1331-2 coupled to the multiplier 2001, and a first controller 1331-3 coupled between the first input terminal 1331-1 and the first output terminal 1331-2. The first controller 1331-3 may receive the output value IN1 of the OR gate 1310 and the output value IN2 of the inverter 1320. The first controller 1331-3 may include a first PMOS transistor 1331-3P receiving the output value IN1 of the OR gate 1310 and a first NMOS transistor 1331-3N receiving the output value IN2 of the inverter 1320. The first PMOS transistor 1331-3P and the first NMOS transistor 1331-3N may be coupled to constitute one transfer gate.

The second data control logic circuit 1332 may include a plurality of second transfer gates corresponding to respective bits included in the second data DA2. Each of the plurality of second transfer gates may include a second input terminal 1332-1 coupled to one of the bits included in the second data DA2, a second output terminal 1332-2 coupled to the multiplier 2001, and a second controller 1332-3 coupled between the second input terminal 1332-1 and the second output terminal 1332-2. The second controller 1332-3 may receive the output value IN1 of the OR gate 1310 and the output value IN2 of the inverter 1320. The second controller 1332-3 may include a second PMOS transistor 1332-3P receiving the output value IN1 of the OR gate 1310 and a second NMOS transistor 1332-3N receiving the output value IN2 of the inverter 1320. The second PMOS transistor 1332-3P and the second NMOS transistor 1332-3N may be coupled to constitute one transfer gate.

In an embodiment, the output value IN1 of the OR gate 1310 may have a value of '1', and the output value IN2 of the inverter 1320 may have a value of '0'. In such a case, all of the first PMOS transistor 1331-3P, the first NMOS transistor 1331-3N, the second PMOS transistor 1332-3P, and the second NMOS transistor 1332-3N may be turned off. Thus, all of the first controllers 1331-3 in the first data control logic circuit 1331 may inhibit the first data DA1 inputted to the first input terminals 1331-1 from being outputted to the first output terminals 1331-2, and all of the second controllers 1332-3 in the second data control logic circuit 1332 may also inhibit the second data DA2 inputted to the second input terminals 1332-1 from being outputted to the second output terminals 1332-2. Accordingly, because the first and second data DA1 and DA2 cannot be inputted to the multiplier 2001, no multiplying calculation is performed by the multiplier 2001.

In another embodiment, the output value IN1 of the OR gate 1310 may have a value of '0', and the output value IN2 of the inverter 1320 may have a value of '1'. In such a case, all of the first PMOS transistor 1331-3P, the first NMOS transistor 1331-3N, the second PMOS transistor 1332-3P, and the second NMOS transistor 1332-3N may be turned on. Thus, all of the first controllers 1331-3 in the first data control logic circuit 1331 may allow the first data DA1 inputted to the first input terminals 1331-1 to be transferred to the first output terminals 1331-2, and all of the second controllers 1332-3 in the second data control logic circuit 1332 may also allow the second data DA2 inputted to the second input terminals 1332-1 to be transferred to the second output terminals 1332-2. Accordingly, because the first and second data DA1 and DA2 are inputted to the multiplier 2001, the multiplier 2001 may perform the multiplying calculation of the first and second data DA1 and DA2 to output the result of the multiplying calculation.

Figure 37:
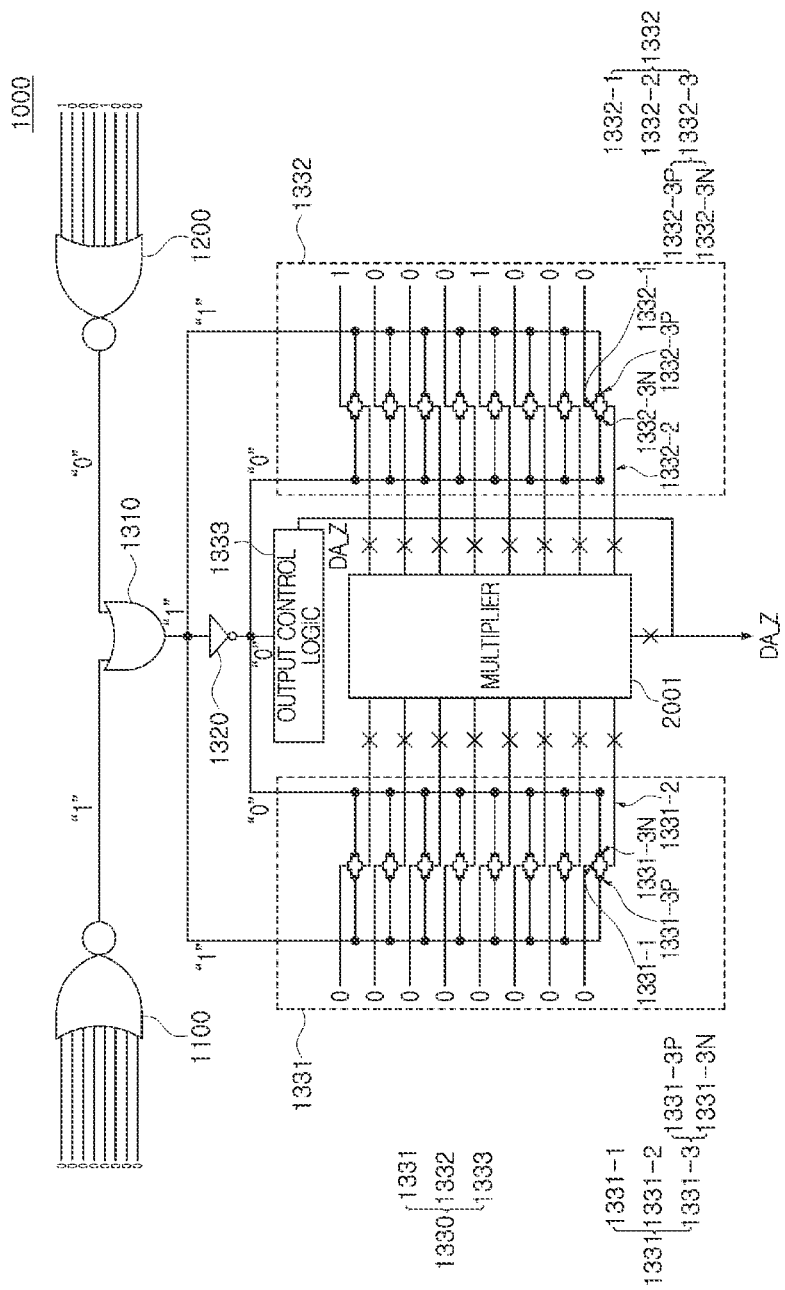
FIGS. 37 to 39 illustrate an operation of the zero-detection circuit illustrated in FIG. 36.
Figure 38:
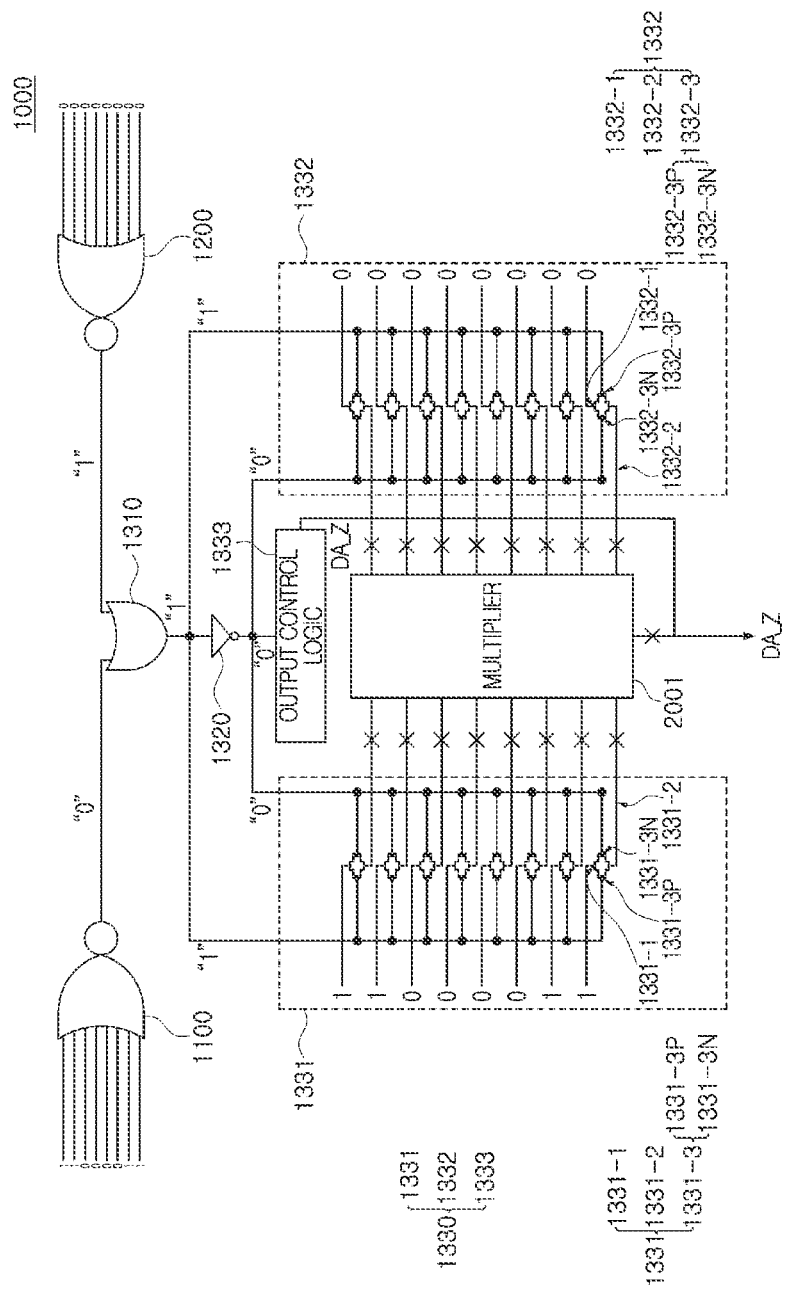
Figure 39:
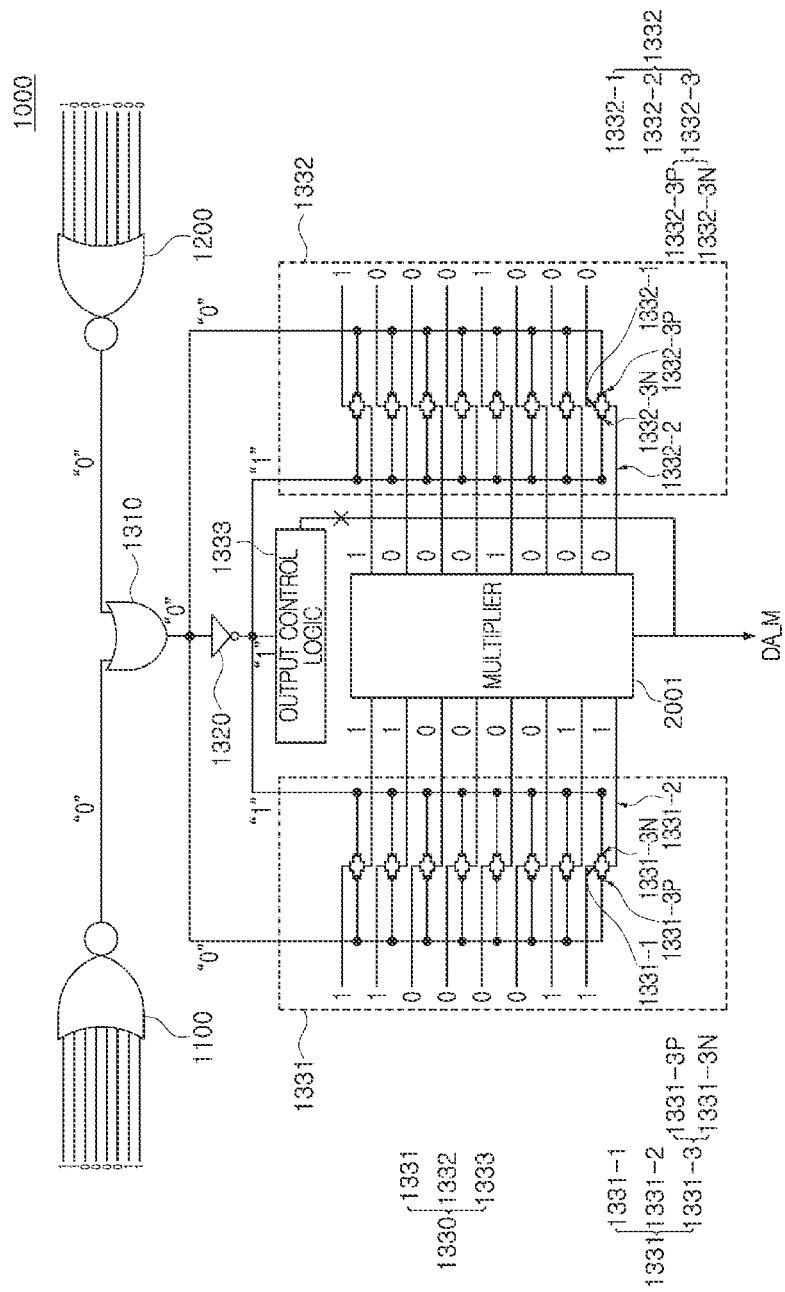

FIGS. 37 to 39 illustrate operations of the zero-detection circuit 1000 illustrated in FIG. 36. Specifically, FIG. 37 illustrates an operation of the zero-detection circuit 1000 with data flow when the first data DA1 have a binary stream of '00000000' and the second data DA2 have a binary stream of '10001000'. FIG. 38 illustrates an operation of the zero-detection circuit 1000 with data flow when the first data DA1 have a binary stream of '11000011' and the second data DA2 have a binary stream of '00000000'. FIG. 39 illustrates an operation of the zero-detection circuit 1000 with data flow when the first data DA1 have a binary stream of '11000011' and the second data DA2 have a binary stream of '10001000'.

Referring to FIG. 37, the first zero-detection logic circuit 1100 may output a value of '1' because all of the bits included in the first data DA1 have a value of '0', and the second zero-detection logic circuit 1200 may output a value of '0' because at least one of the bits included in the second data DA2 has a value of '1'. The OR gate 1310 may receive the output value '1' of the first zero-detection logic circuit 1100 and the output value '0' of the second zero-detection logic circuit 1200 to output a value of '1'. The inverter 1320 may receive the output value '1' of the OR gate 1310 to output a value of '0'.

The first PMOS transistors 1331-3P of the first data control logic circuit 1331 may be turned off in response to the output value '1' of the OR gate 1310, and the first NMOS transistors 1331-3N of the first data control logic circuit 1331 may also be turned off in response to the output value '0' of the inverter 1320. Thus, the first data DA1 inputted to the first input terminals 1331-1 of the first data control logic circuit 1331 cannot be transmitted to the multiplier 2001.

Similarly, the second PMOS transistors 1332-3P of the second data control logic circuit 1332 may be turned off in response to the output value '1' of the OR gate 1310, and the second NMOS transistors 1332-3N of the second data control logic circuit 1332 may also be turned off in response to the output value '0' of the inverter 1320. Thus, the second data DA2 inputted to the second input terminals 1332-1 of the second data control logic circuit 1332 cannot be transmitted to the multiplier 2001.

The output control logic circuit 1333 may receive the output value '0' of the inverter 1320 to output the zero data DA_Z including bits, all of which have a value of '0'. In such a case, the zero data DA_Z may be 16-bit data of '0000000000000000'.

Referring to FIG. 38, the first zero-detection logic circuit 1100 may output a value of '0' because at least one of the bits included in the first data DA1 has a value of '1', and the second zero-detection logic circuit 1200 may output a value of '1' because all of the of bits included in the second data DA2 have a value of '0'. The OR gate 1310 may receive the output value '0' of the first zero-detection logic circuit 1100 and the output value '1' of the second zero-detection logic circuit 1200 to output a value of '1'. The inverter 1320 may receive the output value '1' of the OR gate 1310 to output a value of '0'.

The output value of the OR gate 1310 and the output value of the inverter 1320 in an example of FIG. 38 are equal to the output value of the OR gate 1310 and the output value of the inverter 1320 in an example of FIG. 37, respectively. Thus, the first data control logic circuit 1331, the second data control logic circuit 1332, and the output control logic circuit 1333 illustrated in FIG. 38 may perform the same operations as the first data control logic circuit 1331, the second data control logic circuit 1332, and the output control logic circuit 1333 illustrated in FIG. 37. Accordingly, descriptions for the operations of the first data control logic circuit 1331, the second data control logic circuit 1332, and the output control logic circuit 1333 illustrated in FIG. 38 will be omitted hereinafter.

Referring to FIG. 39, the first zero-detection logic circuit 1100 may output a value of '0' because at least one of the bits included in the first data DA1 have a value of '1', and the second zero-detection logic circuit 1200 may also output a value of '0' because at least one of the bits included in the second data DA2 have a value of '1'. The OR gate 1310 may receive the output value '0' of the first zero-detection logic circuit 1100 and the output value '0' of the second zero-detection logic circuit 1200 to output a value of '0'. The inverter 1320 may receive the output value '0' of the OR gate 1310 to output a value of '1'.

The first PMOS transistors 1331-3P of the first data control logic circuit 1331 may be turned on in response to the output value '0' of the OR gate 1310, and the first NMOS transistors 1331-3N of the first data control logic circuit 1331 may also be turned on in response to the output value '1' of the inverter 1320. Thus, the first data DA1 inputted to the first input terminals 1331-1 of the first data control logic circuit 1331 may be inputted to the multiplier 2001 through the first output terminals 1331-2.

Similarly, the second PMOS transistors 1332-3P of the second data control logic circuit 1332 may be turned on in response to the output value '0' of the OR gate 1310, and the second NMOS transistors 1332-3N of the second data control logic circuit 1332 may also be turned on in response to the output value '1' of the inverter 1320. Thus, the second data DA2 inputted to the second input terminals 1332-1 of the second data control logic circuit 1332 may be inputted to the multiplier 2001 through the second output terminals 1332-2.

The output control logic circuit 1333 does not operate in response to the output value '1' of the inverter 1320. Thus, no data are outputted from the output control logic circuit 1333. In such a case, the multiplier 2001 may perform a multiplying calculation of the first and second data DA1 and DA2 to generate and output the multiplication result data DA_M. The multiplication result data DA_M may be 16-bit data of '0110011110011000'.

Figure 40:
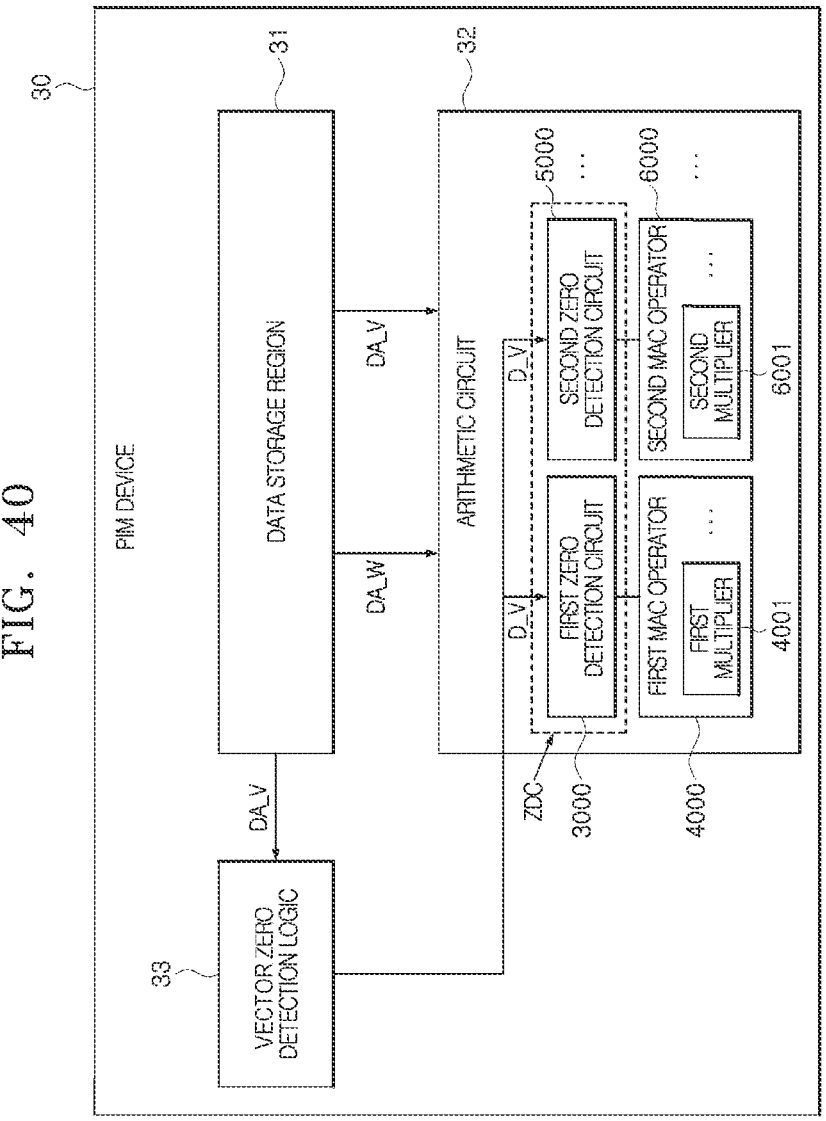
FIG. 40 is a block diagram illustrating a configuration of a PIM device according to another embodiment of the present disclosure.

FIG. 40 is a block diagram illustrating a configuration of a PIM device 30 according to another embodiment of the present disclosure. Referring to FIG. 40, the PIM device 30 may include a data storage region 31, an arithmetic circuit 32, and a vector zero-detection logic circuit 33. The data storage region 31 may store weight data DA_W corresponding to the first data DA1 and vector data DA_V corresponding to the second data DA2. The arithmetic circuit 32 may perform the MAC arithmetic operation of the weight data DA_W and the vector data DA_V outputted from the data storage region 31. The vector zero-detection logic circuit 33 may output a first value when all of the bits included in the vector data DA_V have a value of '0' and may output a second value when at least one of the bits included in the vector data DA_V has a value of '1'. An output value D_V of the vector zero-detection logic circuit 33 may be inputted to the arithmetic circuit 32. The descriptions of the PIM device 10 illustrated in FIG. 1 may also be equally applicable to the PIM device 30 illustrated in FIG. 40. For example, the PIM device 30 may operate in the memory mode or the MAC arithmetic mode, like the PIM device 10 illustrated in FIG. 1.

The arithmetic circuit 32 may include at least one zero-detection circuit ZDC. The zero-detection circuit ZDC may include a first zero-detection circuit 3000 and a second zero-detection circuit 5000. Each of the first zero-detection circuit 3000 and the second zero-detection circuit 5000 may receive the output value D_V from the vector zero-detection logic circuit 33. The arithmetic circuit 32 may include a first MAC operator 4000 having a plurality of first multipliers 4001 and a second MAC operator 6000 having a plurality of second multipliers 6001. The zero-detection circuit ZDC may disable the input of the first and second multipliers 4001 and 6001 and may generate zero data including multiple bits, all of which have a value of zero, as output data of the multipliers 4001 and 6001, when the zero-detection circuit ZDC receives the output value D_V having the first value from the vector zero-detection logic circuit 33.

Figure 41:
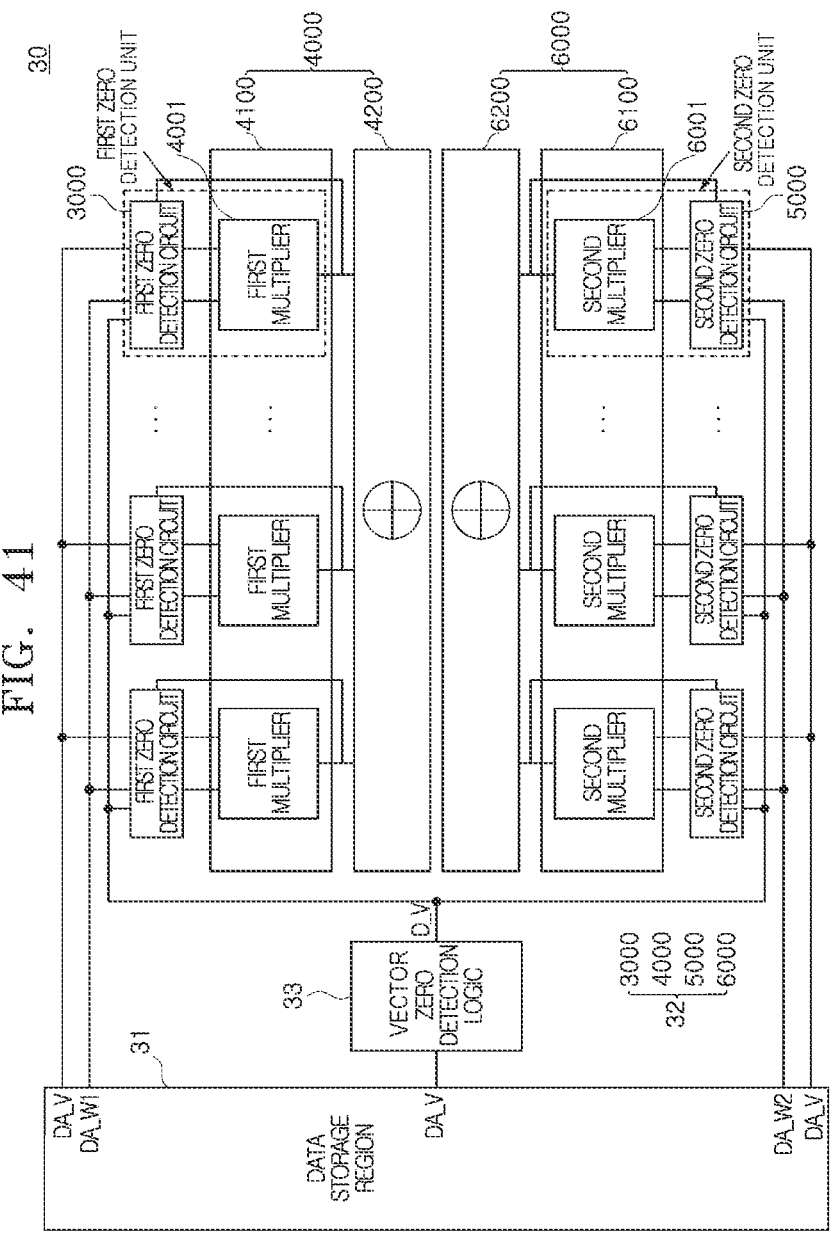
FIG. 41 illustrates a detailed configuration of the PIM device illustrated in FIG. 40.
Figure 42:
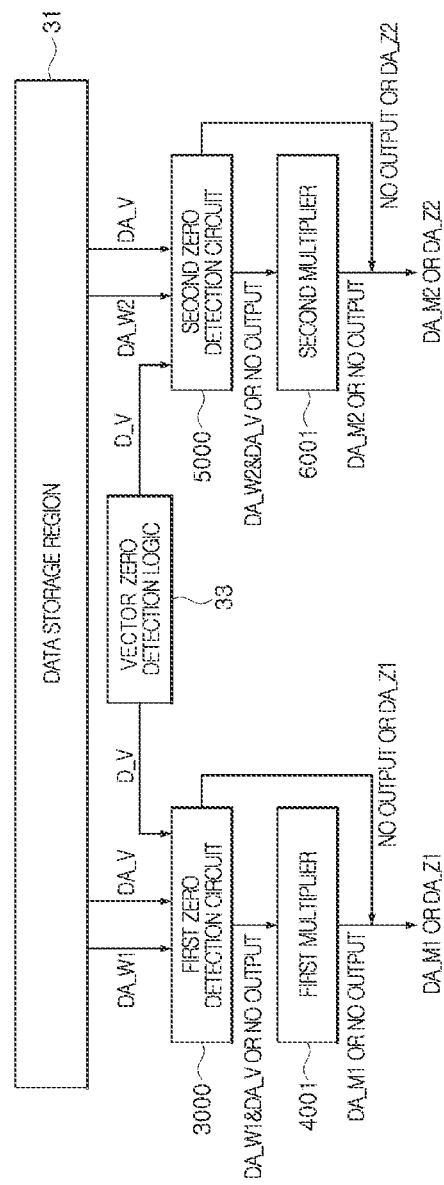
FIG. 42 illustrates data flow in the PIM device illustrated in FIG. 40.

FIG. 41 illustrates a detailed configuration of the PIM device 30 illustrated in FIG. 40, and FIG. 42 illustrates data flow in the PIM device 30 illustrated in FIG. 40. Referring to FIGS. 41 and 42, the first MAC operator 4000 may include a first multiplication logic circuit 4100 having the plurality of first multipliers 4001 and a first addition logic circuit 4200 having a plurality of first adders. The first multiplication logic circuit 4100 and the first addition logic circuit 4200 may have substantially the same configurations as the multiplication logic circuit 222-1 and the addition logic circuit 222-2 illustrated in FIG. 7, respectively. Thus, descriptions of the first multiplication logic circuit 4100 and the first addition logic circuit 4200 will be omitted hereinafter. The second MAC operator 6000 may include a second multiplication logic circuit 6100 having the plurality of second multipliers 6001 and a second addition logic circuit 6200 having a plurality of second adders. The second multiplication logic circuit 6100 and the second addition logic circuit 6200 may have substantially the same configurations as the multiplication logic circuit 222-1 and the addition logic circuit 222-2 illustrated in FIG. 7, respectively. Thus, descriptions of the second multiplication logic circuit 6100 and the second addition logic circuit 6200 will be omitted hereinafter.

One of the first zero-detection circuits 3000 and one of the first multipliers 4001 may constitute one first zero-detection unit. Descriptions of the one first zero-detection unit may be equally applicable to other first zero-detection units. One of the second zero-detection circuits 5000 and one of the second multipliers 6001 may constitute one second zero-detection unit. Descriptions of the one second zero-detection unit may be equally applicable to other second zero-detection units.

The weight data DA_W may include first weight data DA_W1 and second weight data DA_W2. The first weight data DA_W1 and the vector data DA_V may be inputted to the first MAC operator 4000, and the second weight data DA_W2 and the vector data DA_V may be inputted to the second MAC operator 6000. Each of the first multipliers 4001 of the first MAC operator 4000 may perform a multiplying calculation of the first weight data DA_W1 and the vector data DA_V, and each of the second multipliers 6001 of the second MAC operator 6000 may perform a multiplying calculation of the second weight data DA_W2 and the vector data DA_V.

The first zero-detection circuits 3000 may be located adjacent to the first multipliers 4001 of the first MAC operator 4000, respectively. Each of the first zero-detection circuits 3000 may receive the first weight data DA_W1 and the vector data DA_V from the data storage region 31. The first zero-detection circuit 3000 may output the first weight data DA_W1 and the vector data DA_V to the first multiplier 4001 or may output no data according to the output value D_V of the vector zero-detection logic circuit 33. In addition, the first zero-detection circuit 3000 may output the first weight data DA_W1 and the vector data DA_V to the first multiplier 4001 or may output no data according to bit values of the first weight data DA_W1.

The first zero-detection circuit 3000 may disable the input of the first multiplier 4001 and may generate first zero data DA_Z1 including multiple bits, all of which have a value of zero, as output data of the first multiplier 4001, when the first zero-detection circuit 3000 receives the output value D_V having a value of '1' from the vector zero-detection logic circuit 33. The first zero data DA_Z1 may be inputted to the first addition logic circuit 4200. In contrast, the first zero-detection circuit 3000 may check the bit values of the first weight data DA_W1 and may control the input and output of the first multiplier 4001 according to the check result of the bit values of the first weight data DA_W1, when the first zero-detection circuit 3000 receives the output value D_V having a value of '0' from the vector zero-detection logic circuit 33. When all of the bits included in the first weight data DA_W1 have a value of '0' as a result of the checking process for the bit values of the first weight data DA_W1, the first zero-detection circuit 3000 may disable the input of the first multiplier 4001 and may generate the first zero data DA_Z1 including multiple bits, all of which have a value of zero, as output data of the first multiplier 4001. When at least one of the bits included in the first weight data DA_W1 has a value of '1' as a result of the checking process for the bit values of the first weight data DA_W1, the first zero-detection circuit 3000 may transmit the first weight data DA_W1 and the vector data DA_V to the first multiplier 4001. Thus, the first multiplier 4001 may perform a multiplying calculation of the first weight data DA_W1 and the vector data DA_V to output first multiplication result data DA_M1. The first multiplication result data DA_M1 may be inputted to the first addition logic circuit 4200.

The second zero-detection circuits 5000 may be located adjacent to the second multipliers 6001 of the second MAC operator 6000, respectively. Each of the second zero-detection circuits 5000 may receive the second weight data DA_W2 and the vector data DA_V from the data storage region 31. The second zero-detection circuit 5000 may output the second weight data DA_W2 and the vector data DA_V to the second multiplier 6001 or may output no data according to the output value D_V of the vector zero-detection logic circuit 33. In addition, the second zero-detection circuit 5000 may output the second weight data DA_W2 and the vector data DA_V to the second multiplier 6001 or may output no data according to bit values of the second weight data DA_W2.

The second zero-detection circuit 5000 may disable the input of the second multiplier 6001 and may generate second zero data DA_Z2 including multiple bits, all of which have a value of zero, as output data of the second multiplier 6001, when the second zero-detection circuit 5000 receives the output value D_V having a value of '1' from the vector zero-detection logic circuit 33. The second zero data DA_Z2 may be inputted to the second addition logic circuit 6200. In contrast, the second zero-detection circuit 5000 may check the bit values of the second weight data DA_W2 and may control the input and output of the second multiplier 6001 according to the check result of the bit values of the second weight data DA_W2, when the second zero-detection circuit 5000 receives the output value D_V having a value of '0' from the vector zero-detection logic circuit 33. When all of the bits included in the second weight data DA_W2 have a value of '0' as a result of the checking process for the bit values of the second weight data DA_W2, the second zero-detection circuit 5000 may disable the input of the second multiplier 6001 and may generate the second zero data DA_Z2 including multiple bits, all of which have a value of zero, as output data of the second multiplier 6001. When at least one of the bits included in the second weight data DA_W2 has a value of '1' as a result of the checking process for the bit values of the second weight data DA_W2, the second zero-detection circuit 5000 may transmit the second weight data DA_W2 and the vector data DA_V to the second multiplier 6001. Thus, the second multiplier 6001 may perform a multiplying calculation of the second weight data DA_W2 and the vector data DA_V to output second multiplication result data DA_M2. The second multiplication result data DA_M2 may be inputted to the second addition logic circuit 6200.

The vector data DA_V may be transmitted to each of the first multipliers 4001 in the first MAC operator 4000 and each of the second multipliers 6001 in the second MAC operator 6000. Thus, according to the PIM device 30, when all of the bits included in the vector data DA_V have a value of '0', the first and second zero-detection circuits 3000 and 5000 may disable the input of the first and second multipliers 4001 and 6001 regardless of the bit values of the first and second weight data DA_W1 and DA_W2 to prevent the first and second multipliers 4001 and 6001 from performing unnecessary multiplying calculations. Accordingly, it may be possible to reduce power consumption during the MAC arithmetic operation of the PIM device 30. In addition, according to the PIM device 30, when at least one of the bits included in the vector data DA_V has a value of '1', the first zero-detection circuit 3000 (or the second zero-detection circuit 5000) may check the bit values of the first weight data DA_W1 (or the second weight data DA_W2). When all of the bits included in the first weight data DA_W1 (or the second weight data DA_W2) have a value of '0' as a result of the checking process for the bit values of the first weight data DA_W1 (or the second weight data DA_W2), the first zero-detection circuit 3000 (or the second zero-detection circuit 5000) may inhibit the first weight data DA_W1 (or the second weight data DA_W2) from being inputted to the first multiplier 4001 (or the second multiplier 6001).

Figure 43:
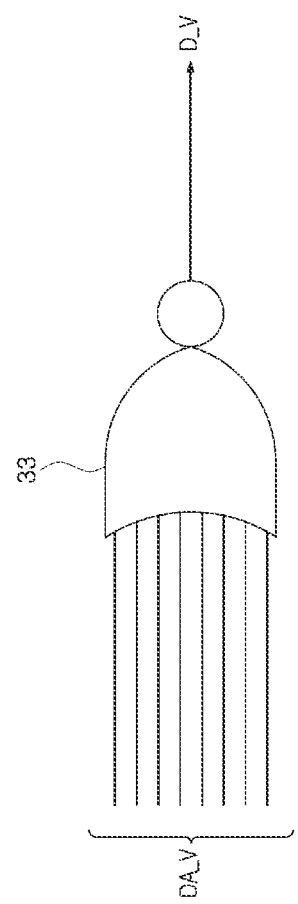
FIG. 43 illustrates an example of a vector zero-detection logic circuit included in the PIM device illustrated in FIG. 40.

FIG. 43 illustrates an example of the vector zero-detection logic circuit 33 included in the PIM device 30 illustrated in FIG. 40. Referring to FIG. 43, the vector zero-detection logic circuit 33 may receive the vector data DA_V from the data storage region (31 of FIG. 40). The vector zero-detection logic circuit 33 may be realized using a NOR gate. The vector zero-detection logic circuit 33 may output a value of '1' as the output value D_V when all of the bits included in the vector data DA_V have a value of '0' and may output a value of '0' as the output value D_V when at least one of the bits included in the vector data DA_V has a value of '1'.

Referring to FIGS. 32 and 40 to 43, it may be assumed that the first weight data DA_W1 are comprised of elements W0.0, . . . , and W0.7 arrayed in a first row of an '8×8' weight matrix, the second weight data DA_W2 are comprised of elements W1.0, . . . , and W1.7 arrayed in a second row of the '8×8' weight matrix, and the vector data DA_V are comprised of elements X0.0, . . . , and X7.0 of an '8×1' vector matrix. In such a case, each of the elements included in the first weight data DA_W1, the second weight data DA_W2, and the vector data DA_V may be an 8-bit binary stream. Specifically, the element W0.1 may be an 8-bit binary stream of '00000000', and each of the elements W0.0 and W0.2~W0.7 may be an 8-bit binary stream including at least one bit having a value of '1'. Moreover, the element W1.1 may be an 8-bit binary stream of '00000000', and each of the elements W1.0 and W1.2~W1.7 may be an 8-bit binary stream including at least one bit having a value of '1'. In addition, the element X0.0 may be an 8-bit binary stream of '00000000', and each of the elements X1.0~X7.0 may be an 8-bit binary stream including at least one bit having a value of '1'. In the present embodiment, for the purpose of ease and convenience in explanation, it may be assumed that the arithmetic circuit 32 includes '8'-number of first multipliers 4001, '8'-number of first zero-detection circuits 3000 allocated to respective ones of the '8'-number of first multipliers 4001, '8'-number of second multipliers 6001, and '8'-number of second zero-detection circuits 5000 allocated to respective ones of the '8'-number of second multipliers 6001.

The element X0.0 inputted to the vector zero-detection logic circuit 33 may be data including 8 bits, all of which have a value of '0'. Thus, the vector zero-detection logic circuit 33 receiving the element X0.0 may output a value of '1' as the output value D_V. The output value D_V of '1' outputted from the vector zero-detection logic circuit 33 may be transmitted to all of the first and second zero-detection circuits 3000 and 5000. Thus, the first one of the first zero-detection circuits 3000 may disable the input of the first one among the first multipliers 4001 to inhibit the elements X0.0 and W0.0 from being inputted to the first one of the first multipliers 4001. In addition, the first one of the first zero-detection circuits 3000 may generate 16-bit data of '0000000000000000' corresponding to the first zero data DA_Z1 as output data of the first one of the first multipliers 4001. Similarly, the first one of the second zero-detection circuits 5000 may disable the input of the first one among the second multipliers 6001 to inhibit the elements X0.0 and W1.0 from being inputted to the first one of the second multipliers 6001. In addition, the first one of the second zero-detection circuits 5000 may generate 16-bit data of '0000000000000000' corresponding to the second zero data DA_Z2 as output data of the first one of the second multipliers 6001.

As assumed above, each of the elements X1.0, . . . , 7.0 inputted to the vector zero-detection logic circuit 33 may be data including at least one bit having a value of '1'. Thus, the vector zero-detection logic circuit 33 receiving any one of the elements X1.0, . . . , 7.0 may output a value of '0' as the output value D_V. The output value D_V of '0' outputted from the vector zero-detection logic circuit 33 may be transmitted to all of the first and second zero-detection circuits 3000 and 5000. Thus, each of the first zero-detection circuits 3000 may check the bit values of the first weight data DA_W1, and each of the second zero-detection circuits 5000 may also check the bit values of the second weight data DA_W2.

As a result of the checking process for the bit values of the first weight data DA_W1, the element W0.1 may be data including 8 bits, all of which have a value of '0'. Thus, the second one of the first zero-detection circuits 3000 may disable the input of the second one of the first multipliers 4001 to inhibit the elements X1.0 and W0.1 from being inputted to the second one of the first multipliers 4001. In addition, the second one of the first zero-detection circuits 3000 may generate 16-bit data of '0000000000000000' corresponding to the first zero data DA_Z1 as output data of the second one of the first multipliers 4001. As assumed above, each of the elements W0.2~W0.7 may be data 8 bits, at least one of which has a value of '1'. Thus, the third to eighth ones of the first zero-detection circuits 3000 may allow the corresponding weight data and the vector data to be inputted to the third to eighth ones of the first multipliers 4001, respectively.

Data outputted from the first multipliers 4001 may be used for an adding calculation and an accumulating calculation of the first MAC operator 4000. Thus, the first MAC operator 4000 may finally generate MAC result data MAC0.0 by performing the MAC arithmetic operation of the first weight data DA_W1 and the vector data DA_V.

As a result of the checking process for the bit values of the second weight data DA_W2, the element W1.1 may be data including 8 bits, all of which have a value of '0'. Thus, the second one of the second zero-detection circuits 5000 may disable the input of the second one of the second multipliers 6001 to inhibit the elements X1.0 and W1.1 from being inputted to the second one of the second multipliers 6001. In addition, the second one of the second zero-detection circuits 5000 may generate 16-bit data of '0000000000000000' corresponding to the second zero data DA_Z2 as output data of the second one of the second multipliers 6001. As assumed above, each of the elements W1.2~W1.7 may be data 8 bits, at least one of which has a value of '1'. Thus, the third to eighth ones of the second zero-detection circuits 5000 may allow the corresponding weight data and the vector data to be inputted to the third to eighth ones of the second multipliers 6001, respectively.

Data outputted from the second multipliers 6001 may be used for an adding calculation and an accumulating calculation of the second MAC operator 6000. Thus, the second MAC operator 6000 may finally generate MAC result data MAC1.0 by performing the MAC arithmetic operation of the second weight data DA_W2 and the vector data DA_V.

Figure 44:
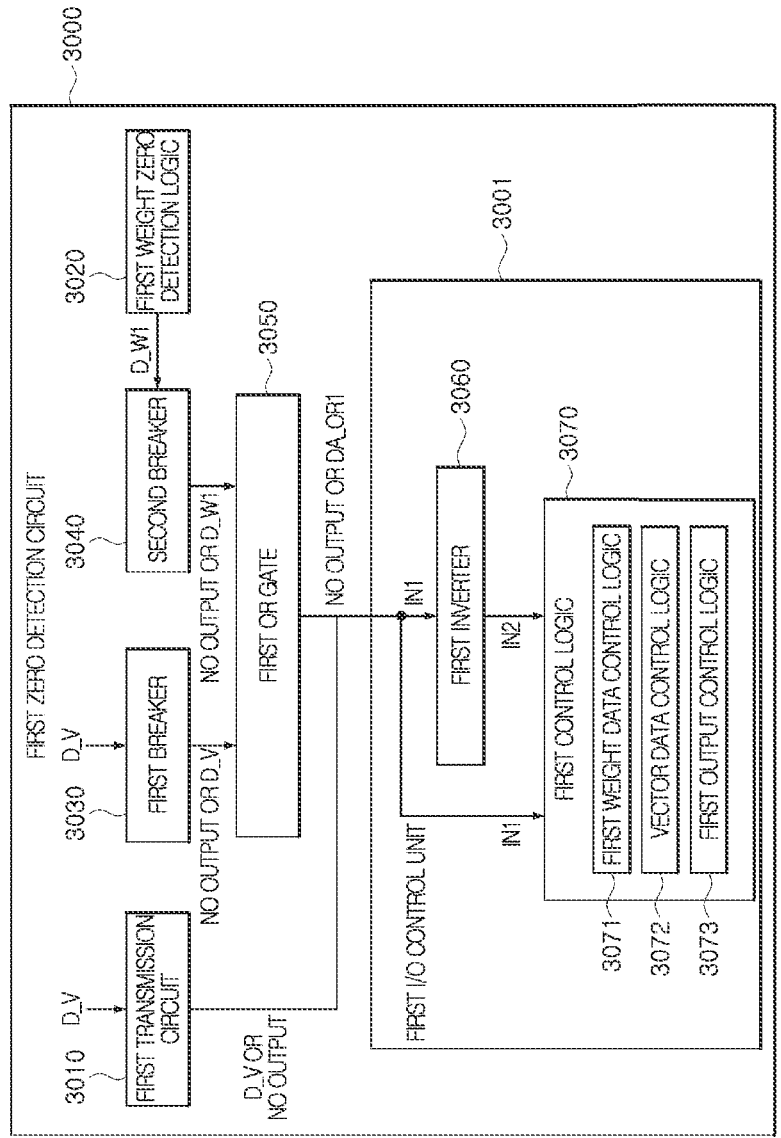
FIG. 44 is a block diagram illustrating a configuration of a first zero-detection circuit included in the PIM device illustrated in FIG. 40.
Figure 45:
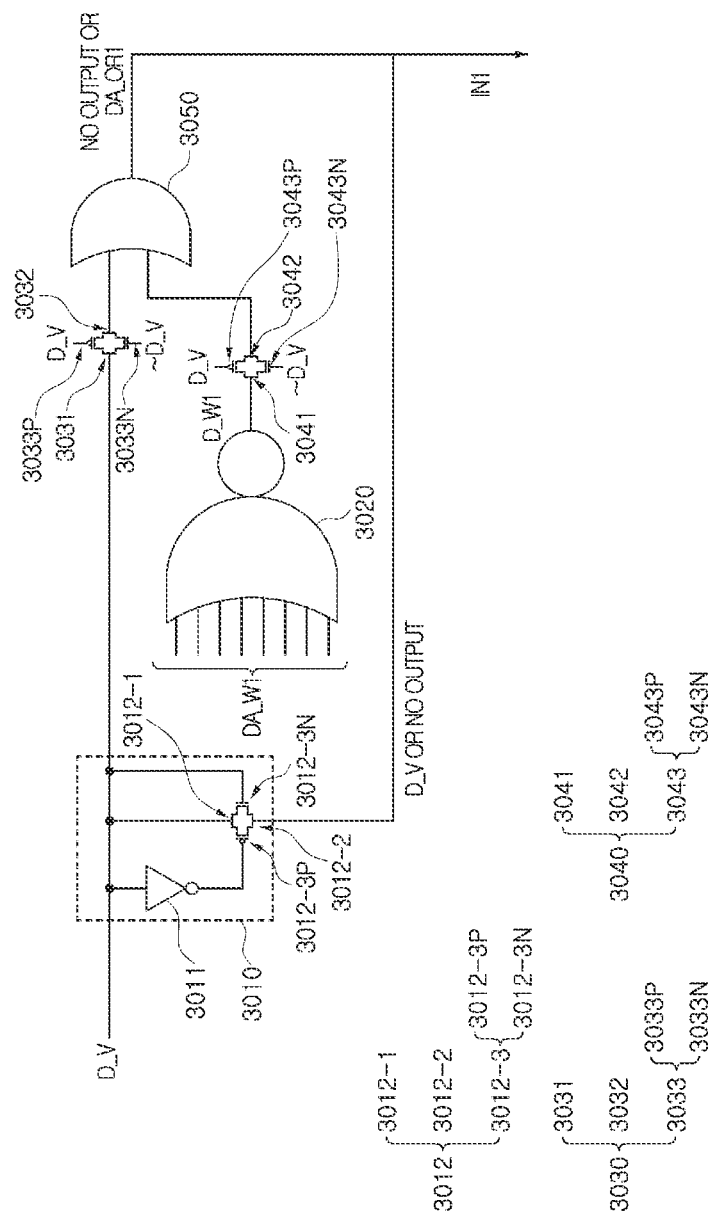
FIGS. 45 and 46 illustrate detailed configurations of the first zero-detection circuit illustrated in FIG. 44.
Figure 46:
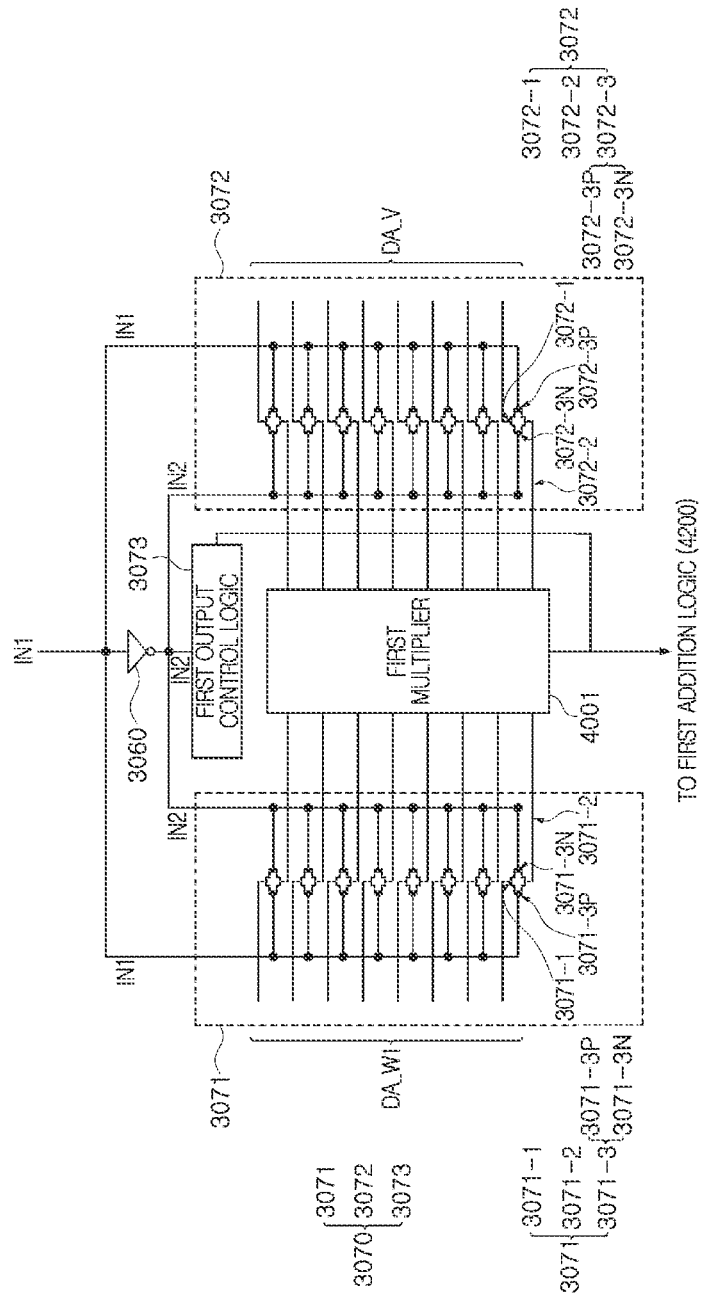

FIG. 44 is a block diagram illustrating a configuration of the first zero-detection circuit 3000 included in the PIM device 30 illustrated in FIG. 40, and FIGS. 45 and 46 illustrate detailed configurations of the first zero-detection circuit 3000 illustrated in FIG. 44. Referring to FIGS. 44 to 46, the first zero-detection circuit 3000 may include a first transmission circuit 3010, a first weight zero-detection logic circuit 3020, a first breaker 3030, a second breaker 3040, a first OR gate 3050, and a first I/O control unit 3001.

The first transmission circuit 3010 may receive the output value D_V from the vector zero-detection logic circuit 33. In an embodiment, when the vector zero-detection logic circuit 33 outputs a value of '1' as the output value D_V, the first transmission circuit 3010 may output the output value D_V as it is. Alternatively, when the vector zero-detection logic circuit 33 outputs a value of '0' as the output value D_V, the first transmission circuit 3010 does not output the output value D_V. That is, when the first transmission circuit 3010 receives the output value D_V having a value of '0', the first transmission circuit 3010 may output no data.

The first transmission circuit 3010 may include a first NOT gate 3011 and a first transfer gate 3012. The first NOT gate 3011 may receive and invert the output value D_V of the vector zero-detection logic circuit 33 to output the inverted value of the output value D_V. That is, the first NOT gate 3011 may output a value of '0' when the output value D_V of the vector zero-detection logic circuit 33 has a value of '1' and may output a value of '1' when the output value D_V of the vector zero-detection logic circuit 33 has a value of '0'. The first transfer gate 3012 may include an input terminal 3012-1 receiving the output value D_V of the vector zero-detection logic circuit 33, an output terminal 3012-2 coupled to the first I/O control unit 3001, and a PMOS transistor 3012-3P and an NMOS transistor 3012-3N which are coupled between the input terminal 3012-1 and the output terminal 3012-2. The PMOS transistor 3012-3P of the first transfer gate 3012 may operate in response to an output value of the first NOT gate 3011. The NMOS transistor 3012-3N of the first transfer gate 3012 may operate in response to the output value D_V of the vector zero-detection logic circuit 33.

In an embodiment, when the output value D_V of the vector zero-detection logic circuit 33 has a value of '1' and the output value of the first NOT gate 3011 has a value of '0', both of the PMOS transistor 3012-3P and the NMOS transistor 3012-3N may be turned on. In such a case, the output value D_V of '1' outputted from the vector zero-detection logic circuit 33 may be inputted to the first I/O control unit 3001 through the output terminal 3012-2. Alternatively, when the output value D_V of the vector zero-detection logic circuit 33 has a value of '0' and the output value of the first NOT gate 3011 has a value of '1', both of the PMOS transistor 3012-3P and the NMOS transistor 3012-3N may be turned off. In such a case, the first transfer gate 3012 may inhibit the output value D_V of '0' from being inputted to the first I/O control unit 3001.

The first weight zero-detection logic circuit 3020 may receive the first weight data DA_W1. The first weight zero-detection logic circuit 3020 may output a value of '1' when all of the bits included in the first weight data DA_W1 have a value of '0' and may output a value of '0' when at least one of the bits included in the first weight data DA_W1 has a value of '1'. The first weight zero-detection logic circuit 3020 may be realized using a NOR gate. In an embodiment, the first weight zero-detection logic circuit 3020 may operate only when the output value D_V of the vector zero-detection logic circuit 33 has a value of '0'.

The first breaker 3030 may receive the output value D_V of the vector zero-detection logic circuit 33. The first breaker 3030 may disable the output of the first breaker 3030 when the output value D_V of the vector zero-detection logic circuit 33 has a value of '1' and may output the output value D_V when the output value D_V of the vector zero-detection logic circuit 33 has a value of '0'.

The first breaker 3030 may include an input terminal 3031 receiving the output value D_V of the vector zero-detection logic circuit 33, an output terminal 3032 coupled to the first OR gate 3050, and a PMOS transistor 3033P and an NMOS transistor 3033N which are coupled between the input terminal 3031 and the output terminal 3032. The PMOS transistor 3033P of the first breaker 3030 may operate in response to the output value D_V of the vector zero-detection logic circuit 33. The NMOS transistor 3033N of the first breaker 3030 may operate in response to an inverted value of the output value D_V of the vector zero-detection logic circuit 33.

In an example of the present embodiment, when the output value D_V of the vector zero-detection logic circuit 33 has a value of '1', the inverted value of the output value D_V of the vector zero-detection logic circuit 33 may have a value of '0'. In such a case, both of the PMOS transistor 3033P and the NMOS transistor 3033N may be turned off. Thus, the first breaker 3030 may inhibit the output value D_V of '1' from being inputted to the first OR gate 3050. Alternatively, when the output value D_V of the vector zero-detection logic circuit 33 has a value of '0', the inverted value of the output value D_V of the vector zero-detection logic circuit 33 may have a value of '1'. In such a case, both of the PMOS transistor 3033P and the NMOS transistor 3033N may be turned on. Thus, the first breaker 3030 may allow the output value D_V of '0' to be inputted to the first OR gate 3050.

The second breaker 3040 may include an input terminal 3041 receiving an output value D_W1 of the first weight zero-detection logic circuit 3020, an output terminal 3042 coupled to the first OR gate 3050, and a PMOS transistor 3043P and an NMOS transistor 3043N which are coupled between the input terminal 3041 and the output terminal 3042. The PMOS transistor 3043P of the second breaker 3040 may operate in response to the output value D_V of the vector zero-detection logic circuit 33. The NMOS transistor 3043N of the second breaker 3040 may operate in response to an inverted value of the output value D_V of the vector zero-detection logic circuit 33.

In another example of the present embodiment, when the output value D_V of the vector zero-detection logic circuit 33 has a value of '1', the inverted value of the output value D_V of the vector zero-detection logic circuit 33 may have a value of '0'. In such a case, both of the PMOS transistor 3043P and the NMOS transistor 3043N may be turned off. Thus, the second breaker 3040 may inhibit the output value D_W1 of the first weight zero-detection logic circuit 3020 from being inputted to the first OR gate 3050. Alternatively, when the output value D_V of the vector zero-detection logic circuit 33 has a value of '0', the inverted value of the output value D_V of the vector zero-detection logic circuit 33 may have a value of '1'. In such a case, both of the PMOS transistor 3043P and the NMOS transistor 3043N may be turned on. Thus, the second breaker 3040 may allow the output value D_W1 to be inputted to the first OR gate 3050.

The first OR gate 3050 may receive output data of the first breaker 3030 and output data of the second breaker 3040 and may perform a logical OR operation of the output data of the first breaker 3030 and the output data of the second breaker 3040 to output the result of the logical OR operation. An output value DA_OR1 of the first OR gate 3050 may be inputted to the first I/O control unit 3001. The first OR gate 3050 may output a value of '1' when at least one of the output data of the first breaker 3030 and the output data of the second breaker 3040 has a value of '1'. The first OR gate 3050 may output a value of '0' when both of the output data of the first breaker 3030 and the output data of the second breaker 3040 have a value of '0'.

The first I/O control unit 3001 may disable the input of the first multiplier 4001 and may generate zero data including multiple bits, all of which have a value of '0', as output data of the first multiplier 4001, when any one of the first transmission circuit 3010 and the first OR gate 3050 outputs a value of '1'. The first I/O control unit 3001 may allow the first weight data DA_W1 and the vector data DA_V to be inputted to the first multiplier 4001 when a value of '0' is inputted to the first I/O control unit 3001.

More specifically, the first I/O control unit 3001 may include a first inverter 3060 and a first control logic circuit 3070. The first inverter 3060 may receive a first input value IN1 corresponding to an output value of any one of the first transmission circuit 3010 and the first OR gate 3050 to output an inverted value of the first input value IN1 as a second input value IN2. The first input value IN1 may correspond to the output value of the first transmission circuit 3010 (i.e., the output value D_V of the vector zero-detection logic circuit 33) or the output value DA_OR1 of the first OR gate 3050. The first inverter 3060 may output a value of '0' as the second input value IN2 when the first input value IN1 has a value of '1' and may output a value of '1' as the second input value IN2 when the first input value IN1 has a value of '0'.

The first control logic circuit 3070 may receive the first input value IN1 and the second input value IN2. In an example of the present embodiment, when the first input value IN1 has a value of '1' and the second input value IN2 has a value of '0', the first control logic circuit 3070 may disable the input of the first multiplier 4001 and may output zero data including multiple bits, all of which have a value of '0', as output data of the first multiplier 4001. In another example of the present embodiment, when the first input value IN1 has a value of '0' and the second input value IN2 has a value of '1', the first control logic circuit 3070 may allow the first weight data DA_W1 and the vector data DA_V to be inputted to the first multiplier 4001.

The first control logic circuit 3070 may include a first weight data control logic circuit 3071, a vector data control logic circuit 3072, and a first output control logic circuit 3073. The first weight data control logic circuit 3071 and the vector data control logic circuit 3072 may determine input enablement/disablement of the first multiplier 4001. The first weight data control logic circuit 3071 may control that the first weight data DA_W1 are inputted to the first multiplier 4001, and the vector data control logic circuit 3072 may control that the vector data DA_V are inputted to the first multiplier 4001. The first output control logic circuit 3073 may disable the input of the first multiplier 4001 and may output zero data including multiple bits, all of which have a value of '0', as the output data of the first multiplier 4001, when the first output control logic circuit 3073 receives the second input value IN2 having a value of '0'. The first output control logic circuit 3073 does not operate when the first output control logic circuit 3073 receives the second input value IN2 having a value of '1'. That is, no data are outputted from the first output control logic circuit 3073 when the first output control logic circuit 3073 receives the second input value IN2 having a value of '1'.

The first weight data control logic circuit 3071 may include a plurality of first input terminals 3071-1 receiving the first weight data DA_W1, a plurality of first output terminals 3071-2 coupled to the first multiplier 4001, and a plurality of first controllers 3071-3 coupled between the first input terminals 3071-1 and the first output terminals 3071-2 to receive the first input value IN1 and the second input value IN2. Each of the first controllers 3071-3 may include a first PMOS transistor 3071-3P receiving the first input value IN1 and a first NMOS transistor 3071-3N receiving the second input value IN2. The first PMOS transistor 3071-3P and the first NMOS transistor 3071-3N may be coupled to constitute one transfer gate.

The vector data control logic circuit 3072 may include a plurality of second input terminals 3072-1 receiving the vector data DA_V, a plurality of second output terminals 3072-2 coupled to the first multiplier 4001, and a plurality of second controllers 3072-3 coupled between the second input terminals 3072-1 and the second output terminals 3072-2 to receive the first input value IN1 and the second input value IN2. Each of the second controllers 3072-3 may include a second PMOS transistor 3072-3P receiving the first input value IN1 and a second NMOS transistor 3072-3N receiving the second input value IN2. The second PMOS transistor 3072-3P and the second NMOS transistor 3072-3N may be coupled to constitute one transfer gate.

In an example of the present embodiment, the first input value IN1 may have a value of '1', and the second input value IN2 may have a value of '0'. In such a case, all of the first PMOS transistor 3071-3P, the first NMOS transistor 3071-3N, the second PMOS transistor 3072-3P, and the second NMOS transistor 3072-3N may be turned off. Thus, all of the first controllers 3071-3 may inhibit the first weight data DA_W1 inputted to the first input terminals 3071-1 from being outputted to the first output terminals 3071-2, and all of the second controllers 3072-3 may also inhibit the vector data DA_V inputted to the second input terminals 3072-1 from being outputted to the second output terminals 3072-2. Accordingly, because the first weight data DA_W1 and the vector data DA_V are not inputted to the first multiplier 4001, no multiplying calculation is performed by the first multiplier 4001.

In another example of the present embodiment, the first input value IN1 may have a value of '0', and the second input value IN2 may have a value of '1'. In such a case, all of the first PMOS transistor 3071-3P, the first NMOS transistor 3071-3N, the second PMOS transistor 3072-3P, and the second NMOS transistor 3072-3N may be turned on. Thus, all of the first controllers 3071-3 may allow the first weight data DA_W1 inputted to the first input terminals 3071-1 to be transferred to the first output terminals 3071-2, and all of the second controllers 3072-3 may also allow the vector data DA_V inputted to the second input terminals 3072-1 to be transferred to the second output terminals 3072-2. Accordingly, the first weight data DA_W1 and the vector data DA_V may be inputted to the first multiplier 4001, and the first multiplier 4001 may perform a multiplying calculation of the first weight data DA_W1 and the vector data DA_V to output a result of the multiplying calculation.

Figure 47:
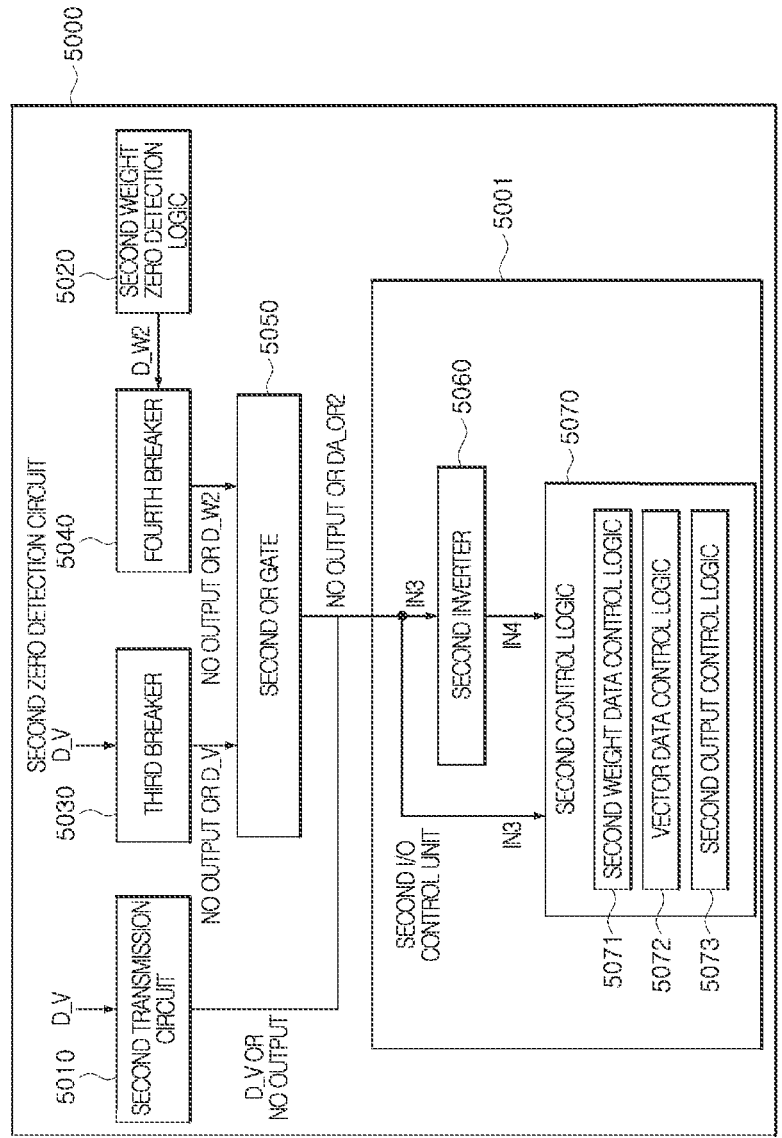
FIG. 47 is a block diagram illustrating a configuration of a second zero-detection circuit included in the PIM device illustrated in FIG. 40.
Figure 48:
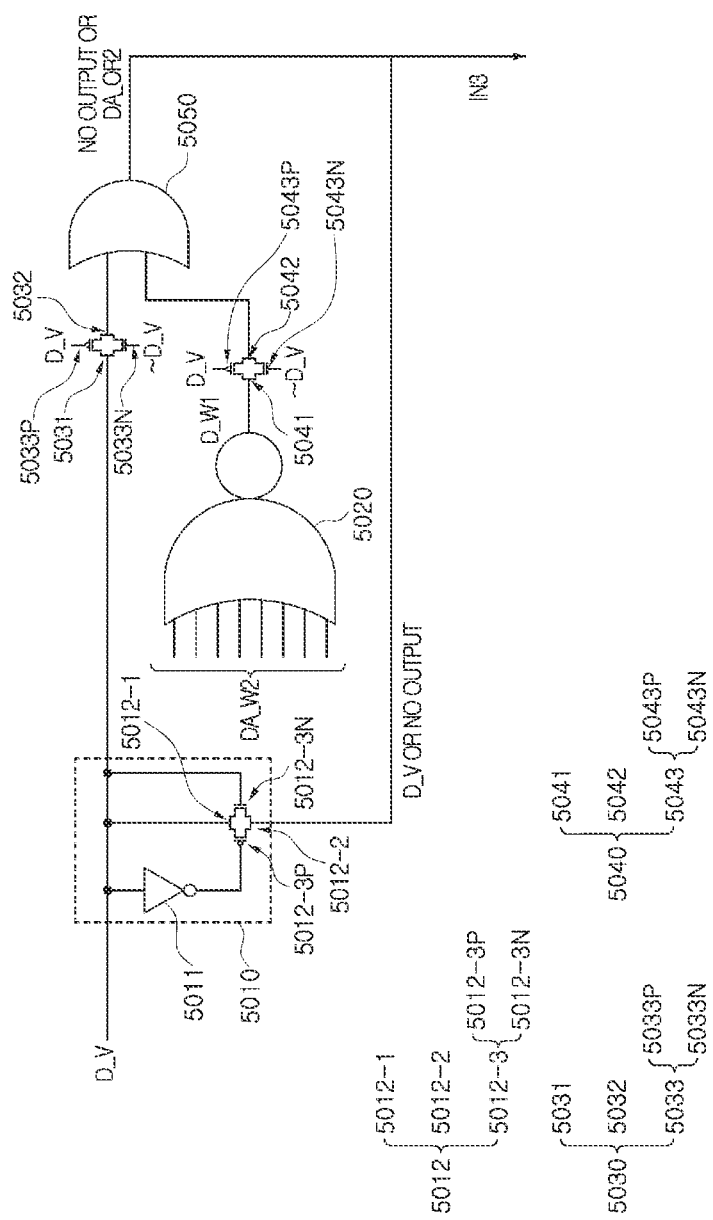
FIGS. 48 and 49 illustrate detailed configurations of the second zero-detection circuit illustrated in FIG. 47.
Figure 49:
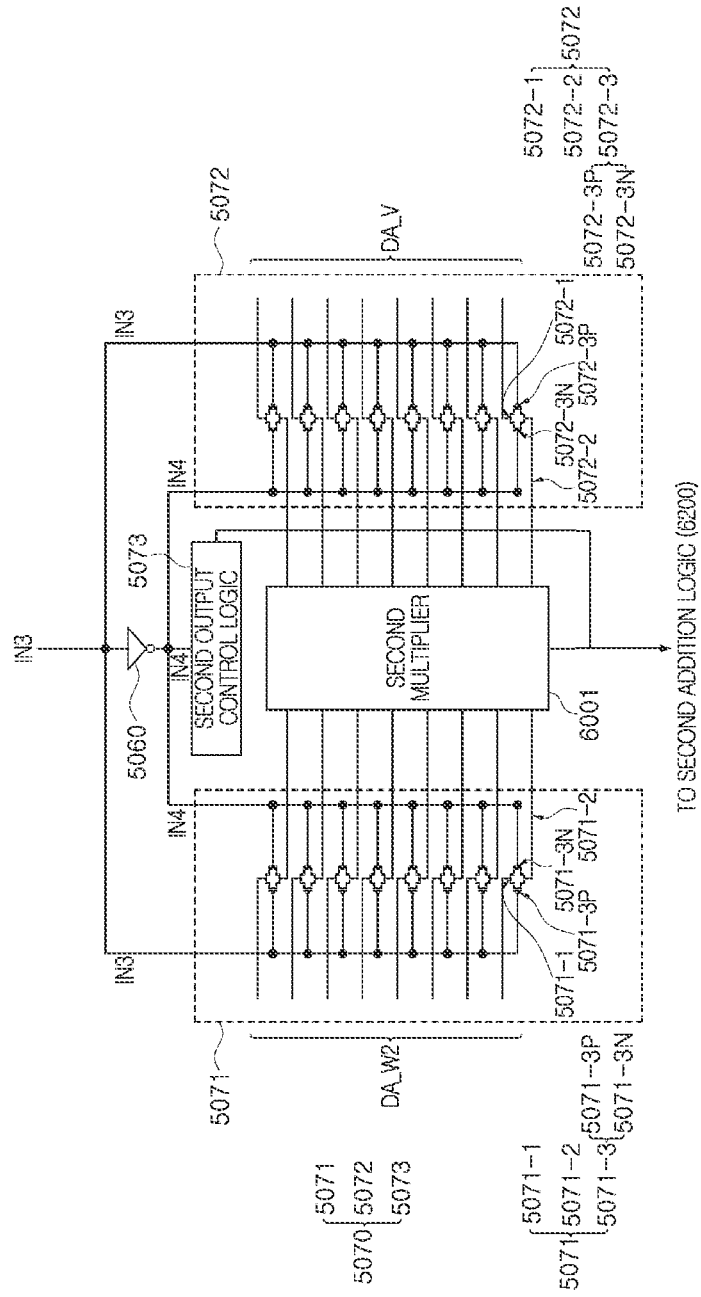

FIG. 47 is a block diagram illustrating a configuration of the second zero-detection circuit 5000 included in the PIM device 30 illustrated in FIG. 40, and FIGS. 48 and 49 illustrate detailed configurations of the second zero-detection circuit 5000 illustrated in FIG. 47. Referring to FIGS. 47 to 49, the second zero-detection circuit 5000 may include a second transmission circuit 5010, a second weight zero-detection logic circuit 5020, a third breaker 5030, a fourth breaker 5040, a second OR gate 5050, and a second I/O control unit 5001.

The second transmission circuit 5010 may receive the output value D_V from the vector zero-detection logic circuit 33. In an embodiment, when the vector zero-detection logic circuit 33 outputs a value of '1' as the output value D_V, the second transmission circuit 5010 may output the output value D_V as it is. Alternatively, when the vector zero-detection logic circuit 33 outputs a value of '0' as the output value D_V, the second transmission circuit 5010 does not output the output value D_V. That is, when the second transmission circuit 5010 receives the output value D_V having a value of '0', the second transmission circuit 5010 may output no data.

The second transmission circuit 5010 may include a second NOT gate 5011 and a second transfer gate 5012. The second NOT gate 5011 may receive and invert the output value D_V of the vector zero-detection logic circuit 33 to output the inverted value of the output value D_V. That is, the second NOT gate 5011 may output a value of '0' when the output value D_V of the vector zero-detection logic circuit 33 has a value of '1' and may output a value of '1' when the output value D_V of the vector zero-detection logic circuit 33 has a value of '0'. The second transfer gate 5012 may include an input terminal 5012-1 receiving the output value D_V of the vector zero-detection logic circuit 33, an output terminal 5012-2 coupled to the second I/O control unit 5001, and a PMOS transistor 5012-3P and an NMOS transistor 5012-3N which are coupled between the input terminal 5012-1 and the output terminal 5012-2. The PMOS transistor 5012-3P of the second transfer gate 5012 may operate in response to an output value of the second NOT gate 5011. The NMOS transistor 5012-3N of the second transfer gate 5012 may operate in response to the output value D_V of the vector zero-detection logic circuit 33.

In an embodiment, when the output value D_V of the vector zero-detection logic circuit 33 has a value of '1' and the output value of the second NOT gate 5011 has a value of '0', both of the PMOS transistor 5012-3P and the NMOS transistor 5012-3N may be turned on. In such a case, the output value D_V of '1' outputted from the vector zero-detection logic circuit 33 may be inputted to the second I/O control unit 5001 through the output terminal 5012-2. Alternatively, when the output value D_V of the vector zero-detection logic circuit 33 has a value of '0' and the output value of the second NOT gate 5011 has a value of '1', both of the PMOS transistor 5012-3P and the NMOS transistor 5012-3N may be turned off. In such a case, the second transfer gate 5012 may inhibit the output value D_V of '0' from being inputted to the second I/O control unit 5001.

The second weight zero-detection logic circuit 5020 may receive the second weight data DA_W2. The second weight zero-detection logic circuit 5020 may output a value of '1' when all of the bits included in the second weight data DA_W2 have a value of '0' and may output a value of '0' when at least one of the bits included in the second weight data DA_W2 has a value of '1'. The second weight zero-detection logic circuit 5020 may be realized using a NOR gate. In an embodiment, the second weight zero-detection logic circuit 5020 may operate only when the output value D_V of the vector zero-detection logic circuit 33 has a value of '0'.

The third breaker 5030 may receive the output value D_V of the vector zero-detection logic circuit 33. The third breaker 5030 may disable the output of the third breaker 5030 when the output value D_V of the vector zero-detection logic circuit 33 has a value of '1' and may output the output value D_V when the output value D_V of the vector zero-detection logic circuit 33 has a value of '0'.

The third breaker 5030 may include an input terminal 5031 receiving the output value D_V of the vector zero-detection logic circuit 33, an output terminal 5032 coupled to the second OR gate 5050, and a PMOS transistor 5033P and an NMOS transistor 5033N which are coupled between the input terminal 5031 and the output terminal 5032. The PMOS transistor 5033P of the third breaker 5030 may operate in response to the output value D_V of the vector zero-detection logic circuit 33. The NMOS transistor 5033N of the third breaker 5030 may operate in response to an inverted value of the output value D_V of the vector zero-detection logic circuit 33.

In an example of the present embodiment, when the output value D_V of the vector zero-detection logic circuit 33 has a value of '1', the inverted value of the output value D_V of the vector zero-detection logic circuit 33 may have a value of '0'. In such a case, both of the PMOS transistor 5033P and the NMOS transistor 5033N may be turned off. Thus, the third breaker 5030 may inhibit the output value D_V of '1' from being inputted to the second OR gate 5050. Alternatively, when the output value D_V of the vector zero-detection logic circuit 33 has a value of '0', the inverted value of the output value D_V of the vector zero-detection logic circuit 33 may have a value of '1'. In such a case, both of the PMOS transistor 5033P and the NMOS transistor 5033N may be turned on. Thus, the third breaker 5030 may allow the output value D_V of '0' to be inputted to the second OR gate 5050.

The fourth breaker 5040 may include an input terminal 5041 receiving an output value D_W2 of the second weight zero-detection logic circuit 5020, an output terminal 5042 coupled to the second OR gate 5050, and a PMOS transistor 5043P and an NMOS transistor 5043N which are coupled between the input terminal 5041 and the output terminal 5042. The PMOS transistor 5043P of the fourth breaker 5040 may operate in response to the output value D_V of the vector zero-detection logic circuit 33. The NMOS transistor 5043N of the fourth breaker 5040 may operate in response to an inverted value of the output value D_V of the vector zero-detection logic circuit 33.

In another example of the present embodiment, when the output value D_V of the vector zero-detection logic circuit 33 has a value of '1', the inverted value of the output value D_V of the vector zero-detection logic circuit 33 may have a value of '0'. In such a case, both of the PMOS transistor 5043P and the NMOS transistor 5043N may be turned off. Thus, the fourth breaker 5040 may inhibit the output value D_W2 of the second weight zero-detection logic circuit 5020 from being inputted to the second OR gate 5050. Alternatively, when the output value D_V of the vector zero-detection logic circuit 33 has a value of '0', the inverted value of the output value D_V of the vector zero-detection logic circuit 33 may have a value of '1'. In such a case, both of the PMOS transistor 5043P and the NMOS transistor 5043N may be turned on. Thus, the fourth breaker 5040 may allow the output value D_W2 to be inputted to the second OR gate 5050.

The second OR gate 5050 may receive output data of the third breaker 5030 and output data of the fourth breaker 5040 and may perform a logical OR operation of the output data of the third breaker 5030 and the output data of the fourth breaker 5040 to output the result of the logical OR operation. An output value DA_OR2 of the second OR gate 5050 may be inputted to the second I/O control unit 5001. The second OR gate 5050 may output a value of '1' when at least one of the output data of the third breaker 5030 and the output data of the fourth breaker 5040 has a value of '1'. The second OR gate 5050 may output a value of '0' when both of the output data of the third breaker 5030 and the output data of the fourth breaker 5040 have a value of '0'.

The second I/O control unit 5001 may disable the input of the second multiplier 6001 and may generate zero data including multiple bits, all of which have a value of '0', as output data of the second multiplier 6001, when any one of the first transmission circuit 3010 and the first OR gate 3050 outputs a value of '1'. The second I/O control unit 5001 may allow the second weight data DA_W2 and the vector data DA_V to be inputted to the second multiplier 6001 when a value of '0' is inputted to the second I/O control unit 5001.

More specifically, the second I/O control unit 5001 may include a second inverter 5060 and a second control logic circuit 5070. The second inverter 5060 may receive a third input value IN3 corresponding to an output value of any one of the second transmission circuit 5010 and the second OR gate 5050 to output an inverted value of the third input value IN3 as a fourth input value IN4. The third input value IN3 may correspond to the output value of the second transmission circuit 5010 (i.e., the output value D_V of the vector zero-detection logic circuit 33) or the output value DA_OR2 of the second OR gate 5050. The second inverter 5060 may output a value of '0' as the fourth input value IN4 when the third input value IN3 has a value of '1' and may output a value of '1' as the fourth input value IN4 when the third input value IN3 has a value of '0'.

The second control logic circuit 5070 may receive the third input value IN3 and the fourth input value IN4. In an example of the present embodiment, when the third input value IN3 has a value of '1' and the fourth input value IN4 has a value of '0', the second control logic circuit 5070 may disable the input of the second multiplier 6001 and may output zero data including multiple bits, all of which have a value of '0', as output data of the second multiplier 6001. In another example of the present embodiment, when the third input value IN3 has a value of '0' and the fourth input value IN4 has a value of '1', the second control logic circuit 5070 may allow the second weight data DA_W2 and the vector data DA_V to be inputted to the second multiplier 6001.

The second control logic circuit 5070 may include a second weight data control logic circuit 5071, a vector data control logic circuit 5072, and a second output control logic circuit 5073. The second weight data control logic circuit 5071 and the vector data control logic circuit 5072 may determine input enablement/disablement of the second multiplier 6001. The second weight data control logic circuit 5071 may control that the second weight data DA_W2 are inputted to the second multiplier 6001, and the vector data control logic circuit 5072 may control that the vector data DA_V are inputted to the second multiplier 6001. The second output control logic circuit 5073 may disable the input of the second multiplier 6001 and may output zero data including multiple bits, all of which have a value of '0', as the output data of the second multiplier 6001, when the second output control logic circuit 5073 receives the fourth input value IN4 having a value of '0'. The second output control logic circuit 5073 does not operate when the second output control logic circuit 5073 receives the fourth input value IN4 having a value of '1'. That is, no data are outputted from the second output control logic circuit 5073 when the second output control logic circuit 5073 receives the fourth input value IN4 having a value of '1'.

The second weight data control logic circuit 5071 may include a plurality of third input terminals 5071-1 receiving the second weight data DA_W2, a plurality of third output terminals 5071-2 coupled to the second multiplier 6001, and a plurality of third controllers 5071-3 coupled between the third input terminals 5071-1 and the third output terminals 5071-2 to receive the third input value IN3 and the fourth input value IN4. Each of the third controllers 5071-3 may include a third PMOS transistor 5071-3P receiving the third input value IN3 and a third NMOS transistor 5071-3N receiving the fourth input value IN4. The third PMOS transistor 5071-3P and the third NMOS transistor 5071-3N may be coupled to constitute one transfer gate.

The vector data control logic circuit 5072 may include a plurality of fourth input terminals 5072-1 receiving the vector data DA_V, a plurality of fourth output terminals 5072-2 coupled to the second multiplier 6001, and a plurality of fourth controllers 5072-3 coupled between the fourth input terminals 5072-1 and the fourth output terminals 5072-2 to receive the third input value IN3 and the fourth input value IN4. Each of the fourth controllers 5072-3 may include a fourth PMOS transistor 5072-3P receiving the third input value IN3 and a fourth NMOS transistor 5072-3N receiving the fourth input value IN4. The fourth PMOS transistor 5072-3P and the fourth NMOS transistor 5072-3N may be coupled to constitute one transfer gate.

In an example of the present embodiment, the third input value IN3 may have a value of '1', and the fourth input value IN4 may have a value of '0'. In such a case, all of the third PMOS transistor 5071-3P, the third NMOS transistor 5071-3N, the fourth PMOS transistor 5072-3P, and the fourth NMOS transistor 5072-3N may be turned off. Thus, all of the third controllers 5071-3 may inhibit the second weight data DA_W2 inputted to the third input terminals 5071-1 from being outputted to the third output terminals 5071-2, and all of the fourth controllers 5072-3 may also inhibit the vector data DA_V inputted to the fourth input terminals 5072-1 from being outputted to the fourth output terminals 5072-2. Accordingly, because the second weight data DA_W2 and the vector data DA_V are not inputted to the second multiplier 6001, no multiplying calculation is performed by the second multiplier 6001.

In another example of the present embodiment, the third input value IN3 may have a value of '0', and the fourth input value IN4 may have a value of '1'. In such a case, all of the third PMOS transistor 5071-3P, the third NMOS transistor 5071-3N, the fourth PMOS transistor 5072-3P, and the fourth NMOS transistor 5072-3N may be turned on. Thus, all of the third controllers 5071-3 may allow the second weight data DA_W2 inputted to the third input terminals 5071-1 to be transferred to the third output terminals 5071-2, and all of the fourth controllers 5072-3 may also allow the vector data DA_V inputted to the fourth input terminals 5072-1 to be transferred to the fourth output terminals 5072-2. Accordingly, the second weight data DA_W2 and the vector data DA_V may be inputted to the second multiplier 6001, and the second multiplier 6001 may perform a multiplying calculation of the second weight data DA_W2 and the vector data DA_V to output a result of the multiplying calculation.

Figure 50:
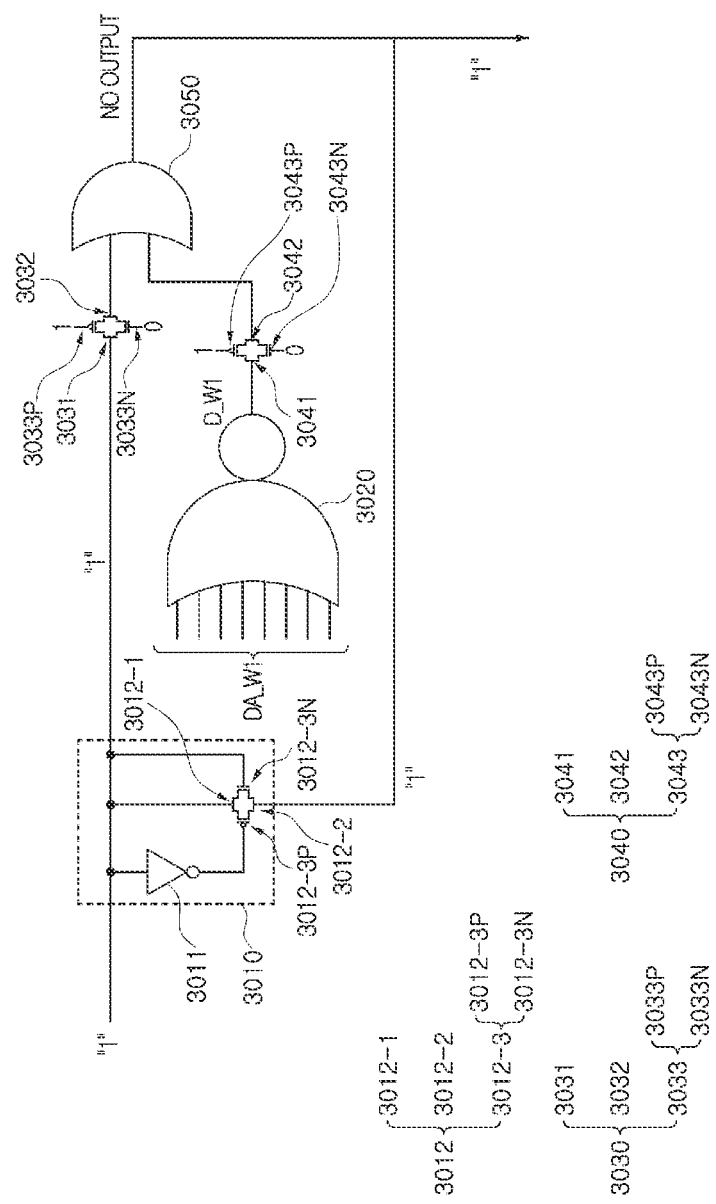
Figure 51:
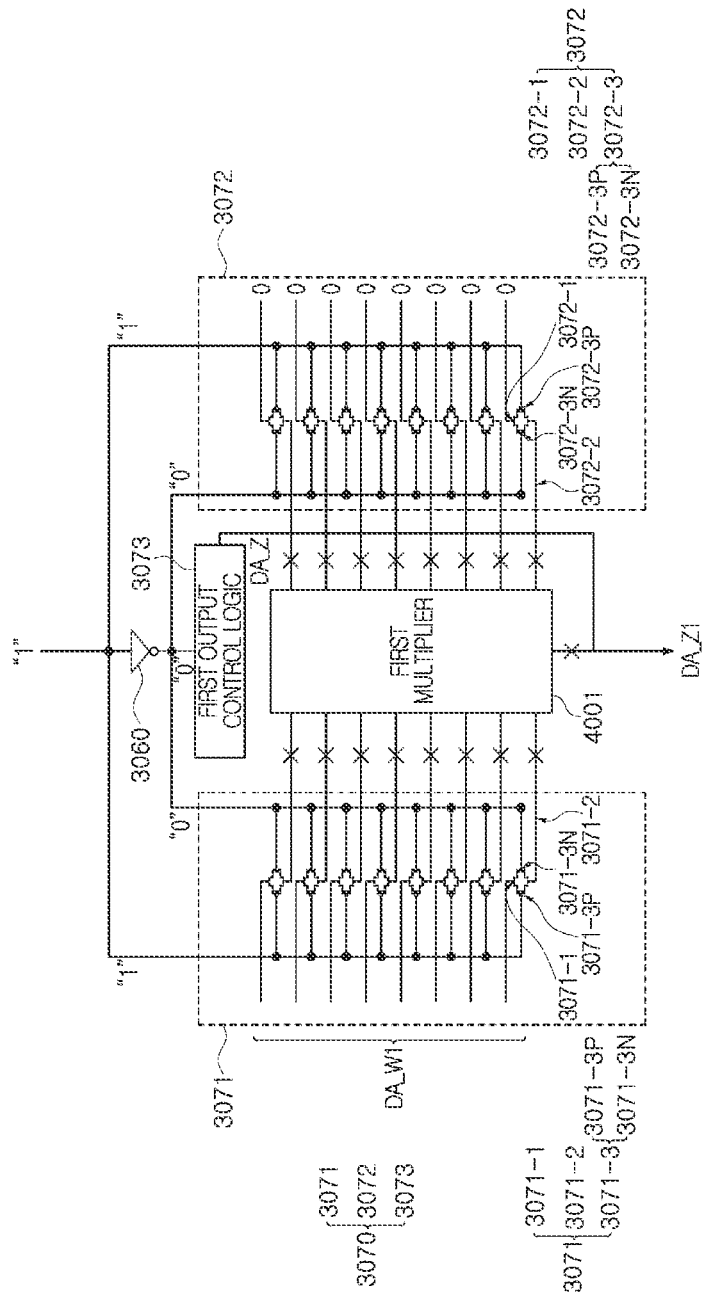
Figure 52:
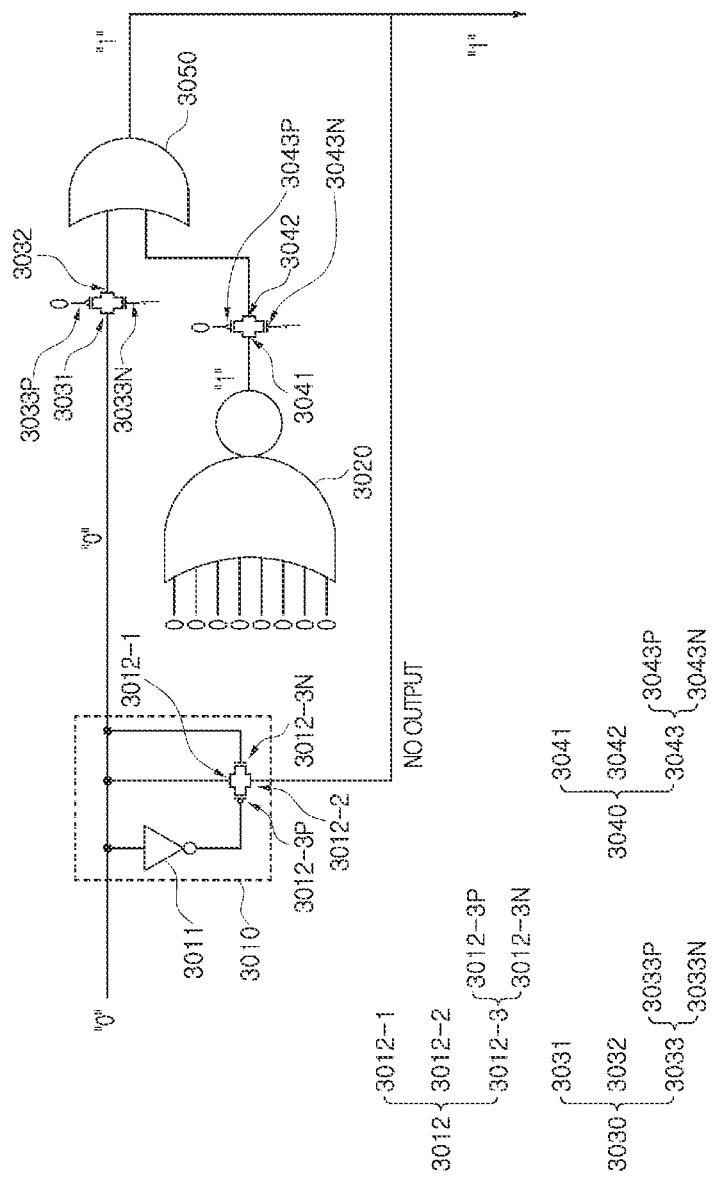
Figure 53:
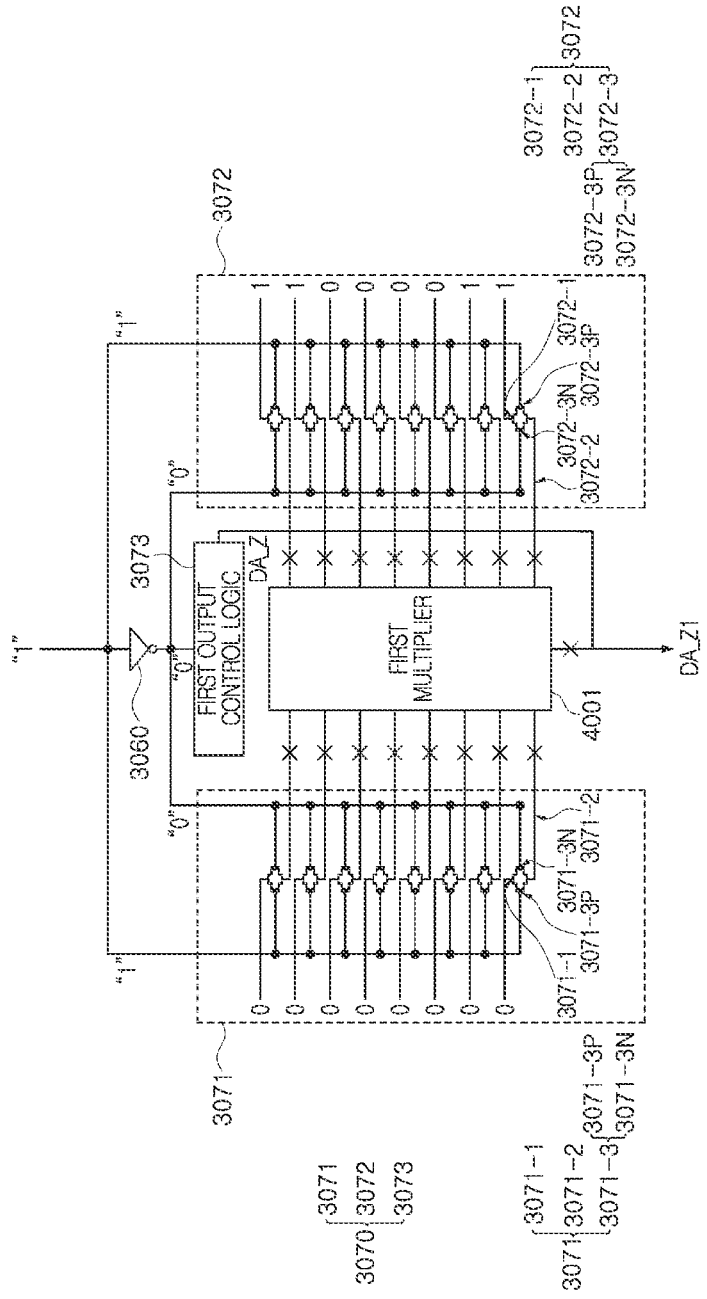
Figure 54:
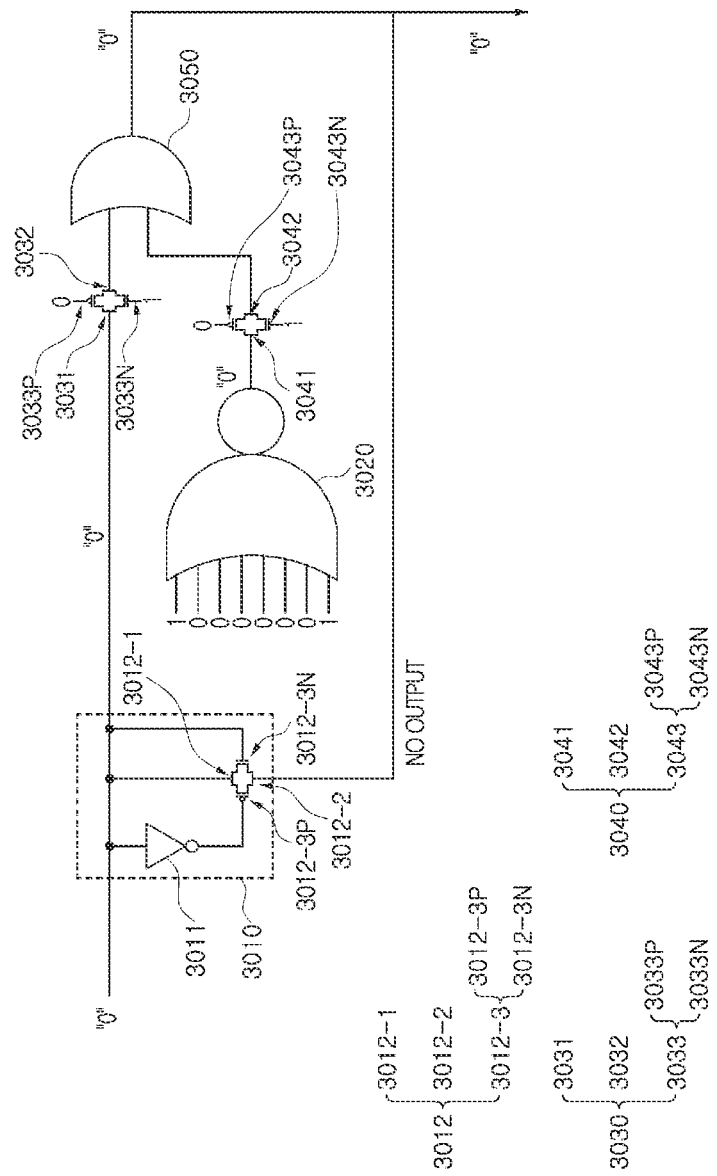

FIGS. 50 to 55 illustrate operations of the first zero-detection circuit 3000 illustrated in FIGS. 44 to 46. Specifically, FIGS. 50 and 51 illustrate an operation of the first zero-detection circuit 3000 with data flow when the vector data DA_V have a binary stream of '00000000', FIGS. 52 and 53 illustrate an operation of the first zero-detection circuit 3000 with data flow when the vector data DA_V have a binary stream of '11000011' and the first weight data DA_W1 have a binary stream of '00000000', and FIGS. 54 and 55 illustrate an operation of the first zero-detection circuit 3000 with data flow when the vector data DA_V have a binary stream of '11000011' and the first weight data DA_W1 have a binary stream of '10000001'.

Referring to FIGS. 50 and 51, because all of the bits included in the 8-bit vector data DA_V have a value of '0', a value of '1' corresponding to the output value D_V of the vector zero-detection logic circuit 33 may be inputted to the first zero-detection circuit 3000. The first transmission circuit 3010 may receive a value of '1' corresponding to the output value D_V of the vector zero-detection logic circuit 33 to output a value of '1' to the first I/O control unit 3001. The first breaker 3030 and the second breaker 3040 may inhibit their input data from being outputted to the first OR gate 3050 because the output value D_V of the vector zero-detection logic circuit 33 has a value of '1'. Thus, no data may be outputted from the first OR gate 3050.

The first inverter 3060 of the first I/O control unit 3001 may receive a value of '1' corresponding to the output value D_V of the vector zero-detection logic circuit 33 as the first input value IN1 to output a value of '0' as the second input value IN2. The first control logic circuit 3070 of the first I/O control unit 3001 may receive a value of '1' corresponding to the first input value IN1 and a value of '0' corresponding to the second input value IN2. Thus, the first control logic circuit 3070 of the first I/O control unit 3001 may disable the input of the first multiplier 4001. That is, the first weight data control logic circuit 3071 may inhibit the first weight data DA_W1 from being inputted to the first multiplier 4001, and the vector data control logic circuit 3072 may inhibit the vector data DA_V from being inputted to the first multiplier 4001. In addition, the first output control logic circuit 3073 may output the first zero data DA_Z1 including multiple bits, all of which have a value of '0', as the output data of the first multiplier 4001. The first zero data DA_Z1 may be 16-bit data of '0000000000000000'.

Referring to FIGS. 52 and 53, because at least one of the bits included in the 8-bit vector data DA_V has a value of '1', a value of '0' corresponding to the output value D_V of the vector zero-detection logic circuit 33 may be inputted to the first zero-detection circuit 3000. Thus, the first weight zero-detection logic circuit 3020 may check the bit values of the first weight data DA_W1. Because all of the bits included in the first weight data DA_W1 have a value of '0', the first weight zero-detection logic circuit 3020 may output a value of '1' as the output value D_W1.

The first transmission circuit 3010 may receive a value of '0' corresponding to the output value D_V of the vector zero-detection logic circuit 33 to output no data. The first breaker 3030 and the second breaker 3040 may output their input data as they are because the output value D_V of the vector zero-detection logic circuit 33 has a value of '0'. That is, a value of '0' corresponding to the output value D_V of the vector zero-detection logic circuit 33 may be inputted to the first OR gate 3050, and a value of '1' corresponding to the output value D_W1 of the first weight zero-detection logic circuit 3020 may also be inputted to the first OR gate 3050. Thus, the first OR gate 3050 may output a value of '1'.

The first inverter 3060 of the first I/O control unit 3001 may receive a value of '1' corresponding to the output value DA_OR1 of the first OR gate 3050 as the first input value IN1 to output a value of '0' as the second input value IN2. Accordingly, an operation of the first I/O control unit 3001 illustrated in of FIG. 53 may be the same as the operation of the first I/O control unit 3001 described with reference to FIG. 51. Thus, the operation of the first I/O control unit 3001 illustrated in of FIG. 53 will be omitted hereinafter.

Referring to FIGS. 54 and 55, because at least one of the bits included in the 8-bit vector data DA_V has a value of '1', a value of '0' corresponding to the output value D_V of the vector zero-detection logic circuit 33 may be inputted to the first zero-detection circuit 3000. Thus, the first weight zero-detection logic circuit 3020 may check the bit values of the first weight data DA_W1. Because at least one of the bits included in the first weight data DA_W1 has a value of '1', the first weight zero-detection logic circuit 3020 may output a value of '0' as the output value D_W1.

The first transmission circuit 3010 may receive a value of '0' corresponding to the output value D_V of the vector zero-detection logic circuit 33 to output no data. The first breaker 3030 and the second breaker 3040 may output their input data as they are because the output value D_V of the vector zero-detection logic circuit 33 has a value of '0'. That is, a value of '0' corresponding to the output value D_V of the vector zero-detection logic circuit 33 may be inputted to the first OR gate 3050. In addition, a value of '0' corresponding to the output value D_W1 of the first weight zero-detection logic circuit 3020 may also be inputted to the first OR gate 3050. Thus, the first OR gate 3050 may output a value of '0'.

The first inverter 3060 of the first I/O control unit 3001 may receive a value of '0' corresponding to the output value DA_OR1 of the first OR gate 3050 as the first input value IN1 to output a value of '1' as the second input value IN2. The first control logic circuit 3070 of the first I/O control unit 3001 may receive a value of '0' corresponding to the first input value IN1 and a value of '1' corresponding to the second input value IN2. Thus, the first control logic circuit 3070 of the first I/O control unit 3001 may allow the first weight data DA_W1 and the vector data DA_V to be inputted to the first multiplier 4001. That is, the first weight data control logic circuit 3071 may allow the first weight data DA_W1 to be inputted to the first multiplier 4001, and the vector data control logic circuit 3072 may allow the vector data DA_V to be inputted to the first multiplier 4001. In such a case, no data may be outputted from the first output control logic circuit 3073. The first multiplier 4001 may perform a multiplying calculation of the first weight data DA_W1 and the vector data DA_V to output the first multiplication result data DA_M1. The first multiplication result data DA_M1 may be 16-bit data of '0110001001000011'.

Although not shown in the drawings, the second zero-detection circuit 5000 illustrated in FIGS. 47 to 49 may perform substantially the same operation as the first zero-detection circuit 3000 described with reference to FIGS. 50 to 55. The only difference between the first zero-detection circuit 3000 and the second zero-detection circuit 5000 is that the second zero-detection circuit 5000 receives the output value D_V of the vector zero-detection logic circuit 33 and the second weight data DA_W2 to operate while the first zero-detection circuit 3000 receives the output value D_V of the vector zero-detection logic circuit 33 and the first weight data DA_W1 to operate.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) device comprising:
   a data storage region configured to store first data and second data; and
   an arithmetic circuit including a zero-detection circuit and multiplier, the zero-detection circuit including first transfer gates, second transfer gates, and an output control logic circuit,
   wherein the each of the first transfer gates includes a first input terminal coupled to one bit included in the first data, a first output terminal coupled to the multiplier, and first controller coupled between the first input terminal and the first output terminal,
   wherein the each of the second transfer gates includes a second input terminal coupled to one bit included in the second data, a second output terminal coupled to the multiplier, and second controller coupled between the second input terminal and the second output terminal,
   wherein the first controller and the second controller are configured to receive a first output value and a second output value generated by inverting the first output value, wherein the first output value is having a value of '1' when all bits of the first data or the second data have a value of '0', and
   wherein the output control logic circuit is configured to generate zero data including bits having a value of '0' as output data of the multiplier when the second output value is a value of '0'.

2. The PIM device of claim 1,
   wherein the first data are comprised of elements arrayed in an $R^{th}$ row of an 'M×N' matrix (where, "M" and "N" are natural numbers which are greater than one, and "R" is a natural number which is greater than one and is equal to or less than "M");
   wherein the second data are comprised of elements of an 'N×1' matrix; and
   wherein each of the first data and the second data is a "Q"-bit binary stream (where, "Q" is a natural number which is greater than one).

3. The PIM device of claim 1, wherein the zero-detection circuit further comprising:
   a first zero-detection logic configured to output a first value when all bits included in the first data have a value of '0' and configured to output a second value when at least one bit included in the first data has a value of '1'; and
   a second zero-detection logic configured to output the first value when all bits included in the second data have a value of '0' and configured to output the second value when at least one bit included in the second data has a value of '1'.

4. The PIM device of claim 3,
   wherein the first zero-detection logic includes a first NOR gate that receives bit values of the first data and outputs the first value or the second value, and
   wherein the second zero-detection logic includes a second NOR gate that receives bit values of the second data and outputs the first value or the second value.

5. The PIM device of claim 3,
   wherein the first zero-detection logic is configured to output a value of '1' when all bits included in the first data have a value of '0' and configured to output a value of '0' when at least one bit included in the first data has a value of '1', and wherein the second zero-detection logic is configured to output a value of '1' when all bits included in the second data have a value of '0' and configured to output a value of '0' when at least one bit included in the second data has a value of '1'.

6. The PIM device of claim 5, wherein the zero-detection circuit further includes an OR gate configured to perform a logical OR operation of output value of the first zero-detection logic and output value of the second zero-detection logic to output a result of the logical OR operation as the first output value.

7. The PIM device of claim 6, wherein the zero-detection circuit further includes an inverter configured to invert the first output value of the OR gate to output the inverted value of the first output value as the second output value.

8. The PIM device of claim 1, wherein the first controller includes a first PMOS transistor for receiving the first output value and a first NMOS transistor for receiving the second output value, the first PMOS transistor and the first NMOS transistor being connected in parallel; and wherein the second controller includes a second PMOS transistor for receiving the first output value and a second NMOS transistor for receiving the second output value, the second PMOS transistor and the second NMOS transistor being connected in parallel.

9. The PIM device of claim 8, wherein the first controller is configured to:

turn off the first PMOS transistor and the first NMOS transistor to block a connection between the first input terminal and the first output terminal when the first output value is a value of '1' and the second output value is a value of '0': and turn on the first PMOS transistor and the first NMOS transistor to connect the connection between the first input terminal and the first output terminal when the first output value is a value of '0' and the second output value is a value of '1'.

10. The PIM device of claim 8, wherein the second controller is configured to:

turn off the second PMOS transistor and the second NMOS transistor to block a connection between the second input terminal and the second output terminal when the first output value is a value of '1' and the second output value is a value of '0': and turn on the second PMOS transistor and the second NMOS transistor to connect the connection between the second input terminal and the second output terminal when the first output value is a value of '0' and the second output value is a value of '1'.

* * * * *